(12) United States Patent
Shibuta et al.

(10) Patent No.: US 11,350,349 B2
(45) Date of Patent: May 31, 2022

(54) BASE UNIT AND REPEATER

(71) Applicant: Panasonic Intellectual Property Management Co., Ltd., Osaka (JP)

(72) Inventors: Akira Shibuta, Fukuoka (JP); Hiroyuki Ishihara, Fukuoka (JP); Yoshizumi Yamashita, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 138 days.

(21) Appl. No.: 16/697,671

(22) Filed: Nov. 27, 2019

(65) Prior Publication Data

US 2020/0187101 A1    Jun. 11, 2020

(30) Foreign Application Priority Data

Dec. 10, 2018 (JP) .............................. JP2018-231119
Dec. 10, 2018 (JP) .............................. JP2018-231123

(51) Int. Cl.
*H04W 48/16* (2009.01)
*H04W 72/04* (2009.01)
*H04M 1/72502* (2021.01)

(52) U.S. Cl.
CPC ....... *H04W 48/16* (2013.01); *H04M 1/72502* (2013.01); *H04W 72/0446* (2013.01)

(58) Field of Classification Search
CPC . H04W 48/16; H04W 72/0446; H04W 88/10; H04W 84/105; H04M 1/72502; H04M 1/72505
See application file for complete search history.

(56) References Cited

U.S. PATENT DOCUMENTS

| 5,239,678 | A | * | 8/1993 | Grube | ................... | H04W 28/26 |
| | | | | | | 455/511 |
| 5,533,027 | A | * | 7/1996 | Akerberg | ............. | H04B 7/2606 |
| | | | | | | 370/347 |
| 6,122,519 | A | * | 9/2000 | Tat | ........................ | H04W 48/16 |
| | | | | | | 455/436 |
| 6,310,867 | B1 | * | 10/2001 | Tat | ............................ | H04J 4/00 |
| | | | | | | 370/330 |
| 6,424,633 | B1 | * | 7/2002 | von Brandt | ............ | H04B 7/155 |
| | | | | | | 370/280 |

(Continued)

FOREIGN PATENT DOCUMENTS

JP    2017-017462 A    1/2017

*Primary Examiner* — Steven H Nguyen
(74) *Attorney, Agent, or Firm* — Seed IP Law Group LLP

(57) ABSTRACT

A base unit that performs DECT communication with a cordless telephone under the control of the base unit and a repeater under the control of the base unit, the base unit including a controller that generates first slot information to which the cordless telephone refers when the cordless telephone accesses the base unit and second slot information to which the repeater refers when the repeater accesses the base unit and a radio section that transmits the first slot information to the cordless telephone and the second slot information to the repeater, wherein the controller generates the first slot information representing that access to a first slot group out of a plurality of slots in a predetermined period is restricted and generates the second slot information representing that access to a remaining second slot group out of the plurality of slots excluding the first slot group is restricted.

16 Claims, 39 Drawing Sheets

(56) References Cited

U.S. PATENT DOCUMENTS

| | | | |
|---|---|---|---|
| 6,577,611 B1* | 6/2003 | Tat | H04W 72/02 370/330 |
| 9,425,944 B1* | 8/2016 | Singh | H04L 5/0032 |
| 2006/0268815 A1* | 11/2006 | Fukushima | H04W 72/0453 370/347 |
| 2009/0104913 A1* | 4/2009 | Karls | H04W 72/0453 455/450 |
| 2009/0168763 A1* | 7/2009 | Choi | H04W 28/26 370/352 |

* cited by examiner

FIG. 13

| NOTIFICATION 1: TO BE REFERRED TO BY EXTENSION UNIT UNDER CONTROL (Blind Slot Info.) NOTIFICATION 2: TO BE REFERRED BY REPEATER UNDER CONTROL (Repeater Blind Slot Info.) | | Level 0 (ACCESS PROHIBITED) | Level 1 (ACCESS RESTRICTED) | |
|---|---|---|---|---|
| | | SLOT IN USE | EVEN-NUMBERED SLOT | ODD-NUMBERED SLOT |
| MASTER UNIT | NOTIFICATION 1 | ○ | ○ | |
| | NOTIFICATION 2 | ○ | | ○ |
| REPEATER (AT ODD-NUMBERED STAGE) | NOTIFICATION 1 | ○ | ○ | |
| | NOTIFICATION 2 | ○ | ○ | |
| REPEATER (AT EVEN-NUMBERED STAGE) | NOTIFICATION 1 | ○ | | ○ |
| | NOTIFICATION 2 | | | ○ |

| NOTIFICATION 1: TO BE REFERRED TO BY EXTENSION UNIT AND REPEATER UNDER CONTROL (Blind Slot Info.) | Level 0 (ACCESS PROHIBITED) | Level 1 (ACCESS RESTRICTED) | |
|---|---|---|---|
| | SLOT IN USE | UPPER-LEVEL DEVICE: IDLE, REPEATER: IDLE SLOT | UPPER-LEVEL DEVICE: BLINDED, REPEATER: IDLE SLOT |
| MASTER UNIT | NOTIFICATION 1 | ○ | — | — |
| REPEATER | NOTIFICATION 1 | ○ | ○ | — |

| | | RECEPTION BY MASTER UNIT | | TRANSMISSION BY EXTENSION UNIT | | |
|---|---|---|---|---|---|---|
| | FREQUENCY | RECEPTION POWER (RSSI VALUE) | RECEPTION POWER UPPER THRESHOLD | RECEPTION POWER LOWER THRESHOLD | TRANSMISSION POWER | MAXIMUM TRANSMISSION POWER | MINIMUM TRANSMISSION POWER |
| RADIO SECTION 1 | F1 | R1 | Rhigh | Rlow | P1 | Pmax | Pmin |
| RADIO SECTION 2 | F2 | R2 | | | (P2) | | |

FIG. 24

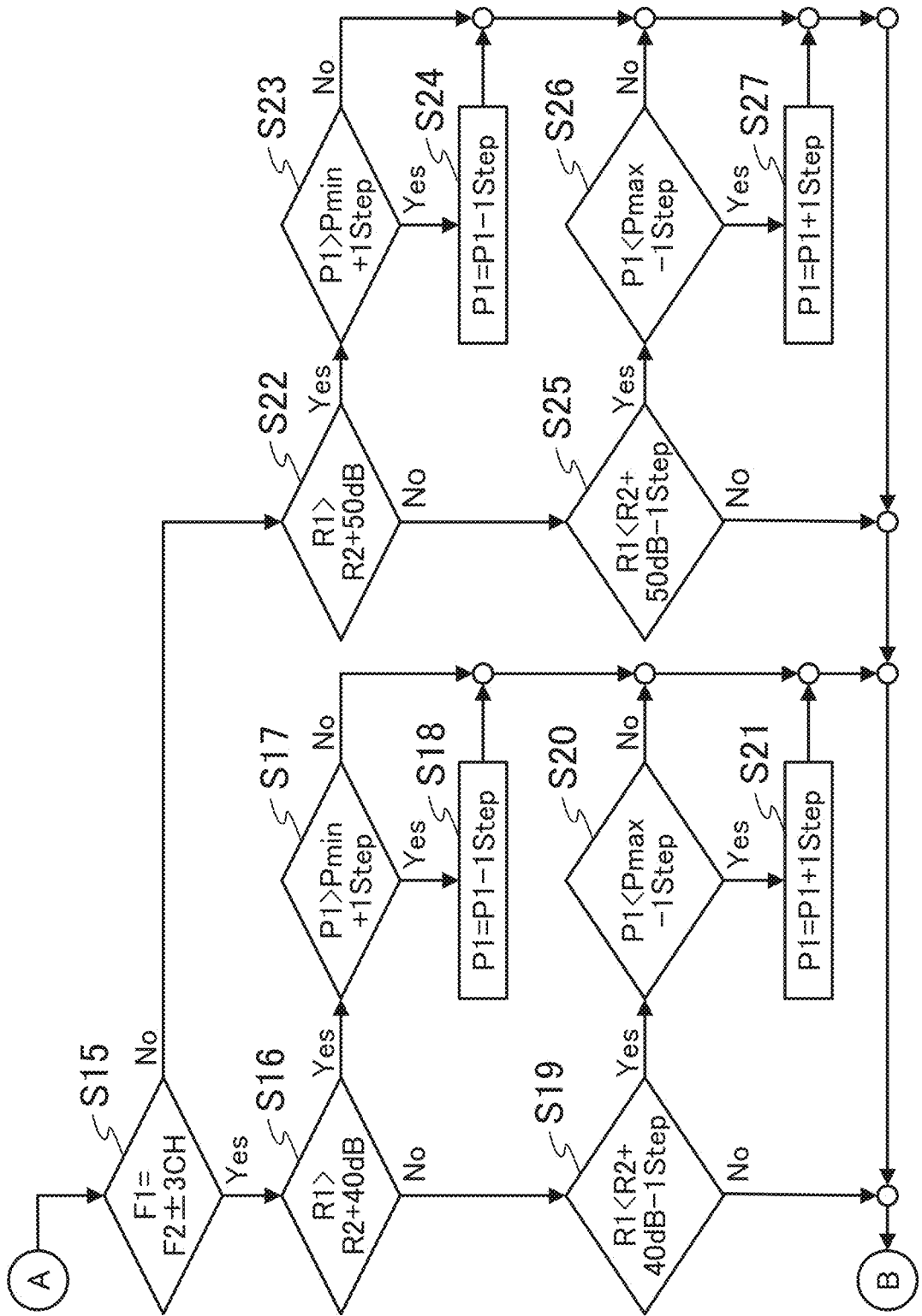

|  | FREQUENCY | RECEPTION BY MASTER UNIT | | RECEPTION BY EXTENSION UNIT | |
|---|---|---|---|---|---|
|  |  | FRAME ERROR COUNT | FRAME ERROR THRESHOLD | FRAME ERROR COUNT | FRAME ERROR THRESHOLD |
| RADIO SECTION 1 | F1 | N1 | Nmax | M1 | Mmax |
| RADIO SECTION 2 | F2 | (N2) |  | (M2) |  |

FIG. 26

| NOTIFICATION 1: TO BE REFERRED TO BY EXTENSION UNIT UNDER CONTROL (Blind Slot Info.) NOTIFICATION 2: TO BE REFERRED TO BY REPEATER UNDER CONTROL (Repeater Blind Slot Info.) | | Level 0 (ACCESS PROHIBITED) SLOT BEING USED BY BOTH RADIO SECTIONS 1 AND 2 | Level 1 (ACCESS RESTRICTED) | | Level 2 (ACCESS RESTRICTED) SLOT BEING USED BY BOTH RADIO SECTION 1 OR 2 |
|---|---|---|---|---|---|
| | | | EVEN-NUMBERED SLOTS | ODD-NUMBERED SLOTS | |
| MASTER UNIT | NOTIFICATION 1 | ○ | | | ○ |
| | NOTIFICATION 2 | ○ | ○ | | ○ |
| REPEATER (ODD-NUMBERED STAGE) | NOTIFICATION 1 | ○ | ○ | | ○ |
| | NOTIFICATION 2 | ○ | ○ | | ○ |
| REPEATER (EVEN-NUMBERED STAGE) | NOTIFICATION 1 | ○ | | ○ | ○ |
| | NOTIFICATION 2 | ○ | | ○ | ○ |

FIG. 30

| NOTIFICATION 1: TO BE REFERRED TO BY EXTENSION UNIT AND REPEATER UNDER CONTROL (Blind Slot Info.) | | Level 0 (ACCESS PROHIBITED) | Level 1 (ACCESS RESTRICTED) | | Level 2 (ACCESS RESTRICTED) |
|---|---|---|---|---|---|
| | | SLOT BEING USED BY BOTH RADIO SECTIONS 1 AND 2 | UPPER-LEVEL DEVICE: IDLE, REPEATER: IDLE SLOT | UPPER-LEVEL DEVICE: BLINDED, REPEATER: IDLE SLOT | SLOT BEING USED BY BOTH RADIO SECTION 1 OR 2 |
| MASTER UNIT | NOTIFICATION 1 | ○ | — | | ○ |
| REPEATER | NOTIFICATION 1 | ○ | ○ | | ○ |

FIG. 31

| | MASTER UNIT RADIO SECTION 1 | MASTER UNIT RADIO SECTION 2 | REPEATER RADIO SECTION 1 | REPEATER RADIO SECTION 2 | REMARKS |
|---|---|---|---|---|---|
| REPEATER RADIO SECTION 1 | O | | | | EXTENSION UNITS UNDER CONTROL OF RADIO SECTION 1 AND EXTENSION UNITS UNDER CONTROL OF RADIO SECTION 2 ARE SEPARATELY REGISTERED BETWEEN MASTER UNIT AND REPEATER |
| REPEATER RADIO SECTION 2 | | O | | | |
| EXTENSION UNIT 1 | O | | O | | NUMBER OF REGISTERED EXTENSION UNITS THAT SUPPORT WIDE AREA (CAPABLE OF MAKING CALL VIA REPEATER) |
| EXTENSION UNIT 2 | | O | | O | |
| EXTENSION UNIT 3 | O | | O | | UNDER CONTROL OF RADIO SECTION 1: 6 |
| EXTENSION UNIT 4 | | O | | O | UNDER CONTROL OF RADIO SECTION 2: 6 |
| EXTENSION UNIT 5 | O | | O | | |
| EXTENSION UNIT 6 | | O | | O | |
| EXTENSION UNIT 7 | O | | O | | |
| EXTENSION UNIT 8 | | O | | O | |
| EXTENSION UNIT 9 | O | | O | | |
| EXTENSION UNIT 10 | | O | | O | |
| EXTENSION UNIT 11 | O | | O | | |
| EXTENSION UNIT 12 | | O | | O | |
| EXTENSION UNIT 13 | O | | | | NUMBER OF REGISTERED EXTENSION UNITS THAT DOES NOT SUPPORT WIDE AREA (ONLY CAPABLE OF MAKING DIRECT CALL WITH MASTER UNIT) |
| EXTENSION UNIT 14 | | O | | | |
| EXTENSION UNIT 15 | O | | | | UNDER CONTROL OF RADIO SECTION 1: 6 |
| EXTENSION UNIT 16 | | O | | | UNDER CONTROL OF RADIO SECTION 2: 6 |
| EXTENSION UNIT 17 | O | | | | |
| EXTENSION UNIT 18 | | O | | | |
| EXTENSION UNIT 19 | O | | | | |
| EXTENSION UNIT 20 | | O | | | |
| EXTENSION UNIT 21 | O | | | | |
| EXTENSION UNIT 22 | | O | | | |
| EXTENSION UNIT 23 | O | | | | |
| EXTENSION UNIT 24 | | O | | | |

FIG. 36

|  | MASTER UNIT RADIO SECTION 1 | MASTER UNIT RADIO SECTION 2 | REPEATER RADIO SECTION 1 | REPEATER RADIO SECTION 2 | REMARKS |
|---|---|---|---|---|---|
| REPEATER RADIO SECTION 1 | O |  |  |  | EXTENSION UNITS UNDER CONTROL OF RADIO SECTION 1 AND EXTENSION UNITS UNDER CONTROL OF RADIO SECTION 2 ARE SEPARATELY REGISTERED BETWEEN MASTER UNIT AND REPEATER |
| REPEATER RADIO SECTION 2 |  | O |  |  |  |
| EXTENSION UNIT 1 | O |  |  |  | NUMBER OF REGISTERED EXTENSION UNITS UNDER CONTROL OF RADIO SECTION 1: 12 UNDER CONTROL OF RADIO SECTION 2: 12 |
| EXTENSION UNIT 2 |  | O | O |  |  |
| EXTENSION UNIT 3 | O |  | O |  |  |
| EXTENSION UNIT 4 |  | O | O |  |  |
| EXTENSION UNIT 5 | O |  | O |  |  |
| EXTENSION UNIT 6 |  | O | O |  |  |
| EXTENSION UNIT 7 | O |  | O |  | NUMBER OF CONNECTABLE REPEATERS UNDER CONTROL OF RADIO SECTION 1: 6 UNDER CONTROL OF RADIO SECTION 2: 6 CONNECTABLE TO ANY EXTENSION UNIT BUT UP TO 6 EXTENSION UNIT PER RADIO SECTION |
| EXTENSION UNIT 8 |  | O | O |  |  |
| EXTENSION UNIT 9 | O |  | O |  |  |
| EXTENSION UNIT 10 |  | O | O |  |  |
| EXTENSION UNIT 11 | O |  | O |  |  |
| EXTENSION UNIT 12 |  | O | O |  |  |
| EXTENSION UNIT 13 | O |  |  | O |  |
| EXTENSION UNIT 14 |  | O |  | O |  |
| EXTENSION UNIT 15 | O |  |  | O |  |
| EXTENSION UNIT 16 |  | O |  | O |  |
| EXTENSION UNIT 17 | O |  |  | O |  |
| EXTENSION UNIT 18 |  | O |  | O |  |
| EXTENSION UNIT 19 | O |  |  | O |  |
| EXTENSION UNIT 20 |  | O |  | O |  |
| EXTENSION UNIT 21 | O |  |  | O |  |
| EXTENSION UNIT 22 |  | O |  | O |  |
| EXTENSION UNIT 23 | O |  |  | O |  |
| EXTENSION UNIT 24 |  | O |  | O |  |

FIG. 37

BASE UNIT AND REPEATER

CROSS REFERENCE TO RELATED APPLICATIONS

This application is entitled to and claims the benefit of Japanese Patent Application No. 2018-231119, filed on Dec. 10, 2018 and Japanese Patent Application No. 2018-231123, filed on Dec. 10, 2018, the disclosure of which including the specification, drawings and abstract is incorporated herein by reference in its entirety.

TECHNICAL FIELD

The present disclosure relates to a base unit and a repeater.

BACKGROUND ART

As a communication method used by a digital cordless telephone, there is a digital enhanced cordless telecommunications (DECT) method. PTL 1 discloses a cordless telephone using the DECT method. The cordless telephone disclosed in PTL 1 is configured to automatically switch a channel to another before a user recognizes degradation in call quality not to allow degradation in call quality.

CITATION LIST

Patent Literature

PTL 1
Japanese Patent Application Laid-Open No. 2017-017462

SUMMARY OF INVENTION

Technical Problem

A call via a repeater in the DECT method has a problem of a decrease in the number of call channels of a cordless telephone depending on the timing of communication between a base unit and the cordless telephone and the timing of communication between the base unit and the repeater.

Further, the number of communication channels in each of the downlink and the uplink in the DECT method is 12 per base unit in a narrow-band voice call and 6 per base unit in a wide-band voice call. The market has been requiring an increase in the number of call channels.

Non-limiting embodiments of the present disclosure contribute to provision of a base unit and a repeater capable of suppressing a decrease in the number of call channels of a cordless telephone and provision of a base unit and a repeater capable of increasing the number of call channels.

Solution to Problem

A base unit according to one aspect of the present disclosure is a base unit that performs digital enhanced cordless telecommunications (DECT) communication with a cordless telephone under control of the base unit and a repeater under control of the base unit, the base unit including: a controller that generates first slot information to which the cordless telephone refers when the cordless telephone accesses the base unit and second slot information to which the repeater refers when the repeater accesses the base unit; and a radio section that transmits the first slot information to the cordless telephone and transmits the second slot information to the repeater, in which the controller generates the first slot information representing that access to a first slot group among a plurality of slots in a predetermined period is restricted, and the controller generates the second slot information representing that access to a remaining second slot group among the plurality of slots excluding the first slot group is restricted.

A base unit according to one aspect of the present disclosure is a base unit that performs digital enhanced cordless telecommunications (DECT) communication, the base unit including: a first radio section and a second radio section that communicate with a device under control of the base unit by using different channels; and a controller that generates slot information which is transmitted to the device under the control of the base unit and to which the device under the control of the base unit refers when the device accesses the base unit, in which the controller generates the slot information representing that access to a slot used by at least one of the first radio section and the second radio section is restricted.

A repeater according to one aspect of the present disclosure is a repeater that performs digital enhanced cordless telecommunications (DECT) communication with a cordless telephone under control of the repeater and a first repeater under the control of the repeater and performs DECT communication with a base unit directly or via a second repeater, the repeater including: a controller that generates slot information to which the cordless telephone and the first repeater refer when the cordless telephone and the first repeater access the repeater; and a radio section that transmits the slot information to the cordless telephone and the first repeater, in which the controller generates the slot information representing restriction of access to a slot group having a same slot number as a slot number of a first slot group for which the base unit restricts access to a cordless telephone under the control of the base unit, among a plurality of slots in a predetermined period in a case where the repeater is disposed at an odd-numbered stage in a cascade connection with the base unit located in a first position of the cascade, and the controller generates the slot information representing restriction of access to a slot group having a same slot number as a slot number of a remaining second slot group of the plurality of slots excluding the first slot group in a case where the repeater is disposed at an even-numbered stage in the cascade connection.

A repeater according to one aspect of the present disclosure is a repeater that performs digital enhanced cordless telecommunications (DECT) communication with a cordless telephone under control of the repeater and a first repeater under the control of the repeater and performs DECT communication with one of a base unit and a second repeater on an upstream of the base unit, the repeater including: a controller that generates slot information to which the cordless telephone and the first repeater refer when the cordless telephone and the first repeater access the repeater; and a radio section that transmits the slot information to the cordless telephone and the first repeater, in which the controller generates the slot information representing restriction of access to a first idle slot that is idle in both the base unit and the repeater in a case where the repeater performs the DECT communication with the base unit, and the controller generates the slot information representing restriction of access to a second idle slot that is idle in both the second repeater and the repeater in a case where the repeater performs the DECT communication with the second repeater.

A repeater according to one aspect of the present disclosure is a repeater that performs digital enhanced cordless telecommunications (DECT) communication, the repeater including: a first radio section and a second radio section that communicate with a device under control of the repeater by using different channels; and a controller that generates slot information which is transmitted to the device under the control of the repeater and to which the device under the control of the repeater refers when the device accesses the repeater, in which the controller generates the slot information representing that access to a slot used by at least one of the first radio section and the second radio section is prohibited.

A comprehensive or specific aspect of each of the above inventive components may be achieved in the form of a system, a device, a method, an integrated circuit, a computer program, or a recording medium or may be achieved in the form of an arbitrary combination of the system, the device, the method, the integrated circuit, the computer program, and the recording medium.

Advantageous Effects of Invention

According to the aspects of the present disclosure, a decrease in the number of call channels of a cordless telephone can be suppressed.

According to the aspects of the present disclosure, the number of communication channels can be increased.

Further advantages and effects in the aspects of the present disclosure are clarified in the specification and the appended drawings. The advantages and/or effects are provided by the features described in some embodiments, the specification, and the appended drawings, but all the advantages and effects are not necessarily provided to provide one or more of the features.

BRIEF DESCRIPTION OF DRAWINGS

FIG. 13 describes an example of the access restriction performed by a base unit and a repeater;
FIG. 16 describes an example of the access restriction performed by a base unit and a repeater;
FIG. 21 describes an example of a channel list in the downlink operation;
FIG. 24 shows parameters used in the description of signal strength indication control;
FIG. 25B is a flowchart showing an example of the transmission power control performed by the controller on an extension unit;
FIG. 26 shows parameters used in the description of a channel changing process;
FIG. 30 describes an example of access restriction performed by the base unit and the repeater;
FIG. 31 describes another example of the access restriction performed by the base unit and the repeater;
FIG. 36 describes an example of registration of extension units;
FIG. 37 describes another example of the registration of extension units.

DESCRIPTION OF EMBODIMENTS

Embodiments of the present invention will be described below in detail with reference to the accompanying drawings as appropriate. It is, however, noted that a description made in detail more than necessary is omitted in some cases.

For example, a detailed description of an already well-known item and a duplicate description of substantially the same configuration are omitted in some cases. The reason for this is to prevent the following description from being unnecessarily redundant and allow a person skilled in the art to readily understand the present disclosure.

The accompanying drawings and the following descriptions are provided to allow a person skilled in the art to fully understand the present disclosure and are not intended to limit the subject set forth in the appended claims.

Embodiment 1

Figure 1:
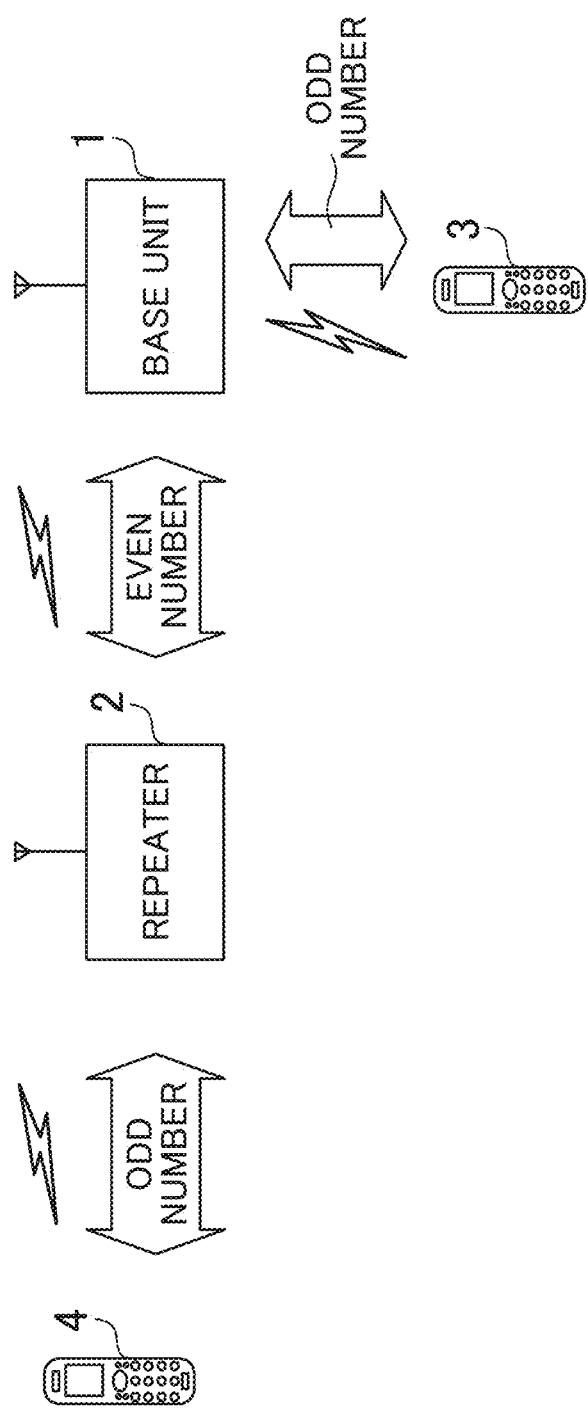
FIG. 1 shows an example of the configuration of a cordless telephone system according to Embodiment 1.

FIG. 1 shows an example of the configuration of a cordless telephone system according to Embodiment 1. The cordless telephone system includes base unit 1, repeater 2, and cordless telephones 3 and 4, as shown in FIG. 1. The cordless telephone system is installed, for example, in an office and a residence. Base unit 1 may be called, for example, a base station or a master unit. Cordless telephones 3 and 4 may each be called, for example, a handset or an extension unit.

Base unit 1, repeater 2, and cordless telephones 3 and 4 wirelessly communicate with each other based on a time division multiple access (TDMA) method compliant with the DECT method. Base unit 1, repeater 2, and cordless telephones 3 and 4 wirelessly communicate with each other, for example, by using a 1.8-GHz-band or 1.9-GHz-band radio wave.

Base unit 1 is connected to a switcher or a server (not shown) via Ethernet (registered trademark) or a public switched telephone network (PSTN). Cordless telephone 3 can make a call to another telephone via base unit 1. Cordless telephone 4 can make a call to another telephone via repeater 2 and base unit 1.

Base unit 1 uses an odd-numbered slot (slot having odd number) to communicate with cordless telephone 3 under the control of base unit 1. Base unit 1 uses an even-numbered slot (slot having even number) to communicate with repeater 2 under the control of base unit 1.

Repeater 2 uses an odd-numbered slot that does not coincide with the even-numbered slot used to communicate with base unit 1 to communicate with cordless telephone 4 under the control of repeater 2. Repeater 2 can be considered to function as both the base unit and an extension unit. For example, repeater 2 can be considered to serve as an extension unit with respect to base unit 1 and as the base unit with respect to cordless telephone 4.

As described above, the cordless telephone system divides slots into slots usable for communication between base unit 1 and cordless telephone 3 and slots usable for communication between base unit 1 and repeater 2 (into odd-numbered slots and even-numbered slots, as described above). The cordless telephone system thus suppresses a decrease in the number of simultaneous calls.

Note that base unit 1 may use an even-numbered slot to communicate with cordless telephone 3. In this case, base unit 1 uses an odd-numbered slot to communicate with cordless repeater 2. The repeater 2 uses an even-numbered slot to communicate with cordless telephone 4.

FIG. 1 shows only one cordless telephone 3 as the cordless telephone that wirelessly communicates with base unit 1, and a plurality of cordless telephones 3 may be present. FIG. 1 similarly shows only one cordless telephone 4 as the cordless telephone that wirelessly communicates with base unit 1 via repeater 2, and a plurality of cordless telephones 4 may be present.

Figure 2:
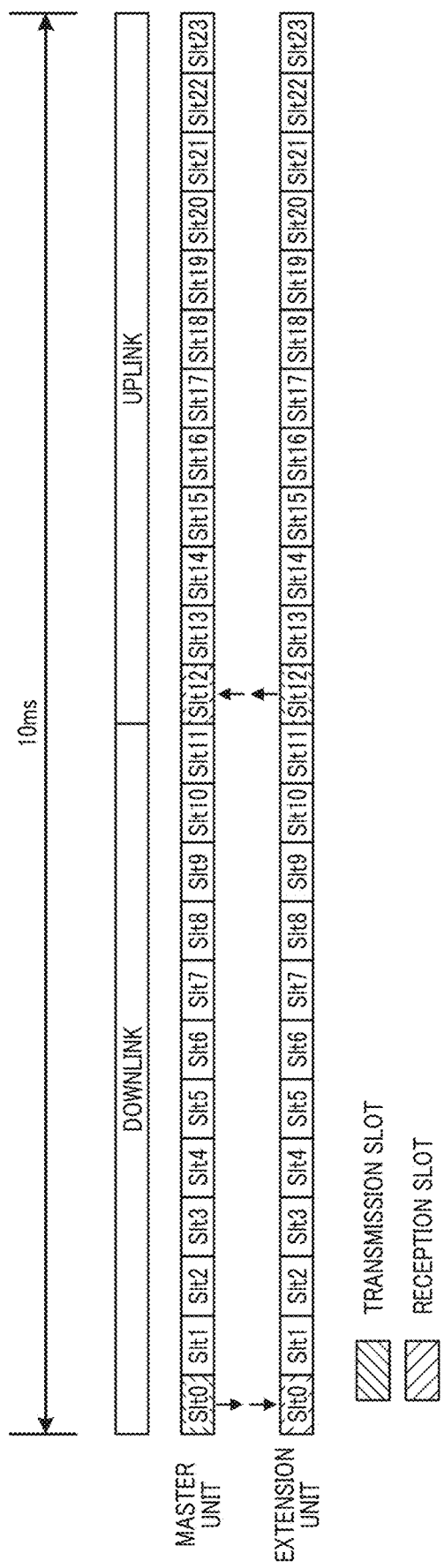
FIG. 2 shows an example of the frame configuration in a DECT method.

FIG. 2 shows an example of the frame configuration in the DECT method. A slot is hereinafter labeled with "Slt" in some cases in the accompanying drawings.

In the DECT method, one frame having a length of 10 ms contains 24 time slots from slot 0 to slot 23. One frame having the length of 10 ms is divided into a downlink frame having a length of 5 ms and an uplink frame having a length of 5 ms. The downlink frame contains 12 time slots from slot 0 to slot 11, and the uplink frame contains 12 time slots from slot 12 to slot 23.

An extension unit uses one slot pair formed of one of the 12 downlink slots and one of the 12 uplink slots to wirelessly communicates with the base unit in a narrow-band voice call. The combination of a downlink slot and an uplink slot may be fixed, for example, to SltN and SltN+12 (N= 0, 1, 2, . . . , 11). The base unit can therefore simultaneously make calls (establish communication) with 12 extension units at the maximum in a narrow-band voice call.

An extension unite scans the channels before it starts making a call to select a channel (time slot and frequency) in a good communication condition and starts communicating with the base unit. For example, the base unit transmits blind slot information to the extension units under the control of the base unit by using a beacon signal that allows broadcast transmission of information on the base unit on a regular basis. In the blind slot information, a slot having been already used is notified as a blind (inaccessible) slot.

An extension unit refers to the blind slot information and selects a slot used for communication out of idle slots not used for other communication (slots that extension unit can transmit access request). The extension unit selects a frequency used for communication from those in the selected slot and transmits an access request to the base unit to start communication. The extension unit similarly scans the channels of the repeater before it starts making a call, selects select a channel in a good communication condition, and starts communicating with the repeater.

Figure 3:
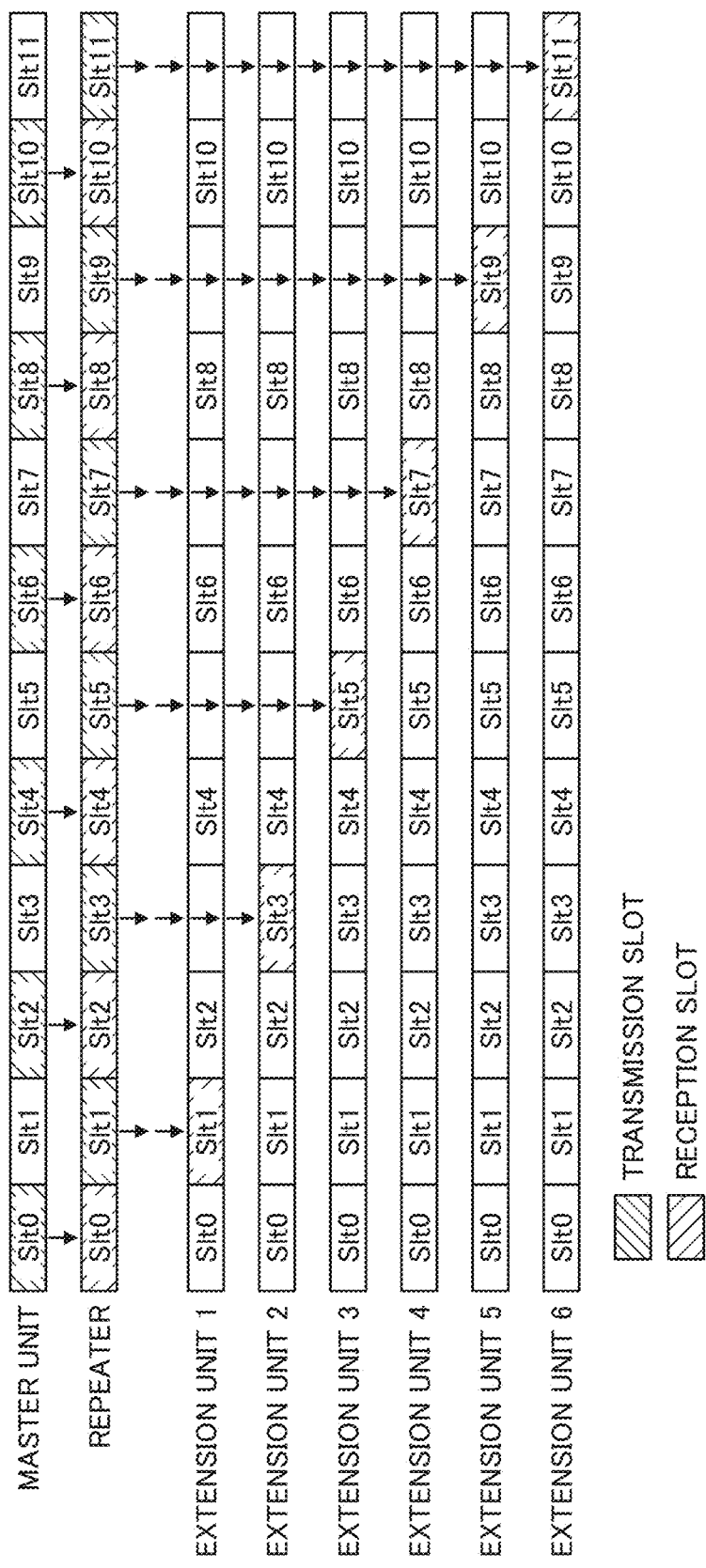
FIG. 3 describes an example of time slots used by a base unit and a repeater in the downlink.

FIG. 3 describes an example of the time slots used by the base unit and the repeater in the downlink. The base unit shown in FIG. 3 incorporates the repeater under the control of the base unit. The repeater incorporates extension units 1 to 6 under the control of the repeater.

The repeater repeats a downlink signal transmitted from the base unit. The repeater uses a slot different from the slot in which the downlink signal is received from the base unit to transmit the downlink signal received from the base unit to the extension units. For example, the repeater transmits the downlink signal received in slot 0 from the base unit to the extension unit 1 in slot 1, which differs from slot 0.

As described above, the repeater that repeats the downlink signal uses two slots, a slot in which the downlink signal is received from the base unit and a slot in which the downlink signal is transmitted to an extension unit. Therefore, in the communication via the repeater, the base unit can make simultaneous calls with six extension units at the maximum.

The communication between the base unit and the repeater and the communication between the repeater and an extension unit are not limited to the communication using adjacent slots shown in FIG. 3. The communication between the base unit and the repeater and the communication between the base unit and an extension unit may be performed by using an arbitrary slot combination.

Since the repeater cannot communicate with the base unit in the slot in which the repeater transmits the downlink signal to an extension unit, the slot is an idle slot in the base unit, as shown in FIG. 3. For example, in the case shown in FIG. 3, the slots 1, 3, 5, 7, 9, and 11 are idle slots in the base unit.

Figure 4:
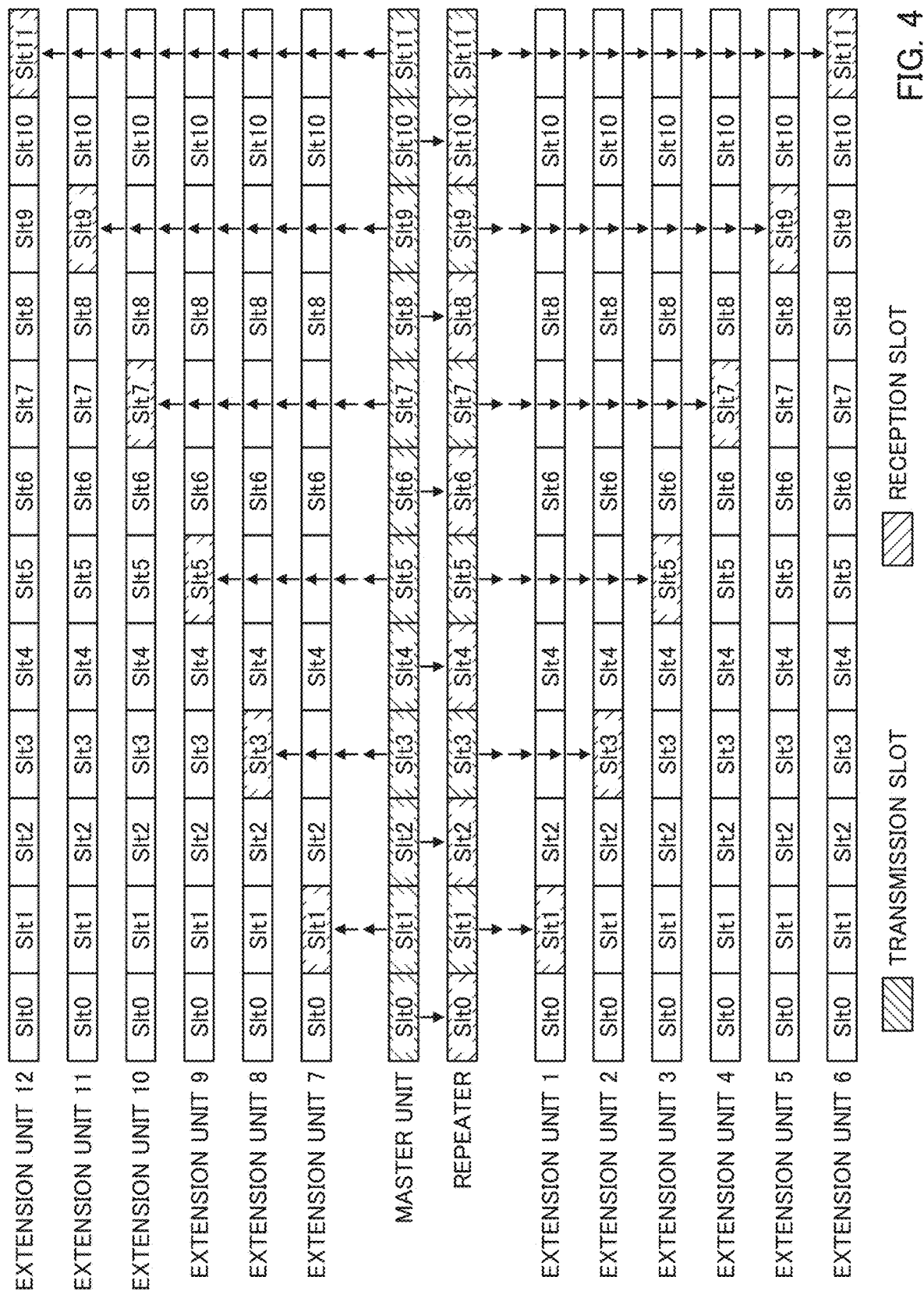
FIG. 4 describes another example of time slots used by the base unit and the repeater in the downlink.

FIG. 4 describes another example of the time slots used by the base unit and the repeater in the downlink. The base unit shown in FIG. 4 incorporates the repeater and extension units 7 to 12 under the control of the base unit. The repeater incorporates extension units 1 to 6 under the control of the repeater.

The slot in which the repeater transmits the downlink signal to an extension unit is an idle slot in the base unit, as described with reference to FIG. 3, and can be used for other communication. In FIG. 4, the base unit transmits the downlink signal to the extension units 7 to 12 in the idle slots. For example, the base unit uses slot 1 to transmit the downlink signal to extension unit 7. The base unit uses slot 3 to transmit the downlink signal to extension unit 8.

That is, the base unit can make simultaneous calls with 6 extension units 7 to 12 under the control of the base unit even in the state in which the base unit is making simultaneous calls with 6 extension units 1 to 6 via the repeater. That is, the base unit can make simultaneous calls with the 12 extension units.

Figure 5:
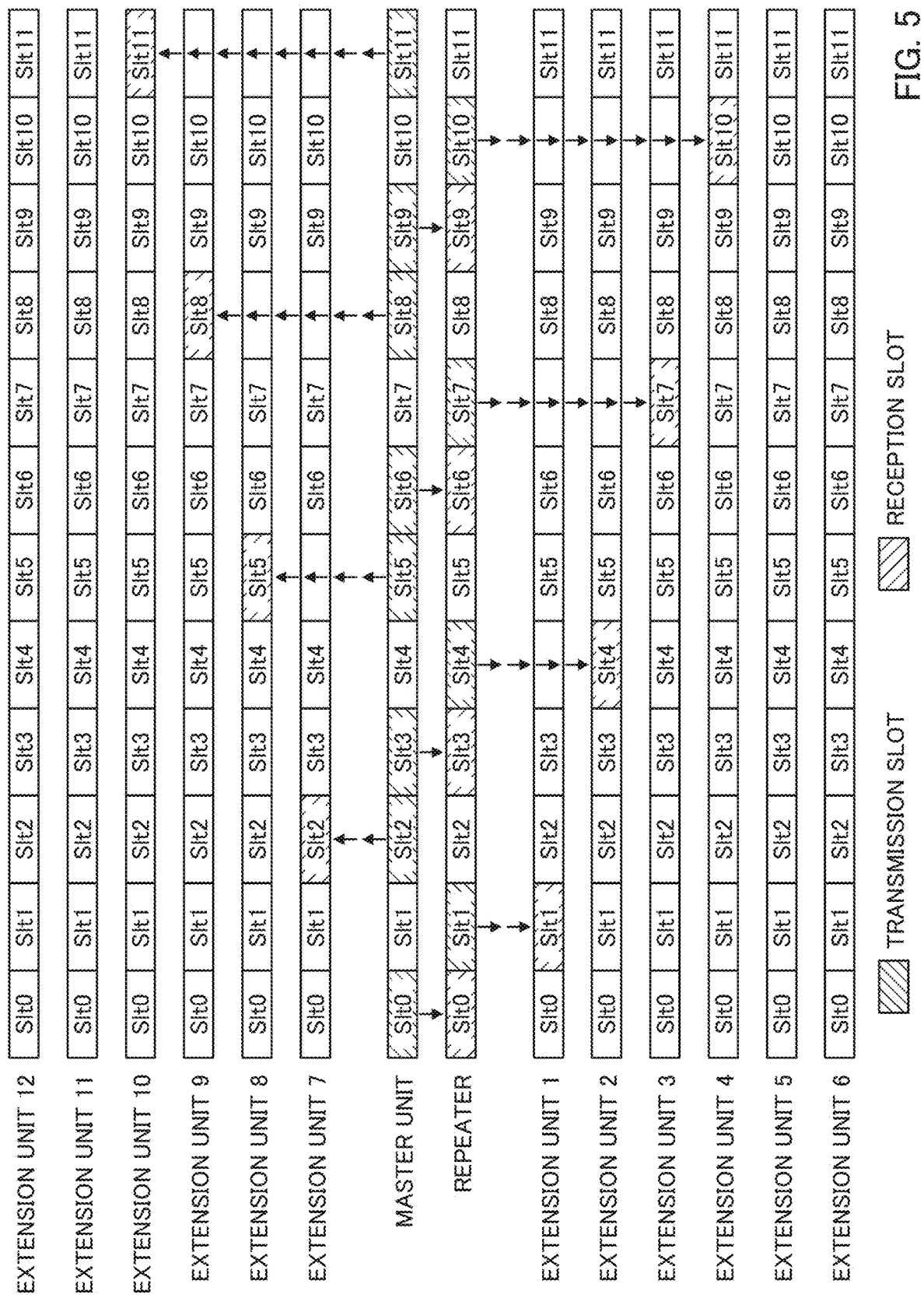
FIG. 5 describes another example of time slots used by the base unit and the repeater in the downlink.

FIG. 5 describes another example of the time slots used by the base unit and the repeater in the downlink. The base unit shown in FIG. 5 incorporates the repeater and extension units 7 to 12 under the control of the base unit. The repeater incorporates extension units 1 to 6 under the control of the repeater.

The repeater that is transmitting the downlink signal to an extension unit can receive no downlink signal from the base unit. That is, the base unit can transmit no downlink signal to the repeater when the repeater is transmitting the downlink signal to an extension unit. For example, the repeater is transmitting the downlink signal to extension unit 1 in slot 1. The base unit can therefore transmit no downlink signal to the repeater in slot 1.

In contrast, when the repeater is transmitting the downlink signal to an extension unit, the base unit can transmit a downlink signal to the extension units incorporated in the base unit. For example, the base unit can transmit a downlink signal to extension units 7 to 12.

In the example shown in FIG. 5, however, the extension unit 7 issues an access request in slot 2, and the base unit transmits a downlink signal to extension unit 7 in slot 2. The slot 2 used by the repeater is therefore an idle slot. If the extension unit 7 issues an access request in slot 1, and the base unit transmits a downlink signal in slot 2, the repeater can receive the downlink signal from the base unit in idle slot 2.

As described above, depending on the combination of slots to be used, the number of slots that allow communication between the base unit and the repeater decreases even when the base unit and the repeater each have idle slots. For example, in a case where the idle slots used by the base unit do not coincide with the idle slots used by the repeater, the number of slots that allow communication between the base unit and the repeater decreases. Therefore, in a cordless telephone system in which communication is established via a repeater, the number of simultaneous calls (number of call channels) undesirably decreases in some cases.

To solve the problem described above, base unit 1 in FIG. 1 generates first slot information (blind slot information) to be transmitted to cordless telephone 3 under the control of base unit 1 and second slot information (blind slot information) to be transmitted to repeater 2.

In the first slot information transmitted to cordless telephone 3, information on a slot in which access of cordless telephone 3 to base unit 1 is restricted is newly set as a blinded slot in addition to a slot having already been used by other communication (further access is prohibited). In the second slot information transmitted to repeater 2, information on a slot in which access of repeater 2 to base unit 1 is restricted is newly set as a blinded slot in addition to an access prohibited slot having already been used by other communication.

A slot in which access of cordless telephone 3 to base unit 1 is restricted differs from a slot in which access of repeater 2 to base unit 1 is restricted. For example, a slot in which access of cordless telephone 3 to base unit 1 is restricted is an even-numbered slot. A slot in which access of repeater 2 to base unit 1 is restricted is an odd-numbered slot. That is, cordless telephone 3 uses an odd-numbered slot to access base unit 1, and repeater 2 uses an even-numbered slot to access base unit 1.

Repeater 2 generates third slot information (blind slot information) to be transmitted to cordless telephone 4 under the control of repeater 2. The third slot information to be transmitted to cordless telephone 4 contains information on a slot being used by other communication and information on a slot in which access of repeater 2 to cordless telephone 4 is restricted.

A slot in which access of repeater 2 to cordless telephone 4 is restricted differs from a slot in which access of repeater 2 to base unit 1 is restricted. For example, a slot in which access of repeater 2 to base unit 1 is restricted is an odd-numbered slot in the example described above. A slot in which access of repeater 2 to cordless telephone 4 is restricted is therefore an even-numbered slot.

The above description has been made with reference to a downlink signal, and the same holds true for an uplink signal.

Figure 6:
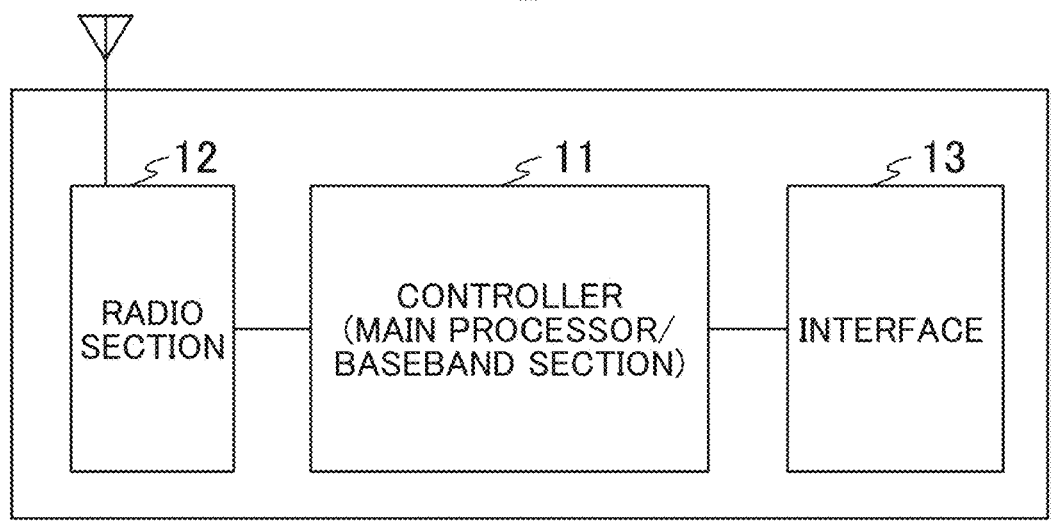
FIG. 6 shows an example of the block configuration of the base unit.

FIG. 6 shows an example of the block configuration of base unit 1. Base unit 1 includes controller 11, radio section 12, and interface 13, as shown in FIG. 6.

Controller 11 controls entire base unit 1. Controller 11 performs a baseband process. Controller 11 may be formed, for example, of a CPU (central processing unit) and/or a DSP (digital signal processor). Controller 11 may be called a main processor/baseband section.

Radio section 12 receives an uplink signal via an antenna. Radio section 12 amplifies, down-converts, and otherwise process the received uplink signal. Radio section 12 outputs the amplified, down-converted, and otherwise processed uplink signal to controller 11.

A downlink signal output from controller 11 is input to radio section 12. Radio section 12 amplifies, up-converts, and otherwise process the input downlink signal. Radio section 12 transmits the amplified, up-converted, and otherwise processed downlink signal via the antenna to repeater 2 or cordless telephone 3 under the control of base unit 1.

Interface 13 controls the communication between base unit 1 and a switcher or a server. For example, interface 13 transmits data output from controller 11 (signal received from repeater 2 or cordless telephone 3) to the switcher or the server. Interface 13 receives data transmitted from the switcher or the server (signal transmitted to repeater 2 or cordless telephone 3) and outputs the data to controller 11.

Figure 7:
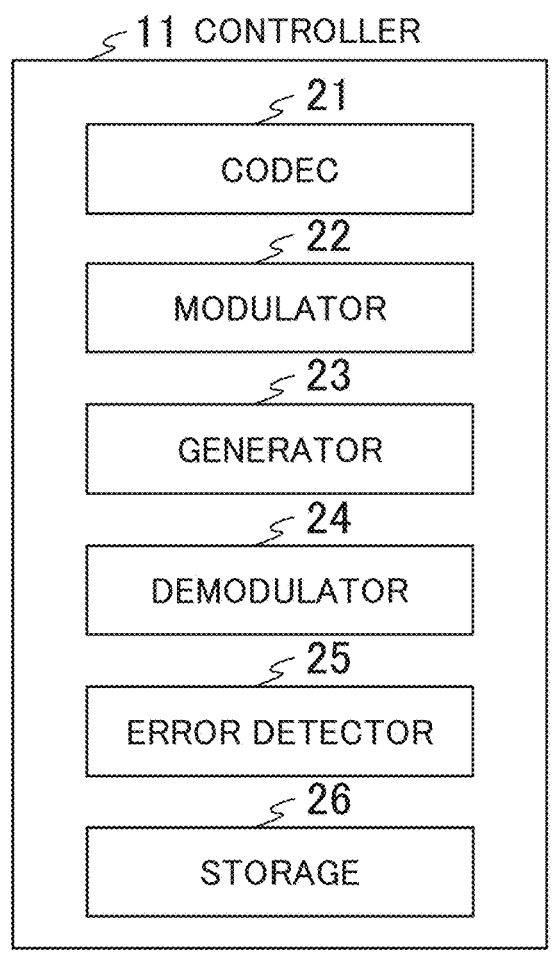
FIG. 7 shows an example of the block configuration of a controller of the base unit.

FIG. 7 shows an example of the block configuration of controller 11 of base unit 1. Controller 11 of base unit 1 includes codec 21, modulator 22, generator 23, demodulator 24, error detector 25, and storage 26, as shown in FIG. 7.

Codec 21 encodes (compresses) voice data (downlink signal) output from interface 13. Codec 21 outputs encoded voice data to modulator 22.

Codec 21 further decodes (expands) voice data demodulated by demodulator 24 (uplink signal). Codec 21 outputs the demodulated voice data to interface 13.

Modulator 22 modulates the voice data encoded by codec 21. Modulator 22 further modulates other data (control data and CRC (cyclic redundancy checking) data, for example).

Generator 23 generates the first slot information and the second slot information. Generator 23 outputs the generated first and second slot information to radio section 12. The first slot information output to radio section 12 is transmitted to cordless telephone 3 under the control of base unit 1. The second slot information output to radio section 12 is transmitted to repeater 2 under the control of base unit 1.

Demodulator 24 demodulates the signal transmitted from repeater 2 or cordless telephone 3 (uplink signal) and then output from radio section 12. The voice data contained in the demodulated signal (data) is output to and decoded by codec 21.

Error detector 25 detects an error in data demodulated by demodulator 24. For example, error detector 25 detect an error in data demodulated by demodulator 24 based on CRC.

Storage 26 stores, for example, a program in accordance with which controller 11 operates. Storage 26 further stores data for allowing controller 11 to perform calculation or data for allowing controller 11 to control each section of base unit 1. Storage 26 may be a component external to controller 11.

Figure 8:
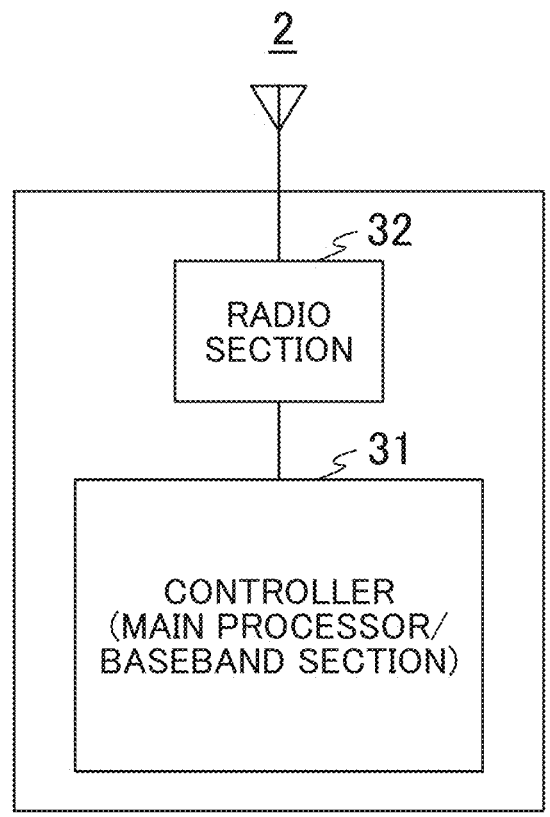
FIG. 8 shows an example of the block configuration of the repeater.

FIG. 8 shows an example of the block configuration of repeater 2. Repeater 2 includes controller 31 and radio section 32, as shown in FIG. 8.

Controller 31 controls entire repeater 2. Controller 31 performs a baseband process. Controller 31 may be formed, for example, of a CPU and/or a DSP. Controller 31 may be called a main processor/baseband section.

Radio section 32 receives an uplink signal transmitted from cordless telephone 4 via an antenna. Radio section 32 performs reception processing, such as amplification and down-conversion, on the received uplink signal. Radio section 32 outputs the uplink signal having undergone the reception processing to controller 31.

An uplink signal output from controller 31 (signal transmitted to base unit 1) is input to radio section 32. Radio section 32 performs transmission processing, such as amplification and up-conversion, on the input uplink signal. Radio section 32 transmits the uplink signal having undergone the transmission processing to base unit 1 via the antenna.

Radio section 32 receives a downlink signal transmitted from base unit 1 via the antenna. Radio section 32 performs the reception processing, such as amplification and down-conversion, on the received downlink signal. Radio section 32 outputs the downlink signal having undergone the reception processing to controller 31.

A downlink signal output from controller 31 (signal transmitted to cordless telephone 4) is input to radio section 32. Radio section 32 performs the transmission processing, such as amplification and up-conversion, on the input downlink signal. Radio section 32 transmits the downlink signal having undergone the transmission processing to cordless telephone 4 via the antenna.

Figure 9:
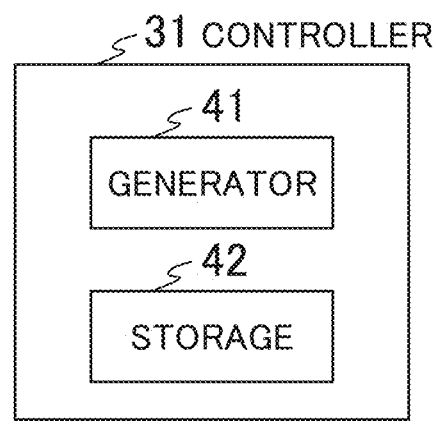
FIG. 9 shows an example of the block configuration of a controller of the repeater.

FIG. 9 shows an example of the block configuration of controller 31 of repeater 2. Controller 31 of repeater 2 includes generator 41 and storage 42, as shown in FIG. 9.

Generator 41 generates the third slot information. Generator 41 outputs the generated third slot information to radio section 32. The third slot information output to radio section 32 is transmitted to cordless telephone 4 under the control of repeater 2.

Storage 42 stores, for example, a program in accordance with which controller 31 operates. Storage 42 further stores data for allowing controller 31 to perform calculation or data for allowing controller 31 to control each section of repeater 2. Storage 42 may be a component external to controller 31.

Figure 10:
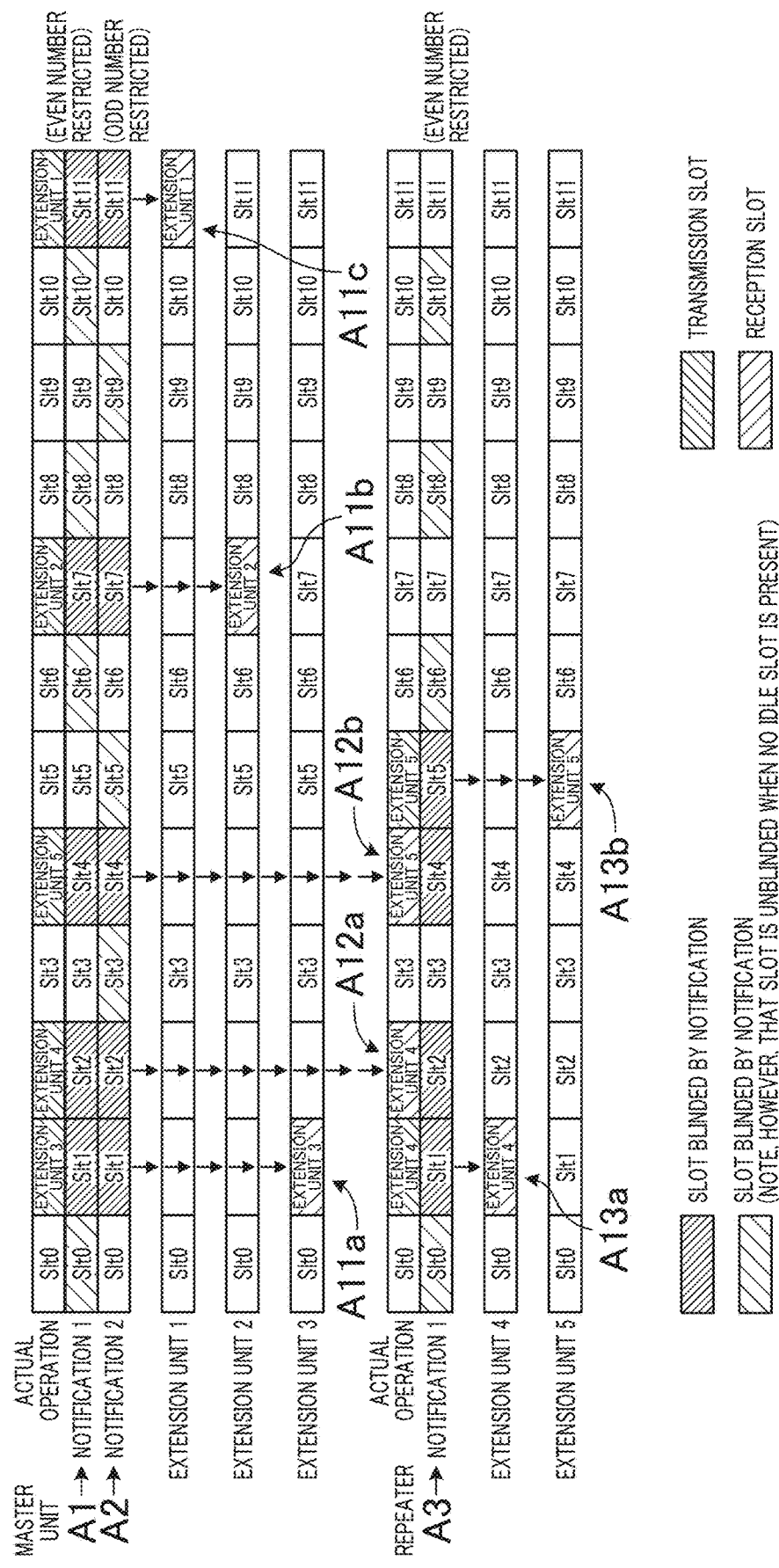
FIG. 10 describes an example of downlink time slots in the cordless telephone system shown in FIG. 1.

FIG. 10 describes an example of the downlink time slots in the cordless telephone system shown in FIG. 1. The base unit shown in FIG. 10 corresponds to base unit 1 shown in FIG. 1. The repeater shown in FIG. 10 corresponds to repeater 2 shown in FIG. 1.

Extension units 1 to 3 shown in FIG. 10 represent cordless telephones under the control of the base unit shown in FIG. 10. Extension units 4 and 5 shown in FIG. 10 represent cordless telephones under the control of the repeater shown in FIG. 10.

Notification 1 indicated by arrow A1 in FIG. 10 corresponds to the first slot information. Notification 1 indicated by arrow A1 is generated by controller 11 (generator 23) of base unit 1. Notification 2 indicated by arrow A2 in FIG. 10 corresponds to the second slot information. Notification 2 indicated by arrow A2 is generated by controller 11 (generator 23) of base unit 1. Notification 1 indicated by arrow A3 in FIG. 10 corresponds to the third slot information. Notification 1 indicated by arrow A3 is generated by controller 31 (generator 41) of repeater 2.

Notification 1 is blind slot information that extension units refer to. For example, notification 1 indicated by arrow A1 in FIG. 10 is blind slot information transmitted from the base unit to extension units 1 to 3. Notification 1 indicated by arrow A3 in FIG. 10 is blind slot information transmitted from the repeater to extension units 4 and 5.

Notification 2 is blind slot information that the repeater refers to. For example, notification 2 indicated by arrow A2 in FIG. 10 is blind slot information transmitted from the base unit to the repeater.

The base unit generates notification 1 notifying that use of the even-numbered slots is restricted. For example, the base unit generates notification 1 notifying that slots 0, 2, 4, 6, 8, and 10 are blinded (access restricted). Extension units 1 to 3 under the control of the base unit each select an idle slot out of odd-numbered slots 1, 3, 5, 7, 9, and 11 (non-blinded slots) and receive a downlink signal from the base unit. That is, extension units 1 to 3 under the control of the base unit each issue an access request to the odd-numbered slots not used by the rest of extension units 1 to 3 out of odd-numbered slots 1, 3, 5, 7, 9, and 11 (odd-numbered slots not used by the rest of extension units 1 to 3 so that an access request issued thereto is not prohibited) and receive a downlink signal from the base unit.

Extension units 1 to 3 under the control of the base unit issue access requests to the base unit in the odd-numbered slots 1, 7, and 11, in which no access restriction is imposed, and receive downlink signals, as indicated by arrows A11a to A11c in FIG. 10. Odd-numbered slots 1, 7, and 11 used by the base unit and notified by notifications 1 and 2 are therefore blinded.

The base unit generates notification 2 notifying restriction of use of the odd-numbered slots, which do not coincide with the even-numbered slots so notified by notification 1 as not to be used. For example, the base unit generates notification 2 notifying that slots 1, 3, 5, 7, 9, and 11 are blinded. The repeater under the control of the base unit therefore selects an idle slot out of even-numbered slots 0, 2, 4, 6, 8, and 10 and receives a downlink signal from the base unit.

The repeater under the control of the base unit issues access requests to the base unit in even-numbered slots 2 and 4, in which no access restriction is imposed, and receive downlink signals, as indicated by arrows A12*a* and A12*b* in FIG. 10. Even-numbered slots 2 and 4 used by the base unit and notified by notifications 1 and 2 are therefore blinded.

The repeater generates notification 1 notifying restriction of use of the even-numbered slots, which differ from the odd-numbered slots so notified by notification 2 from the base unit as not to be used. For example, the repeater generates notification 1 notifying that slots 0, 2, 4, 6, 8, and 10 are blinded. The extension units 4 and 5 under the control of the repeater each select an idle slot out of odd-numbered slots 1, 3, 5, 7, 9, and 11, issue an access request, and receive a downlink signal from the repeater.

The extension units 4 and 5 under the control of the repeater issue access requests to the repeater in odd-numbered slots 1 and 5, in which no access restriction is imposed, and receive downlink signals, as indicated by arrows A13*a* and A13*b* in FIG. 10. Odd-numbered slots 1 and 5 used by the repeater and notified by notification 1 are therefore blinded. The repeater issues access requests to the base unit in even-numbered slots 2 and 4, in which no access restriction is imposed, and receives downlink signals, as indicated by arrows A12*a* and A12*b* in FIG. 10. Even-numbered slots 2 and 4 used by the repeater and notified by notification 1 are therefore blinded.

In a case where there is no slot in which the extension units under the control of the base unit have access, the base unit may lift the access restriction. For example, in a case where all the odd-numbered slots are used by the extension units, the base unit may lift the access restriction imposed by notification 1 on the even-numbered slots (unblind even-numbered slots blinded by notification 1). The extension units under the control of the base unit therefore have access also in the even-numbered slots.

In a case where there is no slot in which the repeater under the control of the base unit has access, the base unit may lift the access restriction. For example, in a case where all the even-numbered slots are used by the repeater, the base unit may lift the access restriction imposed by notification 2 on the odd-numbered slots (unblind odd-numbered slots blinded by notification 2). The repeater under the control of the base unit therefore has access also in the odd-numbered slots.

In a case where there is no slot in which the extension units under the control of the repeater has access, the repeater may lift the access restriction. For example, in a case where all the odd-numbered slots are used by the extension units, the repeater may lift the access restriction imposed by notification 1 on the even-numbered slots (unblind even-numbered slots blinded by notification 1). The extension units under the control of the repeater therefore have access also in the even-numbered slots.

As described above, controller 11 of base unit 1 generates notification 1 showing a slot in which cordless telephone 3 under the control of base unit 1 can access base unit 1 (first slot information) and notification 2 showing a slot in which repeater 2 under the control of base unit 1 can access base unit 1 (second slot information). In this process, controller 11 generates notification 1 that notifies restriction of an access request issued to the even-numbered slots and notification 2 that notifies restriction of an access request issued to the odd-numbered slots. Radio section 12 transmits notification 1 to cordless telephone 3 and notification 2 to repeater 2. Base unit 1 can thus suppress a decrease in the number of call channels of each of the cordless telephones.

The above description has been made with reference to the downlink operation, and the same holds true for the uplink operation.

The slots in which access is restricted are not necessarily classified into even-numbered slots and odd-numbered slots. For example, base unit 1 may generate notification 1 notifying that access to a first slot group of a plurality of slots in a predetermined period (one frame, for example) is restricted and notification 2 notifying that access to a second slot group that is the remainder of the plurality of slots excluding the first slot group is restricted. More specifically, base unit 1 may generate notification 1 notifying that access to slots 0, 1, 4, 5, 8, and 9 (first slot group) out of downlink slots 0 to 11 is restricted. Base unit 1 may further generate notification 2 notifying that access to slots 0, 2, 3, 6, 7, 10, and 11 (second slot group) out of downlink slots 0 to 11 excluding the first slot group is restricted.

The even-numbered slots on which access restriction is imposed by notification 1 and the odd-numbered slots on which access restriction is imposed by notification 2 may be called reserved slots.

Embodiment 2

Embodiment 2 will be described with reference to a case where repeaters are connected to each other in a cascade fashion.

Figure 11:
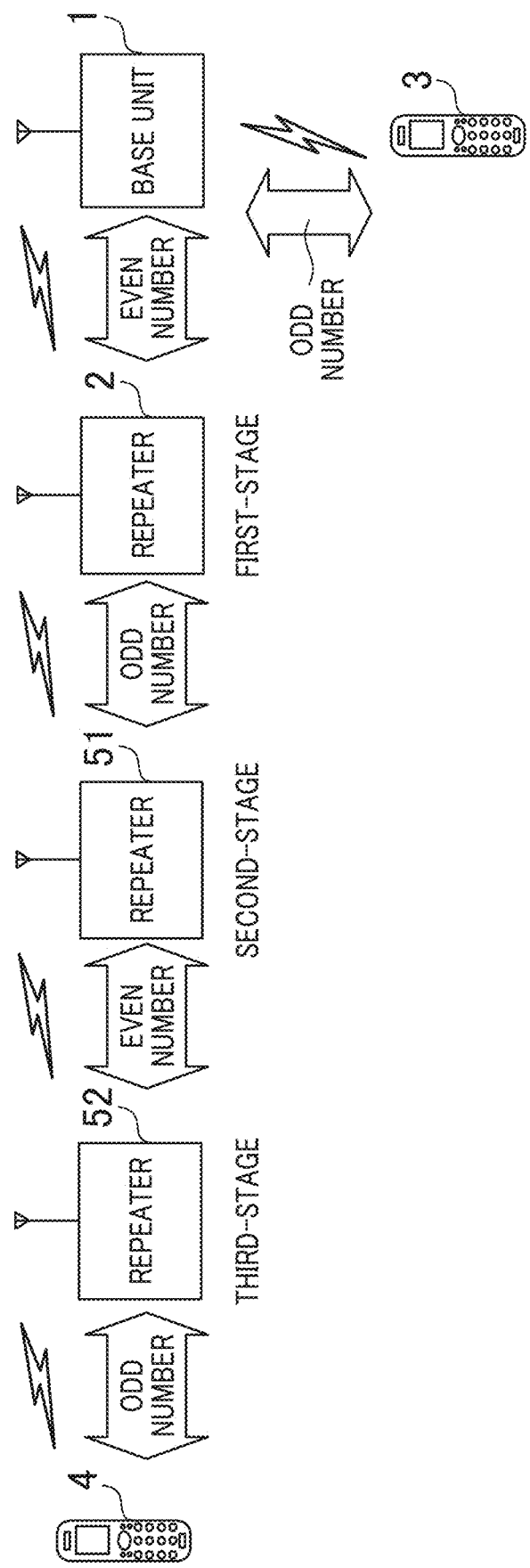
FIG. 11 shows an example of the configuration of a cordless telephone system according to Embodiment 2.

FIG. 11 shows an example of the configuration of a cordless telephone system according to Embodiment 2. In FIG. 11, the same components as those in FIG. 1 have the same reference characters. Repeater 2, 51, and 52 are connected to each other in a cascade fashion with base unit 1 located in the front position of the cascade (0-th stage), as shown in FIG. 11. For example, repeater 2 is disposed under the control of base unit 1. Repeater 51 is disposed under the control of repeater 2. Repeater 52 is disposed under the control of repeater 51. Repeaters 51 and 52 each have the same block configuration as the block configurations shown in FIGS. 8 and 9.

Cordless telephone 4 is under the control of repeater 52. To communicate with base unit 1, cordless telephone 4 communicates base unit 1 via repeaters 52, 51, and 2.

Repeater 2, 51, and 52 can be considered to function as both the base unit and an extension unit. For example, repeater 2 can be considered to serve as an extension unit with respect to base unit 1 and as the base unit with respect to repeater 51. Repeater 51 can be considered to serve as an extension unit with respect to repeater 2 and as the base unit with respect to repeater 52. Repeater 52 can be considered to serve as an extension unit with respect to repeater 51 and as the base unit with respect to cordless telephone 4.

Base unit 1 uses an odd-numbered slot to communicate with cordless telephone 3 under the control of base unit 1. Base unit 1 uses an even-numbered slot to communicate with repeater 2 under the control of base unit 1.

Repeater 2, 51, and 52 each reverse the slot to be used depending on the number of the stage where the repeater is located, an odd-numbered stage or an even-numbered stage. For example, first-stage repeater 2 under the control of base unit 1 uses an even-numbered slot to communicate with base unit 1. Repeater 2 therefore uses an odd-numbered slot to communicate with repeater 51.

Second-stage repeater 51 under the control of repeater 2 uses an odd-numbered slot to communicate with repeater 2. Repeater 51 therefore uses an even-numbered slot to communicate with repeater 52 under the control of repeater 51.

Third-stage repeater 52 under the control of repeater 51 uses an even-numbered slot to communicate with repeater 51. Repeater 52 therefore uses an odd-numbered slot to communicate with cordless telephone 4 under the control of repeater 52.

That is, repeaters 2, 51, and 52 each reverse an odd-numbered slot and an even-numbered slots in such a way that the slot used on the upstream of the repeater (side facing base unit) do not coincide with the slot used on the downstream of the repeater (side facing repeater 52).

As described above, the cordless telephone system differentiates slots usable by repeater 2 and the cordless telephone 3 under the control of base unit 1 from each other (for example, uses odd-numbered slot and even-numbered slot, as described above). Repeater 2, 51, and 52 each differentiate slots used for communication from each other based on the number of the stage where the repeater is connected. The cordless telephone system thus suppresses a decrease in the number of simultaneous calls.

Base unit 1 may communicate with cordless telephone 3 by using an even-numbered slot. In this case, base unit 1 communicates with first-stage repeater 2 by using an odd-numbered slot. First-stage repeater 2 communicates with second-stage repeater 51 by using an even-numbered slot. Second-stage repeater 51 communicates with third-stage repeater 52 by using an odd-numbered slot. Third-stage repeater 52 communicates with cordless telephone 4 under the control of repeater 52 by using an even-numbered slot.

FIG. 11 shows only one cordless telephone 3 as the cordless telephone that wirelessly communicates with base unit 1, and a plurality of cordless telephones 3 may be present. FIG. 11 similarly shows only one cordless telephone 4 as the cordless telephone that wirelessly communicates with base unit 1 via repeaters 52, 51, and 2, and a plurality of cordless telephones 4 may be present. One or more cordless telephones may be present under the control of repeater 2. One or more cordless telephones may be present under the control of repeater 51.

Repeater 2 generates the third slot information to be transmitted to cordless telephone under the control of repeater 2, as described with reference to FIG. 9. Repeater 2 further generates fourth slot information (blind slot information) to be transmitted to repeater 51 under the control of repeater 2.

Repeater 51 also generates the third slot information to be transmitted to a cordless telephone under the control of repeater 51 and the fourth slot information to be transmitted to repeater 52 under the control of repeater 51. Repeater 52 also further generates the third slot information to be transmitted to cordless telephone 4 under the control of repeater 52. Although no repeater is present under the control of repeater 52, repeater 52 may generate the fourth slot information.

Figure 12:
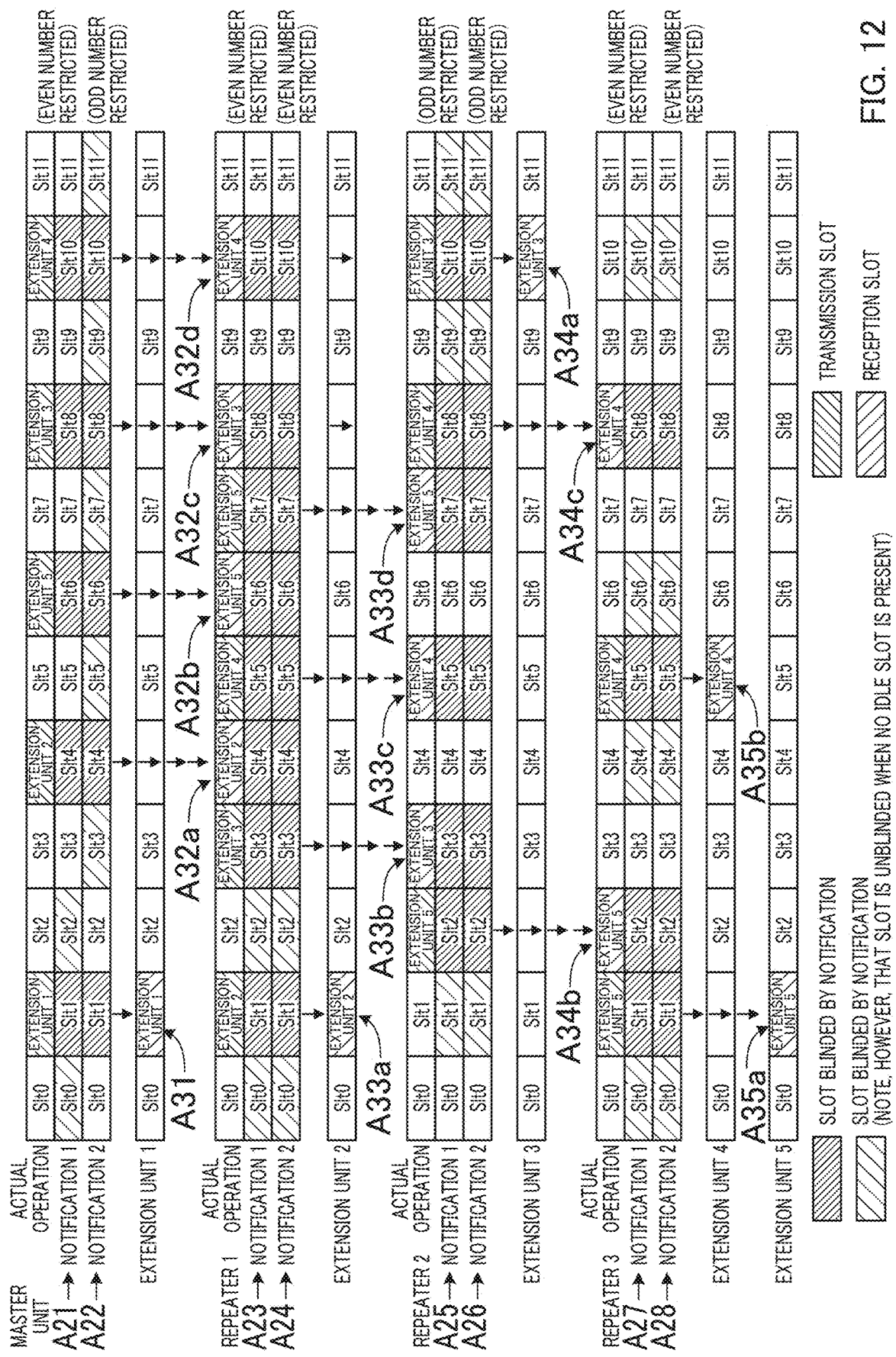
FIG. 12 describes an example of downlink time slots in the cordless telephone system shown in FIG. 11.

FIG. 12 describes an example of the downlink time slots in the cordless telephone system shown in FIG. 11. The base unit shown in FIG. 12 corresponds to base unit 1 shown in FIG. 11. Repeater 1 shown in FIG. 12 corresponds to repeater 2 shown in FIG. 11. Repeater 2 shown in FIG. 12 corresponds to repeater 51 shown in FIG. 11. Repeater 3 shown in FIG. 12 corresponds to repeater 52 shown in FIG. 11.

Extension unit 1 shown in FIG. 12 represents a cordless telephone under the control of the base unit shown in FIG. 12. Extension unit 2 shown in FIG. 12 represents a cordless telephone under the control of repeater 1 shown in FIG. 12. Extension unit 3 shown in FIG. 12 represents a cordless telephone under the control of repeater 2 shown in FIG. 12. Extension units 4 and 5 shown in FIG. 12 represent cordless telephones under the control of repeater 3 shown in FIG. 12. The configuration of the extension units shown in FIG. 12 partly differs from the configuration of the extension units shown in FIG. 11. For example, extension units corresponding to extension units 2, 3, and 5 shown in FIG. 12 are not shown in FIG. 11.

Notification 1 is blind slot information that the extension units refer to. For example, notification 1 indicated by arrow A21 in FIG. 12 is blind slot information transmitted from the base unit to extension unit 1. Notification 1 indicated by arrow A23 in FIG. 12 is blind slot information transmitted from repeater 1 to extension unit 2. Notification 1 indicated by arrow A25 in FIG. 12 is blind slot information transmitted from repeater 2 to extension unit 3. Notification 1 indicated by arrow A27 in FIG. 12 is blind slot information transmitted from repeater 3 to extension units 4 and 5. Notification 1 indicated by arrows A23, A25, and A27 in FIG. 12 corresponds to the third slot information transmitted from the repeaters to the extension units under the control thereof.

Notification 2 is blind slot information that the repeaters refer to. For example, notification 2 indicated by arrow A22 in FIG. 12 is blind slot information transmitted from the base unit to repeater 1. Notification 2 indicated by arrow A24 in FIG. 12 is blind slot information transmitted from repeater 1 to repeater 2. Notification 2 indicated by arrow A26 in FIG. 12 is blind slot information transmitted from repeater 2 to repeater 3. Notification 2 indicated by arrow A28 in FIG. 12 is blind slot information transmitted from repeater 3 to a repeater under the control of repeater 3 (not present in examples shown in FIG. 12). Notification 2 indicated by arrows A24, A26, and A28 in FIG. 12 corresponds to the fourth slot information transmitted from the repeaters to the repeaters under the control thereof.

The base unit generates notification 1 notifying that use of the even-numbered slots is restricted. For example, the base unit generates notification 1 notifying that slots 0, 2, 4, 6, 8, and 10 are blinded. Extension unit 1 under the control of the base unit selects an idle slot out of odd-numbered slots 1, 3, 5, 7, 9, and 11 and receives a downlink signal from the base unit. That is, extension unit 1 under the control of the base unit accesses an odd-numbered slot not used by the other extension units out of odd-numbered slots 1, 3, 5, 7, 9, and 11 (odd-numbered slots not used by the other extension units so that access thereto is not prohibited) and receives a downlink signal from the base unit.

Extension unit 1 under the control of the base unit issues an access request to the base unit in the odd-numbered slot 1, in which no access restriction is imposed, and receives a downlink signal, as indicated by arrow A31 in FIG. 12. Odd-numbered slot 1 used by the base unit and notified by notifications 1 and 2 are therefore blinded.

The base unit generates notification 2 notifying restriction of use of the odd-numbered slots, which do not coincide with the even-numbered slots so notified by notification 1 as not to be used. For example, the base unit generates notification 2 notifying that slots 1, 3, 5, 7, 9, and 11 are blinded. Repeater 1 under the control of the base unit therefore selects an idle slot out of even-numbered slots 0, 2, 4, 6, 8, and 10 and receives a downlink signal from the base unit.

Repeater 1 under the control of the base unit issues access requests to the base unit in even-numbered slots 4, 6, 8, and 10, in which no access restriction is imposed, and receives downlink signals, as indicated by arrows A32*a* to A32*d* in FIG. 12. Even-numbered slots 4, 6, 8, and 10 used by the base unit and notified by notifications 1 and 2 are therefore blinded.

Repeater 1 generates notification 1 and notification 2 notifying restriction of use of the even-numbered slots, which do not coincide with the odd-numbered slots so notified by the base unit as not to be used. In other words, repeater 1 generates notifications 1 and 2 notifying the same access restriction (even number restriction) as the access restriction notified by notification 1 notifying access restriction on extension unit 1 under the control of the base unit (even number restriction). For example, repeater 1 generates notifications 1 and 2 notifying that slots 0, 2, 4, 6, 8, and 10 are blinded. Extension unit 2 and repeater 2 under the control of repeater 1 therefore select idle slots out of odd-numbered slots 1, 3, 5, 7, 9, and 11 and receive downlink signals from repeater 1.

Extension unit 2 under the control of repeater 1 issues an access request to repeater 1 in odd-numbered slot 1, in which no access restriction is imposed, and receives a downlink signal, as indicated by arrow A33a in FIG. 12. Repeater 2 under the control of repeater 1 issues access requests to repeater 1 in odd-numbered slots 3, 5, and 7, in which no access restriction is imposed, and receives downlink signals, as indicated by arrows A33b to A33d in FIG. 12. Odd-numbered slots 1, 3, 5, and 7 used by repeater 1 and notified by notifications 1 and 2 are therefore blinded. Repeater 1 issues access requests to the base unit in even-numbered slots 4, 6, 8, and 10, in which no access restriction is imposed, and receives downlink signals, as indicated by arrows A32a to A32d in FIG. 12. Even-numbered slots 4, 6, 8, and 10 used by repeater 1 and notified by notifications 1 and 2 are therefore blinded.

Repeater 2 generates notification 1 and notification 2 notifying restriction of use of the odd-numbered slots, which do not coincide with the even-numbered slots so notified by repeater 1 as not to be used. For example, repeater 2 generates notifications 1 and 2 notifying that slots 1, 3, 5, 7, 9, and 11 are blinded. Extension unit 3 and repeater 3 under the control of repeater 2 therefore select idle slots out of even-numbered slots 0, 2, 4, 6, 8, and 10 and receive downlink signals from repeater 2.

Extension unit 3 under the control of repeater 2 issues an access request to repeater 1 in even-numbered slot 10, in which no access restriction is imposed, and receives a downlink signal, as indicated by arrow A34a in FIG. 12. Repeater 3 under the control of repeater 2 issues access requests to repeater 2 in even-numbered slots 2 and 8, in which no access restriction is imposed, and receives downlink signals, as indicated by arrows A34b and A34c in FIG. 12. Even-numbered slots 2, 8, and 10 used by repeater 2 and notified by notifications 1 and 2 are therefore blinded. Repeater 2 issues access requests to repeater 1 in odd-numbered slots 3, 5, and 7, in which no access restriction is imposed, and receives downlink signals, as indicated by arrows A33b to A33d in FIG. 12. Odd-numbered slots 3, 5, and 7 used by repeater 2 and notified by notifications 1 and 2 are therefore blinded.

Repeater 3 generates notification 1 and notification 2 notifying restriction of use of the even-numbered slots, which do not coincide with the odd-numbered slots so notified by repeater 2 as not to be used. For example, repeater 3 generates notifications 1 and 2 notifying that slots 0, 2, 4, 6, 8, and 10 are blinded. Extension units 4 and 5 under the control of repeater 3 therefore select idle slots out of odd-numbered slots 1, 3, 5, 7, 9, and 11 and receive downlink signals from repeater 3.

Extension units 4 and 5 under the control of repeater 3 issues access requests to repeater 3 in odd-numbered slots 1 and 5, in which no access restriction is imposed, and receive downlink signals, as indicated by arrows A35a and A35b in FIG. 12. Odd-numbered slots 1 and 5 used by repeater 3 and notified by notifications 1 and 2 are therefore blinded. Repeater 3 issues access requests to repeater 2 in even-numbered slots 2 and 8, in which no access restriction is imposed, and receives downlink signals, as indicated by arrows A34b and A34c in FIG. 12. Even-numbered slots 2 and 8 used by repeater 3 and notified by notifications 1 and 2 are therefore blinded.

In the case where there is no idle slot, the base unit and repeaters 1 to 3 may lift the access restriction, as in Embodiment 1. For example, in a case where all the odd-numbered slots are used by the extension units and repeater 2, repeater 1 may lift the access restriction imposed by notification 1 and 2 on the even-numbered slots (unblind even-numbered slots blinded by notifications 1 and 2 excluding access-prohibited slot). Extension unit 2 and repeater 2 under the control of repeater 1 therefore have access also in the even-numbered slots.

FIG. 13 describes an example of the access restriction performed by the base unit and the repeaters. The base unit and the repeaters notify the extension units and the repeaters under the control thereof by using notifications 1 and 2 of information on a slot in use, as shown in the field labeled "Level 0" in FIG. 13.

The base unit and the repeaters use notifications 1 and 2 to notify the devices under the control thereof of information on a slot in which access is restricted, as shown in the field labeled "Level 1" in FIG. 13. For example, the base unit uses notification 1 to notify an extension unit under the control thereof of information representing that access to the even-numbered slots is restricted. The base unit uses notification 2 to notify a repeater under the control thereof of information representing that access to the odd-numbered slots is restricted. A repeater at an even-numbered stage uses notifications 1 and 2 to notify an extension unit and a repeater under the control thereof of information representing that access to the even-numbered slots is restricted. A repeater at an odd-numbered stage uses notifications 1 and 2 to notify an extension unit and a repeater under the control thereof of information representing that access to the odd-numbered slots is restricted.

The base unit and the repeaters typically operate at level 0 or 1. For example, the base unit notifies an extension unit under the control thereof of notification 1 containing information on a slot in use (level 0) and information on an even-numbered slot in which access is restricted (level 1). The base unit further notifies a repeater under the control thereof of notification 2 containing information on a slot in use and information on an even-numbered slot in which access is restricted.

A repeater at an odd-numbered stage notifies an extension unit under the control thereof of notification 1 containing information on a slot in use and information on an even-numbered slot in which access is restricted. A repeater at an odd-numbered stage further notifies a repeater under the control thereof of notification 2 containing information on a slot in use and information on an even-numbered slot in which access is restricted.

A repeater at an even-numbered stage notifies an extension unit under the control thereof of notification 1 containing information on a slot in used and information on an odd-numbered slot in which access is restricted. A repeater at an even-numbered stage further notifies a repeater under the control thereof of notification 2 containing information on a slot in use and information on an odd-numbered slot in which access is restricted.

In the case where there is no idle slot in the level-0 and level-1 operation, the base unit and the repeaters may lift the level-1 restriction. That is, the base unit and the repeaters notify an extension unit and a repeater under the control thereof of notifications 1 and 2 containing the information on a slot in use.

As described above, the controller of each repeater generates notifications 1 and 2 each showing a slot that a cordless telephone and a repeater under the control of the repeater can access. In this process, in a case where the repeater is disposed at an odd-numbered stage in the cascade connection with base unit 1 located in the front position of the cascade, the controller of the repeater generates notifications 1 and 2 notifying restriction of access to a slot group (even-numbered slots, for example) having the same slot number as that of a first slot group (even-numbered slots) in which base unit 1 restricts access to a cordless telephone under the control of base unit 1. Further, in a case where the repeater is disposed at an even-numbered stage in the cascade connection with base unit 1 located in the front position of the cascade, the controller of the repeater generates notifications 1 and 2 notifying restriction of access to a slot group (odd-numbered slots, for example) having the same slot number as that of a remaining second slot group (odd-numbered slots) excluding the first slot group (even-numbered slots, for example) in which base unit 1 restricts access to a cordless telephone under the control of base unit 1. The cordless telephone system can thus suppress a decrease in the number of call channels of the cordless telephone.

The above description has been made with reference to the downlink operation, and the same holds true for the uplink operation. The slots in which access is restricted are not necessarily classified into even-numbered slots and odd-numbered slots, as in Embodiment 1.

Each repeater may evaluate the number of the stage to which the repeater is connected in the cascade connection and determine access restricted slots (even-numbered slots or odd-numbered slots) based on the result of the evaluation.

Embodiments 1 and 2 have been described with reference to the case where each frame is a full-slot frame, and the present disclosure is also applicable to a case where each frame is a long-slot or half-slot frame.

Figure 14:
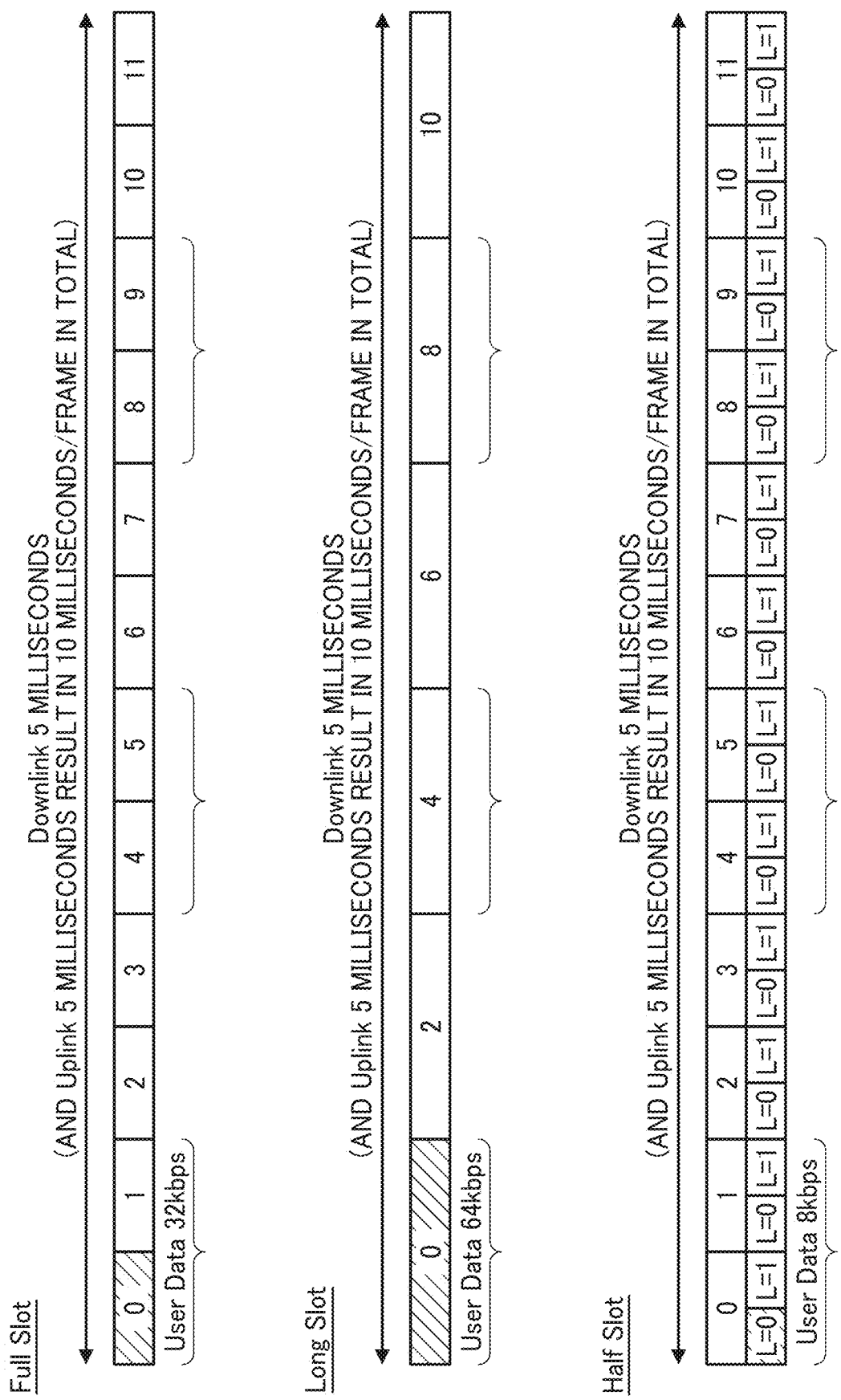
FIG. 14 describes a full-slot frame, a long-slot frame, and a half-slot frame.

FIG. 14 describes the full-slot frame, the long-slot frame, and the half-slot frame. In the DECT method, three types of frame, the full-slot frame, the long-slot frame, and the half-slot frame, are defined. The full-slot downlink frame is formed of 12 slots, as shown in FIG. 14. The long-slot downlink frame is formed of 6 slots.

The half-slot frame is formed of 12 slots, each of which is further divided into two slots, L=0 and L=1. The half-slot frame is therefore formed of 24 slots.

Base unit 1 may access a full-slot frame in such a way that slots 0, 1, 4, 5, 8, and 9 are slots in which access, for example, to cordless telephone 3 is restricted and slots 2, 3, 6, 7, 10, and 11 are slots in which access, for example, to repeater 2 is restricted. Classification of the slots in which access is restricted as described above allows software corresponding to the long-slot frame and the half-slot frame to be readily created.

For example, slots 0, 4, and 8 of the long-slot frame can be the slots in which access to cordless telephone 3 is restricted, and slots 2, 6, and 10 of the long-slot frame can be the slots in which access to repeater 2 is restricted.

Further, slots 0, 1, 4, 5, 8, and 9 of the half-slot frame can be the slots in which access to cordless telephone 3 is restricted, and slots 2, 3, 6, 7, 10, and 11 of the long-slot frame can be the slots in which access to repeater 2 is restricted.

Embodiment 3

In a third embodiment, to ensure communication between the repeater and the base unit in a case where idle slots in the repeater coincide with idle slots in the base unit, the repeater restricts access of a cordless telephone and a repeater under the control of the repeater to the idle slots that coincide with each other. Further, to ensure communication between the repeater and an upstream repeater in a case where idle slots in the repeater coincide with idle slots in the upstream repeater, the repeater restricts access of a cordless telephone and a repeater under the control of the repeater to the idle slots that coincide with each other. The following description will be made of portions different from those in Embodiment 2.

Controller 11 of base unit 1 generates slot information (blind slot information) to be transmitted to cordless telephone 3 and repeater 2 under the control of base unit 1. The slot information contains information on a slot in use.

Controller 31 of repeater 2 generates slot information (blind slot information) to be transmitted to cordless telephone 3 and repeater 51 under the control of repeater 2. The slot information contains information on a slot in use and information on a slot in which access to the cordless telephone and repeater 51 under the control of repeater 2 is restricted. Repeaters 51 and 52 each also generate the same slot information as that generated by repeater 2.

Figure 15:
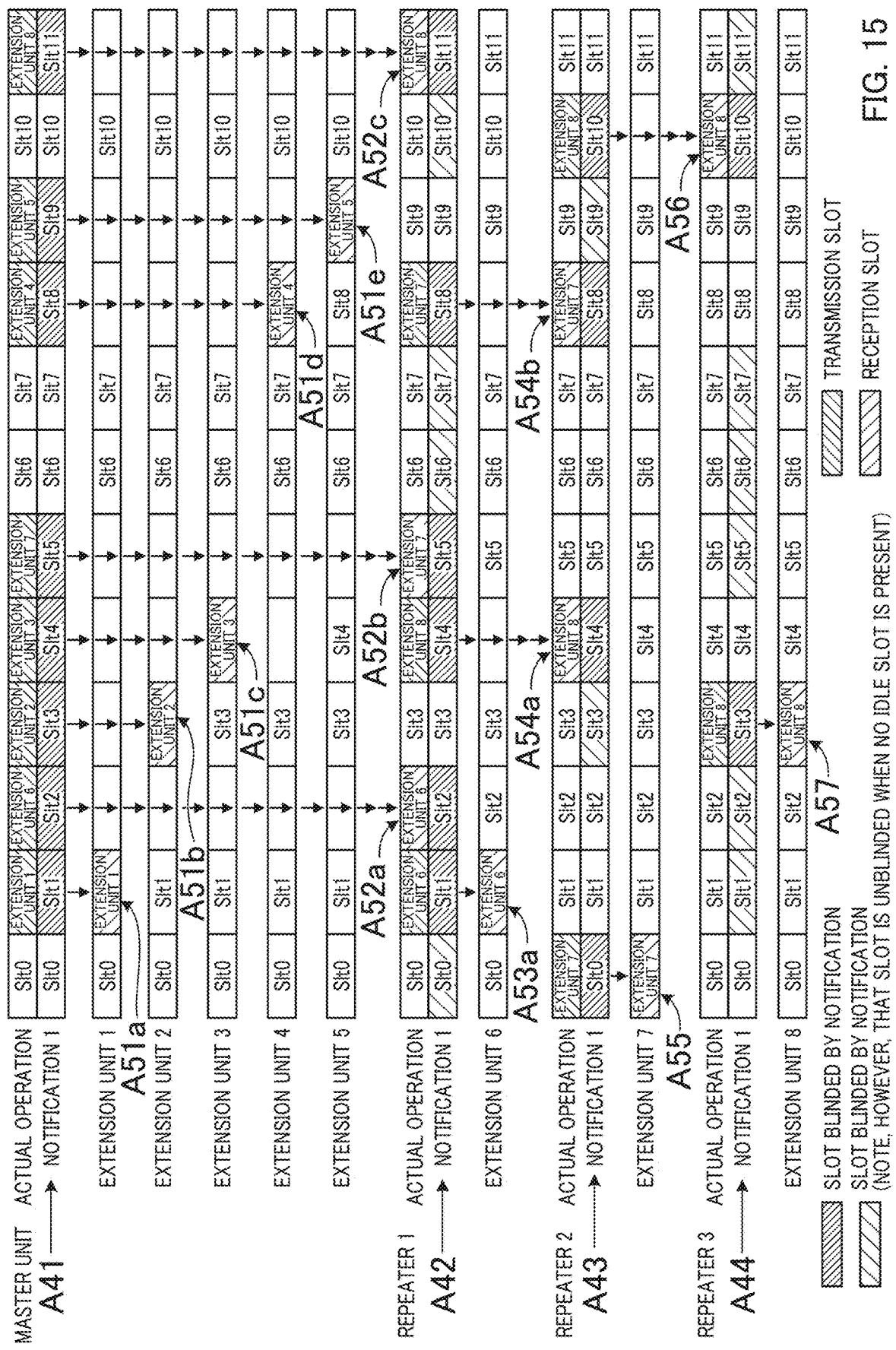
FIG. 15 describes an example of downlink time slots in a cordless telephone system according to Embodiment 3.

FIG. 15 describes an example of the downlink time slots in a cordless telephone system according to Embodiment 3. The base unit shown in FIG. 15 corresponds to base unit 1 shown in FIG. 11. Repeater 1 shown in FIG. 15 corresponds to repeater 2 shown in FIG. 11. Repeater 2 shown in FIG. 15 corresponds to repeater 51 shown in FIG. 11. Repeater 3 shown in FIG. 15 corresponds to repeater 52 shown in FIG. 11. The odd and even numbers shown in FIG. 11 have nothing to do with Embodiment 3.

Extension units 1 to 5 shown in FIG. 15 represent cordless telephones under the control of the base unit shown in FIG. 15. Extension unit 6 shown in FIG. 15 represents a cordless telephone under the control of repeater 1 shown in FIG. 15. Extension unit 7 shown in FIG. 15 represents a cordless telephone under the control of repeater 2 shown in FIG. 15. Extension unit 8 shown in FIG. 15 represents a cordless telephone under the control of repeater 3 shown in FIG. 15.

Notification 1 is blind slot information that the extension units and the repeaters refer to. For example, notification 1 indicated by arrow A41 in FIG. 15 is blind slot information transmitted to extension units 1 to 5 and extension unit 1 under the control of the base unit. Notification 1 indicated by arrow A42 in FIG. 15 is blind slot information transmitted to extension unit 6 and repeater 2 under the control of repeater 1. Notification 1 indicated by arrow A43 in FIG. 15 is blind slot information transmitted to extension unit 7 and repeater 3 under the control of repeater 2. Notification 1 indicated by arrow A44 in FIG. 15 is blind slot information transmitted to extension unit 8 under the control of repeater 3.

The base unit generates notification 1 containing information on a slot being used by the base unit. For example, the base unit generates notification 1 representing that slots 1 to 5, 8, 9, and 11 are in use. Extension units 1 to 5 and repeater 1 under the control of the base unit therefore each select any of idle slots 0, 6, 7, and 10 and receive a downlink signal from the base unit.

Extension units 1 to 5 under the control of the base unit access the base unit in slots 1, 3, 4, 8, and 9 and receive downlink signals, as indicated by arrows A51a to A51e in FIG. 15. Repeater 2 under the control of the base unit accesses the base unit in slots 2, 5, and 11 and receives downlink signals, as indicated by arrows A52a to A52c in FIG. 15. Slots 1 to 5, 8, 9, and 11 used by the base unit and notified by notification 1 are therefore blinded.

Repeater 1 generates notification 1 containing information on a slot being used by repeater 1 and information on a slot in which access is restricted. For example, repeater 1 generates notification 1 notifying that an idle slot in repeater 1 and an idle slot in the base unit on the upstream of repeater 1 that coincide with each other are blinded (access restricted) and a slot in use is blinded (access prohibited). More specifically, slots 0, 3, 6, 7, 9, and 10 are idle slots in repeater 1. Slots 0, 6, 7, and 10 are idle slots in the base unit. Repeater 1 therefore generates notification 1 notifying that access to slots 0, 6, 7, and 10 is restricted, as shown in notification 1 indicated by arrow A42.

Repeater 1 receives notification 1 from the base unit. Repeater 1 can therefore acquire information on an idle slot in base unit. Repeater 1 issues access requests to the base unit in slots 2, 5, and 11 and receives downlink signals, as indicated by arrows A52a to 52c in FIG. 15. Slots 2, 5, and 11 used by repeater 1 and notified by notification 1 are therefore blinded. Extension unit 6 under the control of repeater 1 issues an access request to repeater 1 in slot 1 and receives a downlink signal, as indicated by arrow A53a in FIG. 15. Slot 1 used by repeater 1 and notified by notification 1 is therefore blinded. Repeater 2 under the control of repeater 1 issues access requests to repeater 1 in slots 4 and 8 and receives downlink signals, as indicated by arrows A54a and 54b in FIG. 15. Slots 4 and 8 used by repeater 2 and notified by notification 1 are therefore blinded.

Repeater 2 generates notification 1 containing information on a slot being used by repeater 2 and information on a slot in which access is restricted. For example, repeater 2 generates notification 1 notifying that an idle slot in repeater 2 and an idle slot in repeater 1 on the upstream of repeater 2 that coincide with each other are blinded and a slot in use is blinded. More specifically, slots 1 to 3, 5 to 7, 9, and 11 are idle slots in repeater 2. Slots 3 and 9 are idle slots in repeater 1 on the upstream of repeater 2. Repeater 2 therefore generates notification 1 notifying that access in slots 3 and 9 is restricted, as shown in notification 1 indicated by arrow A43.

Repeater 2 receives notification 1 from repeater 1. Repeater 2 can therefore acquire information on an idle slot in repeater 1. Repeater 2 issues access requests to upstream repeater 1 in slots 4 and 8 and receives downlink signals, as indicated by arrows A54a and 54b in FIG. 15. Slots 4 and 8 used by repeater 2 and notified by notification 1 are therefore blinded. Extension unit 7 under the control of repeater 2 issues an access request to repeater 2 in slot 0 and receives a downlink signal, as indicated by arrow A55 in FIG. 15. Slot 0 used by repeater 2 and notified by notification 1 is therefore blinded. Repeater 3 under the control of repeater 2 issues an access request to repeater 2 in slot 10 and receives a downlink signal, as indicated by arrow A56 in FIG. 15. Slot 10 used by repeater 2 and notified by notification 1 is therefore blinded.

Repeater 3 generates notification 1 containing information on a slot being used by repeater 3 and information on a slot in which access is restricted. For example, repeater 3 generates notification 1 notifying that an idle slot in repeater 3 and an idle slot in repeater 2 on the upstream of repeater 3 that coincide with each other are blinded and a slot in use is blinded. More specifically, slots 0 to 2, 4 to 9, and 11 are idle slots in repeater 3. Slots 1, 2, 5 to 7, and 11 are idle slots in repeater 2 on the upstream of repeater 3. Repeater 3 therefore generates notification 1 notifying that access in slots 1, 2, 5 to 7, and 11 is restricted, as shown in notification 1 indicated by arrow A44.

Repeater 3 receives notification 1 from repeater 2. Repeater 3 can therefore acquire information on an idle slot in repeater 2. Repeater 3 issues an access request to upstream repeater 2 in slot 10 and receives a downlink signal, as indicated by arrow A56 in FIG. 15. Slot 10 used by repeater 3 and notified by notification 1 is therefore blinded. Extension unit 8 under the control of repeater 3 accesses repeater 3 in slot 3 and receives a downlink signal, as indicated by arrow A57 in FIG. 15. Slot 3 used by repeater 3 and notified by notification 1 is therefore blinded.

In the case where there is no idle slot, repeaters 1 to 3 may lift the access restriction, as in Embodiments 1 and 2. For example, in a case where slots 3 and 9 are also used by repeater 1, repeater 1 may lift the access restriction in slots 0, 6, 7, and 10.

FIG. 16 describes an example of the access restriction performed by the base unit and the repeater. The base unit and the repeater notify the extension units and the repeaters under the control thereof by using notification 1 of information on a slot in use, as shown in the field labeled "Level 0" in FIG. 16.

The repeater uses notification 1 to notify the extension units and repeaters under the control thereof of information on a slot in which access is restricted, as shown in the field labeled "Level 1" in FIG. 16. For example, the repeater uses notification 1 to notify the extension units and repeaters under the control thereof of information representing restriction of use of an idle slot in the repeater and an idle slot in an upper-level device (base unit or upstream repeater) that coincide with each other.

The repeater typically operates at level 0 or 1. For example, the repeater notifies the extension units and repeaters under the control thereof of notification 1 containing information on a slot in use and information on a slot in which access is restricted.

In the case where there is no idle slot, the repeater lifts the level-1 restriction. That is, the repeater notifies the extension units and repeaters under the control thereof of notification 1 containing the information on a slot in use.

As described above, the controller of the repeater generates notification 1 showing a slot that a cordless telephone and a repeater under the control of the repeater can access. In this process, the controller of the repeater generates notification 1 notifying that in a case where the repeater communicates with the base unit, access to a first idle slot that is idle both in base unit 1 and the repeater is restricted. The controller of the repeater further generates notification 1 notifying that in a case where the repeater communicates with an upstream repeater, access to a second idle slot that is idle both in the upstream repeater and the repeater is restricted. The cordless telephone system can thus suppress a decrease in the number of call channels of the cordless telephone.

The above description has been made with reference to the downlink operation, and the same holds true for the uplink operation.

Embodiment 3 has been described with reference to the case where each frame is a full-slot frame, and the present disclosure is also applicable to the case where each frame is a long-slot or half-slot frame.

Embodiment 4

In Embodiment 4, the base unit includes two radio sections. The thus configured base unit increases the number of call channels.

Figure 17:
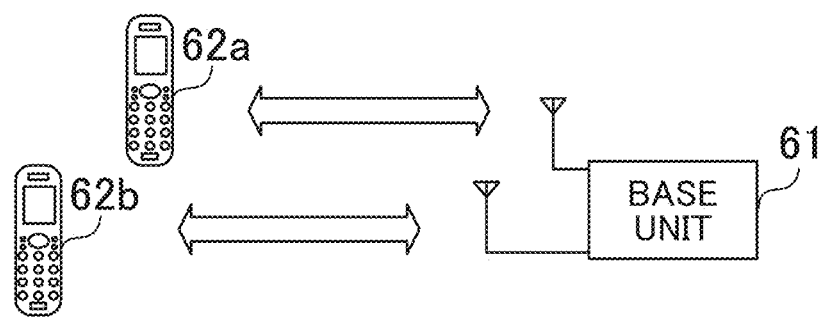
FIG. 17 shows an example of the configuration of a cordless telephone system according to Embodiment 4.

FIG. 17 shows an example of the configuration of a cordless telephone system according to Embodiment 4. The cordless telephone system includes base unit 61 and cordless telephones 62a and 62b, as shown in FIG. 17. The cordless telephone system is installed, for example, in an office and a residence.

Base unit 61 and cordless telephones 62a and 62b wirelessly communicate with each other based on the TDMA method compliant with the DECT method. Base unit 61 and cordless telephones 62a and 62b wirelessly communicate with each other, for example, by using a 1.8-GHz-band or 1.9-GHz-band radio wave.

Base unit 61 is connected to a switcher or a server (not shown) via Ethernet or PSTN. Cordless telephones 62a and 62b can each make a call to another telephone via base unit 61.

Base unit 61 includes two radio sections. The two radio sections use different frequencies to wirelessly communicate with cordless telephones 62a and 62b. Base unit 61 thus, for example, doubles the number of communication channels.

FIG. 17 shows only two cordless telephones 62a and 62b as a cordless telephone that wirelessly communicates with base unit 61, and three or more cordless telephones may be present. Base unit 61 may wirelessly communicate with a single cordless telephone.

Figure 18:
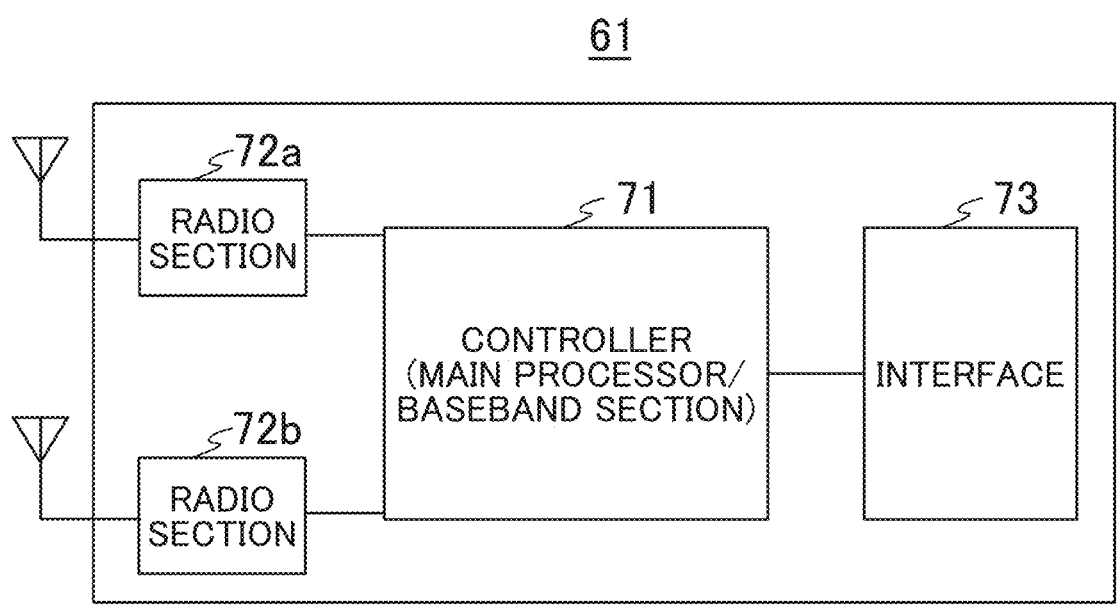
FIG. 18 shows an example of the block configuration of a base unit.

FIG. 18 shows an example of the block configuration of base unit 61. Base unit 61 includes controller 71, radio sections 72a and 72b, and interface 73.

Controller 71 controls entire base unit 61. Controller 71 performs a baseband process. Controller 71 may be formed, for example, of a CPU and/or a DSP. Controller 71 may be called a main processor/baseband section.

Radio sections 72a and 72b each have the same function as that of radio section 12 described with reference to FIG. 6. It is, however, noted that radio sections 72a and 72b use different channels (so that channels do not coincide with each other) to communicate with cordless telephones 62a and 62b, respectively.

Interface 73 has the same function as that of interface 73 described with reference to FIG. 6 and will therefore not be described.

Figure 19:
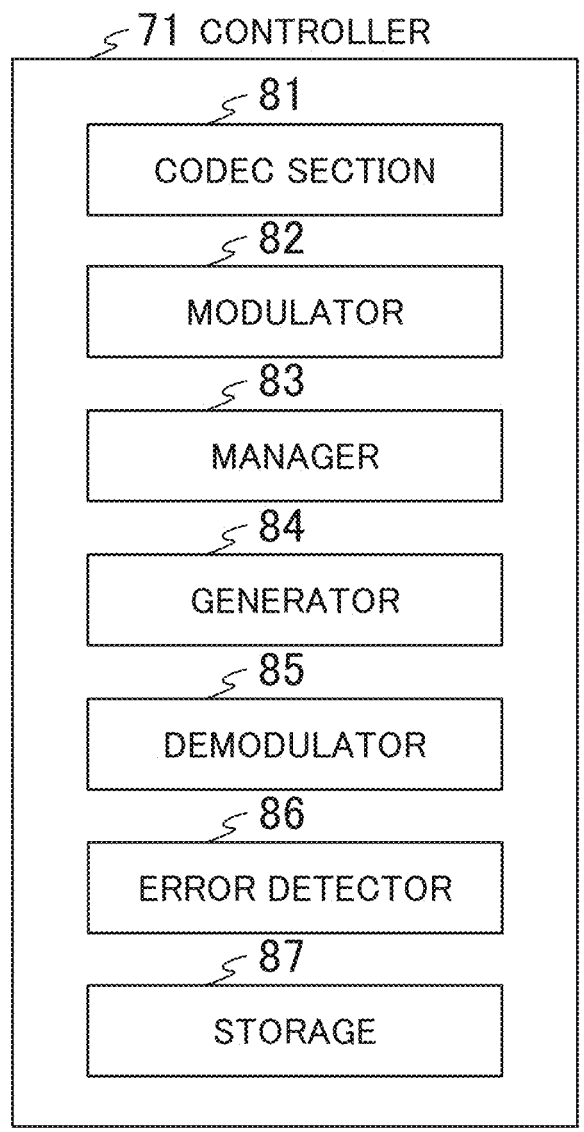
FIG. 19 shows an example of the block configuration of a controller of the base unit.

FIG. 19 shows an example of the block configuration of controller 71 of base unit 61. Controller 71 of base unit 61 includes codec 81, modulator 82, manager 83, generator 84, demodulator 85, error detector 86, and storage 87, as shown in FIG. 19.

Codec 81, modulator 82, demodulator 85, error detector 86, and storage 87 are the same as codec 21, modulator 22, demodulator 24, error detector 25, and storage 26 described with reference to FIG. 6 and will therefore not be described.

Manager 83 manages a channel list showing the state of each slot at each frequency. The channel list is stored in storage 87. The channel list contains, for example, information representing whether or not noise at each frequency in each slot is present, information representing whether or not each slot is in use at each frequency, and other pieces of information. When cordless telephones 62a or 62b issues an access request, manager 83 refers to the channel list managed by manager 83 and evaluates whether or not manager 83 accepts the access request.

Manager 83 further controls transmission power of each of cordless telephones 62a and 62b.

Generator 84 refers to the channel list and generates slot information (blind slot information). The slot information is transmitted to cordless telephones 62a and 62b under the control of base unit 61.

Figure 20:
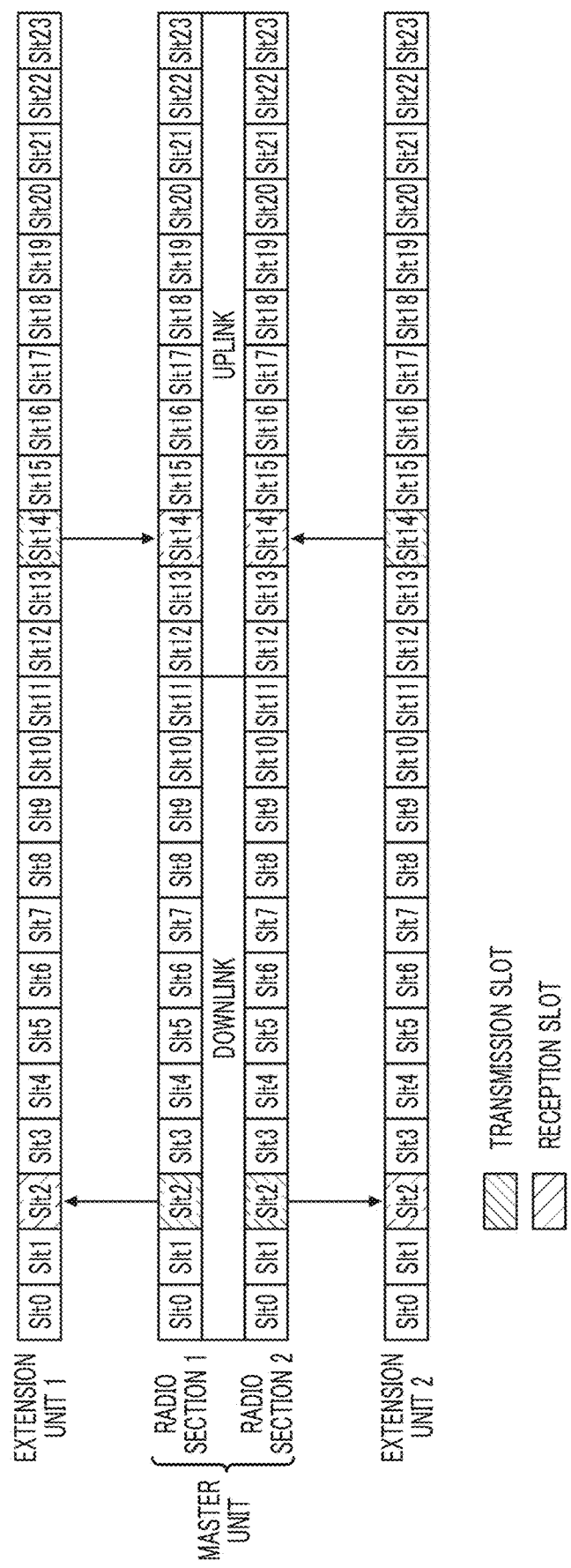
FIG. 20 shows an example of the frame configuration in the DECT method in the cordless telephone system shown in FIG. 17.

FIG. 20 shows an example of the frame configuration in the DECT method in the cordless telephone system shown in FIG. 17. Extension unit 1 shown in FIG. 20 corresponds to cordless telephone 62a shown in FIG. 17. Extension unit 2 shown in FIG. 20 corresponds to cordless telephone 62b shown in FIG. 17. The base unit shown in FIG. 20 corresponds to base unit 61 shown in FIG. 17. Radio section 1 shown in FIG. 20 corresponds to radio section 72a shown in FIG. 18. Radio section 2 shown in FIG. 20 corresponds to radio section 72b shown in FIG. 18.

FIG. 20 shows one frame having a length of 10 ms. One frame having the length of 10 ms is divided into a downlink frame having a length of 5 ms and an uplink frame having a length of 5 ms. The downlink frame contains 12 time slots from slot 0 to slot 11, and the uplink frame contains 12 time slots from slot 12 to slot 23.

The base unit includes two radio sections 1 and 2. The base unit can therefore transmit downlink signals to extension units 1 and 2 in the same time region slot. For example, the base unit uses radio section 1 to transmit a downlink signal to extension unit 1 in slot 2. The base unit uses radio section 2 to transmit a downlink signal to extension unit 2 in slot 2. It is, however, noted that radio sections 1 and 2 use different channels to transmit the downlink signals to extension units 1 and 2, respectively.

Similarly, in the uplink operation, the base unit can receive uplink signals from extension units 1 and 2 in the same time region slot. For example, the base unit uses radio section 1 to receive an uplink signal from extension unit 1 in slot 14. The base unit uses radio section 2 to receive an uplink signal from extension unit 2 in slot 14.

As described above, the base unit uses two radio sections 1 and 2 to transmit or receive signals in the same time region slot. The base unit can therefore, for example, double the largest number of incorporated extension units as compared with the case where one radio section is provided.

Radio sections 1 and 2 operate by using a common bit counter and frame counter. Radio sections 1 and 2 thus align the timings of the slots used thereby with each other. Therefore, radio sections 1 and 2 can align the downlink signal transmission timings with each other and can align the uplink signal reception timings with each other. That is, radio sections 1 and 2 avoid a situation, for example, in which one of radio sections 1 and 2 receives a signal and the other transmits a signal, whereby internal signal interference is suppressed.

Base unit 61 is hereinafter called the base unit in some cases. Cordless telephone 62a is called extension unit 1, and cordless telephone 62b is called extension unit 2 in some cases. Radio section 72a is called radio section 1, and radio section 72b is called radio section 2 in some cases.

Figure 21:
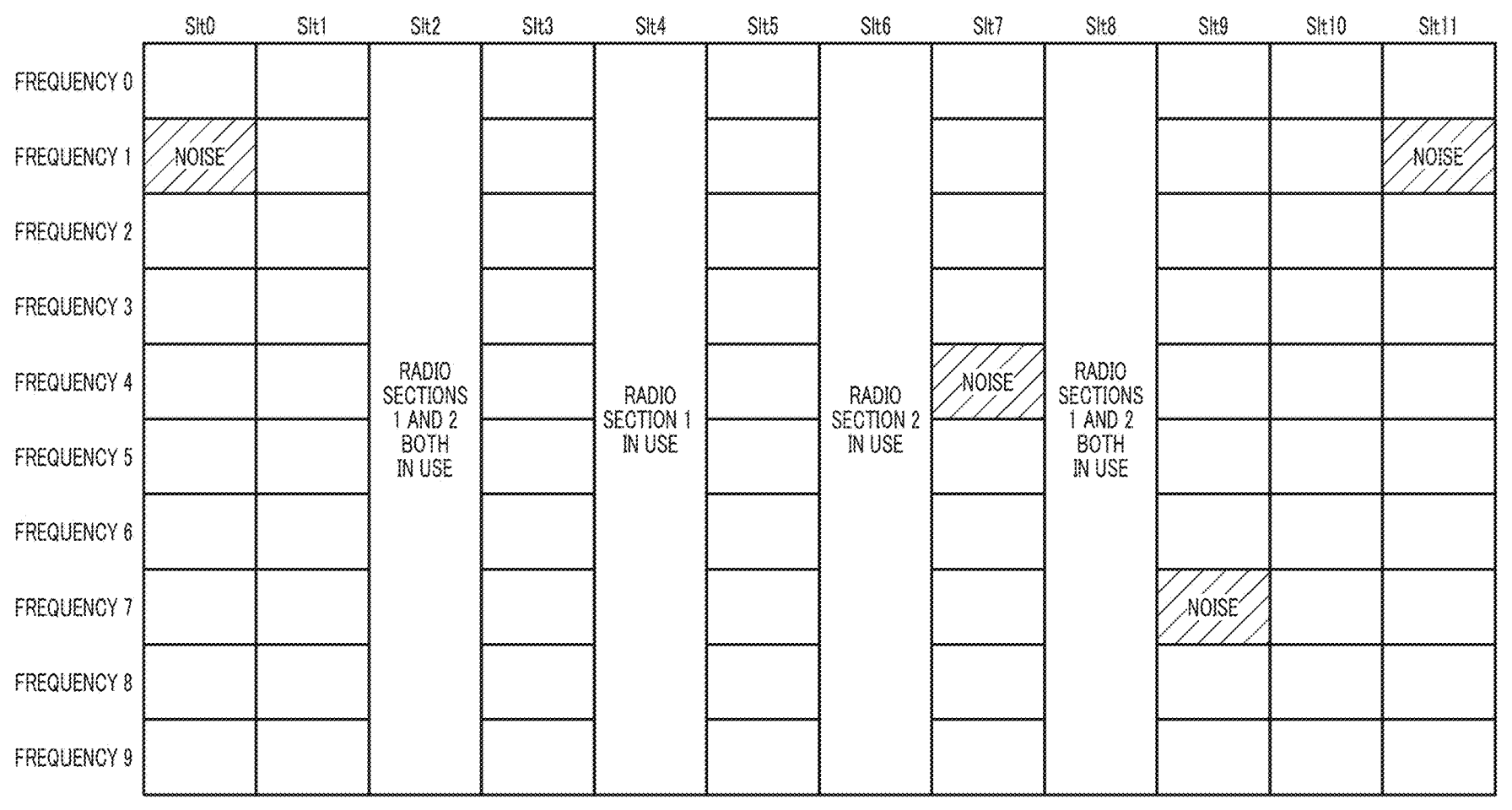

FIG. 21 describes an example of the channel list in the downlink operation. The channel list shown in FIG. 21 is stored in storage 87. Manager 83 manages the channel list in storage 87.

The term "in use" shown in FIG. 21 represents a slot used by radio sections 1 and/or 2. In other words, the term "in use" represents a slot being used by extension units 1 and/or 2. For example, in the example shown in FIG. 21, slot 2 is used by two radio sections 1 and 2. Slot 4 is used by one radio section 1. Slot 6 is used by one radio section 2. Slot 8 is used by two radio sections 1 and 2.

Frequencies 0 to 9 shown in FIG. 21 represent the frequencies used by two radio sections 1 and 2. Radio sections 1 and 2 can each communicate with extension unit 1 or 2 under the control thereof by using one of 10 frequencies 0 to 9 in one slot. That is, the base unit can communicate with extension unit 1 or 2 under the control thereof by using two frequencies at the maximum out of 10 frequencies 0 to 9 in one slot. In other words, two extension units at the maximum can access one slot.

The term "noise" shown in FIG. 21 represents a channel where the level of a signal received by of radio section 1 or 2 is greater than a predetermined threshold. For example, manager 83 monitors a signal received by radio section 1 or 2 on a channel basis and evaluates whether or not the magnitude of the signal (reception power, for example) at the monitored channel exceeds the predetermined threshold.

In a case where the magnitude of the signal at the monitored channel exceeds the predetermined threshold, manager 83 handles the channel as a noise channel (busy). That is, in a case where manager 83 receives a signal having a magnitude greater than the predetermined threshold in the channel corresponding to a slot that intrinsically receives no signal, manager 83 handles the channel corresponding to the slot in which the signal has been received as a noise channel.

In a case where extension unit 1 or 2 has issued an access request to a noise channel, manager 83 rejects the access request from extension unit 1 or 2. For example, manager 83 receives an access request from extension unit 1 at frequency 1 in slot 0. In this case, manager 83 rejects the access request from extension unit 1 to frequency 1 in slot 0. Extension unit 1 having encountered the rejection of the access request issues an access request at another channel or in another slot.

The slot information will be described. Controller 71 (generator 84) of the base unit generates the slot information. Controller 71 prohibits access to a slot used by radio sections 1 and 2 and generates slot information representing that access to a slot used by one of radio sections 1 and 2 is restricted. That is, controller 71 sets information on a slot in which access from an extension unit to the base unit is restricted as a new blinded slot in addition to a slot already being used in another communication (further access prohibited).

For example, in the case shown in FIG. 21, slot 2 is used by two radio sections 1 and 2. Controller 71 therefore blinds slot 2. Slot 4 is used by one radio section 1. Controller 71 therefore blinds slot 4. Slot 6 is used by one radio section 2. Controller 71 therefore blinds slot 6. Slot 8 is used by two radio sections 1 and 2. Controller 71 therefore blinds slot 8. Controller 71 transmits the generated slot information to extension units 1 and 2 under the control of controller 71 via radio sections 1 and 2, respectively.

Extension units 1 and 2 receive the slot information transmitted from the base unit. Extension units 1 and 2 refer to the received slot information and select slots to be used for communication out of non-blinded slots (idle slots). In the case shown in FIG. 21, extension units 1 and 2 each select a slot to be used for communication out of slots 0, 1, 3, 5, 7, and 9 to 11, which are idle slots, and issue an access request.

Extension units 1 and 2 each select a channel (frequencies 0 to 9) at which access request is issued from the selected idle slot. In a case where the channel at which extension units 1 or 2 has issued an access request is a noise channel, controller 71 (manager 83) of the base unit rejects the access request from extension unit 1 or 2. Extension unit 1 or 2 having encountered the rejection of the access request, for example, issues an access request at a channel different from the rejected channel or issues an access request in another slot.

In the case where there is no idle slot, controller 71 (generator 84) of the base unit lifts the access restriction imposed on the slot used by one of radio sections 1 and 2.

Figure 22:
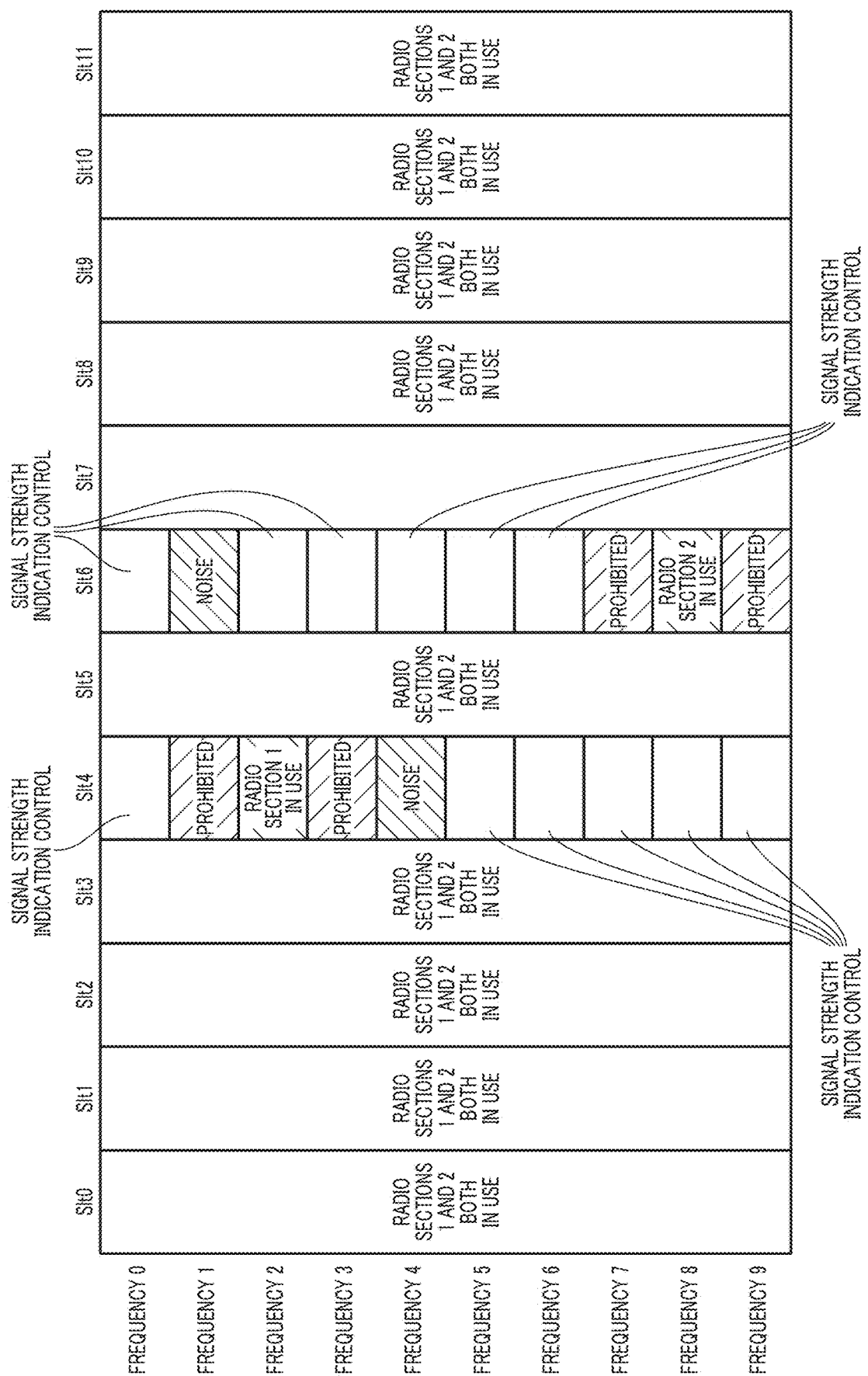
FIG. 22 describes how to lift access prohibition.

FIG. 22 describes how to lift the access restriction. FIG. 22 shows a channel list in the downlink operation. In the example shown in FIG. 22, slots 0 to 3, 5, and 7 to 11 are used in communication performed by two radio sections 1 and 2. Slot 4 is used at frequency 2 in communication performed by one radio section 1. Slot 6 is used at frequency 8 in communication performed by one radio section 2.

In the case shown in FIG. 22, all slots 0 to 11 are used by at least one of radio sections 1 and 2. Therefore, in the example shown in FIG. 22, slots 0 to 11 are blinded, so that no idle slot is present.

In the case where there is no idle slot, controller 71 of the base unit lifts the access restriction imposed on the slot used by one of radio sections 1 and 2. For example, controller 71 lifts the access restriction imposed on slot 4 used by one radio section 1 and the access restriction imposed on slot 6 used by one radio section 2. Extension units 1 and 2 can therefore issue access requests in slot 4 and 6. Slots 0 to 3, 5, and 7 to 11 used by two radio sections 1 and 2 remain blinded.

The term "prohibited" shown in FIG. 22 represents a channel at which an access request from extension unit 1 or 2 is prohibited. In a case where extension unit 1 or 2 has issued an access request at a "prohibited" channel, Controller 71 rejects the access request from extension unit 1 or 2.

Controller 71 "prohibits" the frequencies (adjacent channels) present in the same slot where the channel used by radio section 1 or 2 (extension unit 1 or 2) is present and adjacent to the channel. For example, frequency 2 in slot 4 is being used by radio section 1. Controller 71 therefore prohibits access at frequencies 1 and 3, which are adjacent to frequency 2 in use. Frequency 8 in slot 6 is being used by radio section 2. Controller 71 therefore prohibits access at frequencies 7 and 9, which are adjacent to frequency 8 in use. The base unit thus prevents extension units 1 and 2 from accessing the adjacent channels to prevent interference with signals at the adjacent channels.

Extension units 1 and 2 receive slot information representing that slots 0 to 3, 5, and 7 to 11 are blinded. Extension unit 1 refers to the received slot information and issues an access request, for example, in slot 4 (extension unit 1 does not distinguish radio sections 1 and 2 from each other and issues access request in slot 4). Since radio section 1 is being used in slot 4, radio section 2 receives the access request issued in slot 4.

Controller 71 (manager 83) may control transmission power of extension units 1 and 2.

Figure 23:
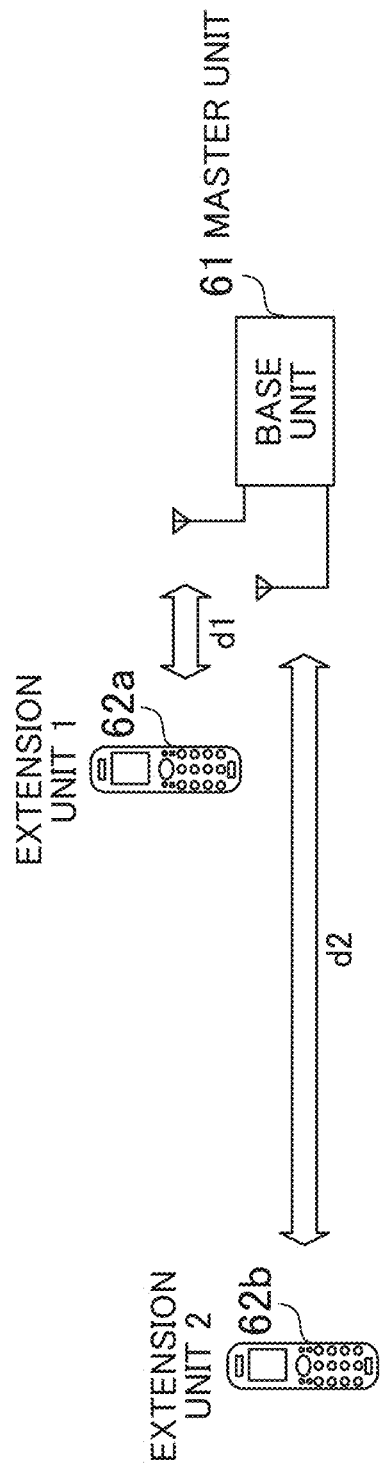
FIG. 23 shows an example of the configuration of a cordless telephone system.

FIG. 23 shows an example of the configuration of a cordless telephone system. In FIG. 23, the same components as those in FIG. 17 have the same reference characters. In the example shown in FIG. 23, extension unit 1 (cordless telephone 62a) is located in a position closer to the base unit (base unit 61) than extension unit 2 (cordless telephone 62b). The distance between extension unit 1 and the base unit is defined as distance d1. The distance between extension unit 2 and the base unit is defined as distance d2 (d1<d2).

In a case where the difference between distances d1 and d2 is large, the difference in magnitude between the signals that the base unit receives from extension units 1 and 2 (uplink signal) is large in some cases. In this case, even when the frequencies used by extension units 1 and 2 are separate from each other by a certain amount in the same slot, a signal having small reception power interferes with a signal having large reception power in some cases. For example, the signal received by extension unit 2 interferes with the signal received by extension unit 1 in some cases.

To address the problem described above, controller 71, for example, controls transmission power of extension unit 1, which communicates with radio section 1, in such a way that the difference in level between the signals received by radio section s 1 and 2 is not too large. For example, controller 71 performs the control in such a way that the transmission power of extension unit 1 decreases. It is, however, noted that controller 71 controls the transmission power of extension unit 1 in such a way that the reception power of the signal received from extension unit 1 is not lower than a predetermined threshold.

Controller 71 may control the transmission power of extension units 1 and 2 in accordance with the distance between the frequencies used by radio sections 1 and 2 (difference between frequencies). For example, in a case where the channels used by radio sections 1 and 2 are separate from each other by ±2 channels in the same slot, controller 71 controls the transmission power of extension unit 1 in such a way that the difference in the reception power between radio sections 1 and 2 is smaller than or equal to 30 dB. In a case where the channels used by radio sections 1 and 2 are separate from each other by ±3 channels in the same slot, controller 71 controls the transmission power of extension unit 1 in such a way that the difference in the reception power between radio sections 1 and 2 is smaller than or equal to 40 dB. In a case where the channels used by radio sections 1 and 2 are separate from each other by ±4 channels or greater in the same slot, controller 71 controls the transmission power of extension unit 1 in such a way that the difference in the reception power between radio sections 1 and 2 is smaller than or equal to 50 dB.

More specifically, radio section 1 (extension unit 1) communicates with the base unit by using frequency 2 in slot 4, as shown in FIG. 22. In this state, extension unit 2 issues an access request to the base unit at frequency 0 in slot 4. The base unit accepts the access request from extension unit 2 and communicates with extension unit 2 at frequency 0 in slot 4 used by radio section 2. In this case, the distance between the frequency used by extension unit 1 and the frequency used by extension unit 2 is "2", and controller 71 monitors the reception power of the two received signals received by radio sections 1 and 2 in slot 4 and controls the transmission power of extension unit 1 in such a way that the difference in the reception power is smaller than or equal to 30 dB. The channel means the "frequency and time" and in some cases means only the frequency depending on the context.

The transmission power control performed by controller 71 will be described below with reference to a flowchart. Before the description, parameters used in the flowchart will be described.

FIG. 24 shows the parameters used in the description of the signal strength indication control. Radio section 1 communicates with extension unit 1 by using frequency "F1," as shown in FIG. 24. Radio section 2 communicates with extension unit 2 by using frequency "F2."

The reception power (RSSI: received signal strength indication) of the signal received by radio section 1 is called "R1." The reception power of (RSSI: received signal strength indication) of the signal received by radio section 2 is called "R2."

The upper limit of the reception power (upper threshold of reception power) of the signal received by each of the radio sections 1 and 2 is called "Rhigh." The lower limit of the reception power (lower threshold of reception power) of the signal received by each of the radio sections 1 and 2 is called "Rlow."

The transmission power (transmission output) of the signal transmitted by extension unit 1 is called "P1." The transmission power (transmission output) of the signal transmitted by extension unit 2 is called "P2."

The upper limit of the transmission power (maximum transmission output) of the signal transmitted by extension unit 1 is called "Pmax." The lower limit of the transmission power (minimum transmission output) of the signal transmitted by extension unit 2 is called "Pmin."

Figure 25A:
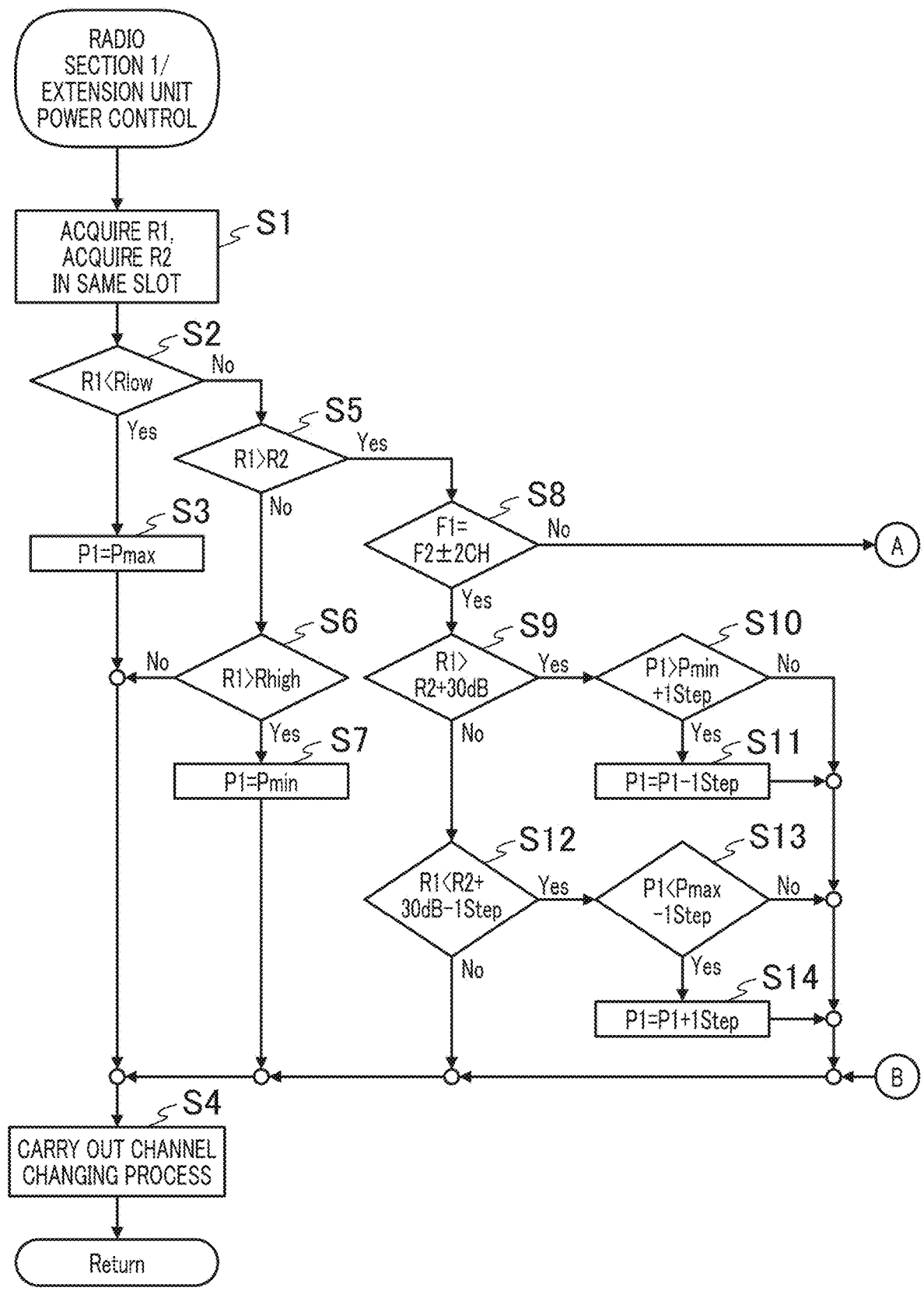
FIG. 25A is a flowchart showing an example of transmission power control performed by the controller on an extension unit.

FIGS. 25A and 25B are flowcharts showing an example of the transmission power control performed by controller 71 on extension unit 1. Controller 71, for example, carries out the processes in the flowchart shown in FIG. 25 on a frame basis. The initial value of the transmission power "P1" of extension unit 1 (value at start of call) is, for example, maximum transmission output "Pmax."

Controller 71 acquires from radio section 1 reception power "R1" of the signal transmitted by extension unit 1. Controller 71 acquires from radio section 2 reception power "R2" of the signal transmitted in the same slot by extension unit 2 (step S1).

Controller 71 evaluates whether or not reception power "R1" at radio section 1 acquired in step S1 is smaller than reception power lower threshold "Rlow" (step S2).

In a case where the result of the evaluation in step S2 shows that reception power "R1" at radio section 1 is smaller than received p lower threshold "Rlow" ("Yes" in S2), controller 71 instructs extension unit 1 to change transmission power "P1" to maximum transmission output "Pmax" (step S3). Having carried out step S3, controller 71 proceeds to a channel changing process (step S4). Having carried out the channel change process, controller 71 terminates the entire process in the flowchart. The channel changing process in step S4 will be described below in detail.

In a case where the result of the evaluation in step S2 does not show that reception power "R1" at radio section 1 is smaller than reception power lower threshold "Rlow" ("No" in S2), controller 71 evaluates whether or not reception power "R1" at radio section 1 is greater than reception power "R2" at radio section 2 (step S5).

In a case where the result of the evaluation in step S5 does not show that reception power "R1" at radio section 1 is greater than reception power "R2" at radio section 2 ("No" in S5), controller 71 evaluates whether or not reception power "R1" at radio section 1 is greater than reception power upper threshold "Rhigh" (step S6).

In a case where the result of the evaluation in step S6 shows that reception power "R1" at radio section 1 is greater than reception power upper threshold "Rhigh" ("Yes" in S6), controller 71 instructs extension unit 1 to change transmission power "P1" to minimum transmission output "Pmin" (step S7).

In a case where the result of the evaluation in step S6 does not show that reception power "R1" at radio section 1 is greater than reception power upper threshold "Rhigh" ("No" in S6), controller 71 proceeds to the process in step S4.

In a case where the result of the evaluation in step S5 shows that reception power "R1" at radio section 1 is greater than reception power "R2" at radio section 2 ("Yes" in S5), controller 71 evaluates whether or not frequency "F1" at extension unit 1 is separate from frequency "F2" at extension unit 2 by 2 channels (step S8).

In a case where the result of the evaluation in step S8 shows that frequency "F1" at extension unit 1 is separate from frequency "F2" at extension unit 2 by 2 channels ("Yes" in S8), controller 71 evaluates whether or not reception power "R1" at radio section 1 is greater than reception power "R2" at radio section 2 to which "30 dB" is added (step S9).

In a case where the result of the evaluation in step S9 shows that reception power "R1" at radio section 1 is greater than reception power "R2" at radio section 2 to which "30 dB" is added ("Yes" in S9), controller 71 evaluates whether or not transmission power "P1" at extension unit 1 is greater than minimum transmission output "Pmin" at extension unit 1 to which "1 Step" is added (step S10). The value "1 Step" is a value determined in advance.

In a case where the result of the evaluation in step S10 shows that transmission power "P1" at extension unit 1 is greater than minimum transmission output "Pmin" at extension unit 1 to which "1 Step" is added ("Yes" is S10), controller 71 instructs extension unit 1 to change transmission power "P1" to current transmission power "P1" from which "1 Step" is subtracted (step S11). Controller 71 then proceeds to the process in step S4. In a case where the result of the evaluation in step S10 does not show that transmission power "P1" at extension unit 1 is greater than minimum transmission output "Pmin" at extension unit 1 to which "1 Step" is added ("No" is S10), controller 71 proceeds to the process in step S4.

In a case where the result of the evaluation in step S9 does not show that reception power "R1" at radio section 1 is greater than reception power "R2" at radio section 2 to which "30 dB" is added ("No" in S9), controller 71 evaluates whether or not reception power "R1" at radio section 1 is smaller than reception power "R2" at radio section 2 to which "30 dB" is added and from which "1 Step" is subtracted (step S12).

In a case where the result of the evaluation in step S12 does not show that reception power "R1" at radio section 1 is smaller than reception power "R2" at radio section 2 to which "30 dB" is added and from which "1 Step" is subtracted ("No" in S12), controller 71 proceeds to the process in step S4.

In a case where the result of the evaluation in step S12 shows that reception power "R1" at radio section 1 is smaller than reception power "R2" at radio section 2 to which "30 dB" is added and from which "1 Step" is subtracted ("Yes" in S12), controller 71 evaluates whether or not transmission power "P1" at extension unit 1 is smaller than maximum transmission output "Pmax" at extension unit 1 from which "1 Step" is subtracted (step S13).

In a case where the result of the evaluation in step S13 shows that transmission power "P1" at extension unit 1 is smaller than maximum transmission output "Pmax" at extension unit 1 from which "1 Step" is subtracted ("Yes" in S13), controller 71 instructs extension unit 1 to change transmission power "P1" to current transmission power "P1" to which "1 Step" is added (step S14). Controller 71 then proceeds to the process in step S4. In a case where the result of the evaluation in step S13 does not show that transmission power "P1" at extension unit 1 is smaller than maximum transmission output "Pmax" at extension unit 1 from which "1 Step" is subtracted ("No" in S13), controller 71 proceeds to the process in step S4.

In a case where the result of the evaluation in step S8 does not show that frequency "F1" at extension unit 1 is separate from frequency "F2" at extension unit 2 by 2 channels ("No" in S8), controller 71 evaluates whether or not frequency "F1" at extension unit 1 is separate from frequency "F2" at extension unit 2 by 3 channels (step S15).

In a case where the result of the evaluation in step S15 shows that frequency "F1" at extension unit 1 is separate from frequency "F2" at extension unit 2 by 3 channels ("Yes" in S15), controller 71 evaluates whether or not reception power "R1" at radio section 1 is greater than reception power "R2" at radio section 2 to which "40 dB" is added (step S16).

In a case where the result of the evaluation in step S16 shows that reception power "R1" at radio section 1 is greater than reception power "R2" at radio section 2 to which "40 dB" is added ("Yes" in S16), controller 71 evaluates whether or not transmission power "P1" at extension unit 1 is greater than minimum transmission output "Pmin" at extension unit 1 to which "1 Step" is added (step S17).

In a case where the result of the evaluation in step S17 shows that transmission power "P1" at extension unit 1 is greater than minimum transmission output "Pmin" at extension unit 1 to which "1 Step" is added ("Yes" in S17), controller 71 instructs extension unit 1 to change transmission power "P1" to current transmission power "P1" from which "1 Step" is subtracted (step S18). Controller 71 then proceeds to the process in step S4. In a case where the result of the evaluation in step S17 does not shows that transmission power "P1" at extension unit 1 is greater than minimum transmission output "Pmin" at extension unit 1 to which "1 Step" is added ("No" in S17), controller 71 proceeds to the process in step S4.

In a case where the result of the evaluation in step S16 does not shows that reception power "R1" at radio section 1 is greater than reception power "R2" at radio section 2 to which "40 dB" is added ("No" in S16), controller 71 evaluates whether or not reception power "R1" at radio section 1 is smaller than reception power "R2" at radio section 2 to which "40 dB" is added and from which "1 Step" is subtracted (step S19).

In a case where the result of the evaluation in step S19 does not shows that reception power "R1" at radio section 1 is smaller than reception power "R2" at radio section 2 to which "40 dB" is added and from which "1 Step" is subtracted ("No" in S19), controller 71 proceeds to the process in step S4.

In a case where the result of the evaluation in step S19 shows that reception power "R1" at radio section 1 is smaller than reception power "R2" at radio section 2 to which "40 dB" is added and from which "1 Step" is subtracted ("Yes" in S19), controller 71 evaluates whether or not transmission power "P1" at extension unit 1 is smaller than maximum transmission output "Pmax" at extension unit 1 from which "1 Step" is subtracted (step S20).

In a case where the result of the evaluation in step S20 shows that transmission power "P1" at extension unit 1 is smaller than maximum transmission output "Pmax" at extension unit 1 from which "1 Step" is subtracted ("Yes" in S20), controller 71 instructs extension unit 1 to change transmission power "P1" to current transmission power "P1" to which "1 Step" is added (step S21). Controller 71 then proceeds to the process in step S4. In a case where the result of the evaluation in step S20 does not show that transmission power "P1" at extension unit 1 is smaller than maximum transmission output "Pmax" at extension unit 1 from which "1 Step" is subtracted ("No" in S20), controller 71 proceeds to the process in step S4.

In a case where the result of the evaluation in step S15 does not show that frequency "F1" at extension unit 1 is separate from frequency "F2" at extension unit 2 by 3 channels ("No" in S15), controller 71 evaluates whether or not reception power "R1" at radio section 1 is greater than reception power "R2" at radio section 2 to which "50 dB" is added (step S22).

In a case where the result of the evaluation in step S22 shows that reception power "R1" at radio section 1 is greater than reception power "R2" at radio section 2 to which "50 dB" is added ("Yes" in S22), controller 71 evaluates whether or not transmission power "P1" at extension unit 1 is greater than minimum transmission output "Pmin" at extension unit 1 to which "1 Step" is added (step S23).

In a case where the result of the evaluation in step S23 shows that transmission power "P1" at extension unit 1 is greater than minimum transmission output "Pmin" at extension unit 1 to which "1 Step" is added ("Yes" in S23), controller 71 instructs extension unit 1 to change transmission power "P1" to current transmission power "P1" from which "1 Step" is subtracted (step S24). Controller 71 then proceeds to the process in step S4. In a case where the result of the evaluation in step S23 does not show that transmission power "P1" at extension unit 1 is greater than minimum transmission output "Pmin" at extension unit 1 to which "1 Step" is added ("No" in S23), controller 71 proceeds to the process in step S4.

In a case where the result of the evaluation in step S22 does not show that reception power "R1" at radio section 1 is greater than reception power "R2" at radio section 2 to which "50 dB" is added ("No" in S22), controller 71 evaluates whether or not reception power "R1" at radio section 1 is smaller than reception power "R2" at radio section 2 to which "50 dB" is added and from which "1 Step" is subtracted (step S25).

In a case where the result of the evaluation in step S25 shows that reception power "R1" at radio section 1 is smaller than reception power "R2" at radio section 2 to which "50 dB" is added and from which "1 Step" is subtracted ("Yes" in S25), controller 71 evaluates whether or not transmission power "P1" at extension unit 1 is smaller than maximum transmission output "Pmax" at extension unit 1 from which "1 Step" is subtracted (step S26).

In a case where the result of the evaluation in step S26 shows that transmission power "P1" at extension unit 1 is smaller than maximum transmission output "Pmax" at extension unit 1 from which "1 Step" is subtracted ("Yes" in S26), controller 71 instructs extension unit 1 to change transmission power "P1" to current transmission power "P1" to which "1 Step" is added (step S27). Controller 71 then proceeds to the process in step S4. In a case where the result of the evaluation in step S26 does not shows that transmission power "P1" at extension unit 1 is smaller than maximum transmission output "Pmax" at extension unit 1 from which "1 Step" is subtracted ("No" in S26), controller 71 proceeds to the process in step S4.

The channel changing process in step S4 will be described with reference to a flowchart. Before the description, parameters used in the flowchart of the channel changing process will be described.

FIG. 26 shows the parameters used in the description of the channel changing process. Radio section 1 communicates with extension unit 1 by using frequency "F1," as shown in FIG. 26. Radio section 2 communicates with extension unit 2 by using frequency "F2."

Let "N1" be a frame error count in radio section 1. Let "N2" be a frame error count in radio section 2. Frame error counts "N1" and "N2" represent the numbers of frame errors that occur in radio sections 1 and 2. A frame error threshold for radio sections 1 and 2 (upper limit of frame error count) is called Nmax.

The frame error count in extension unit 1 is called "M1." The frame error count in extension unit 2 is called "M2." Frame error counts "M1" and "M2" represent the numbers of frame errors that occur in extension units 1 and 2. A frame error threshold for extension units 1 and 2 (upper limit of frame error count) is called Mmax.

Figure 27:
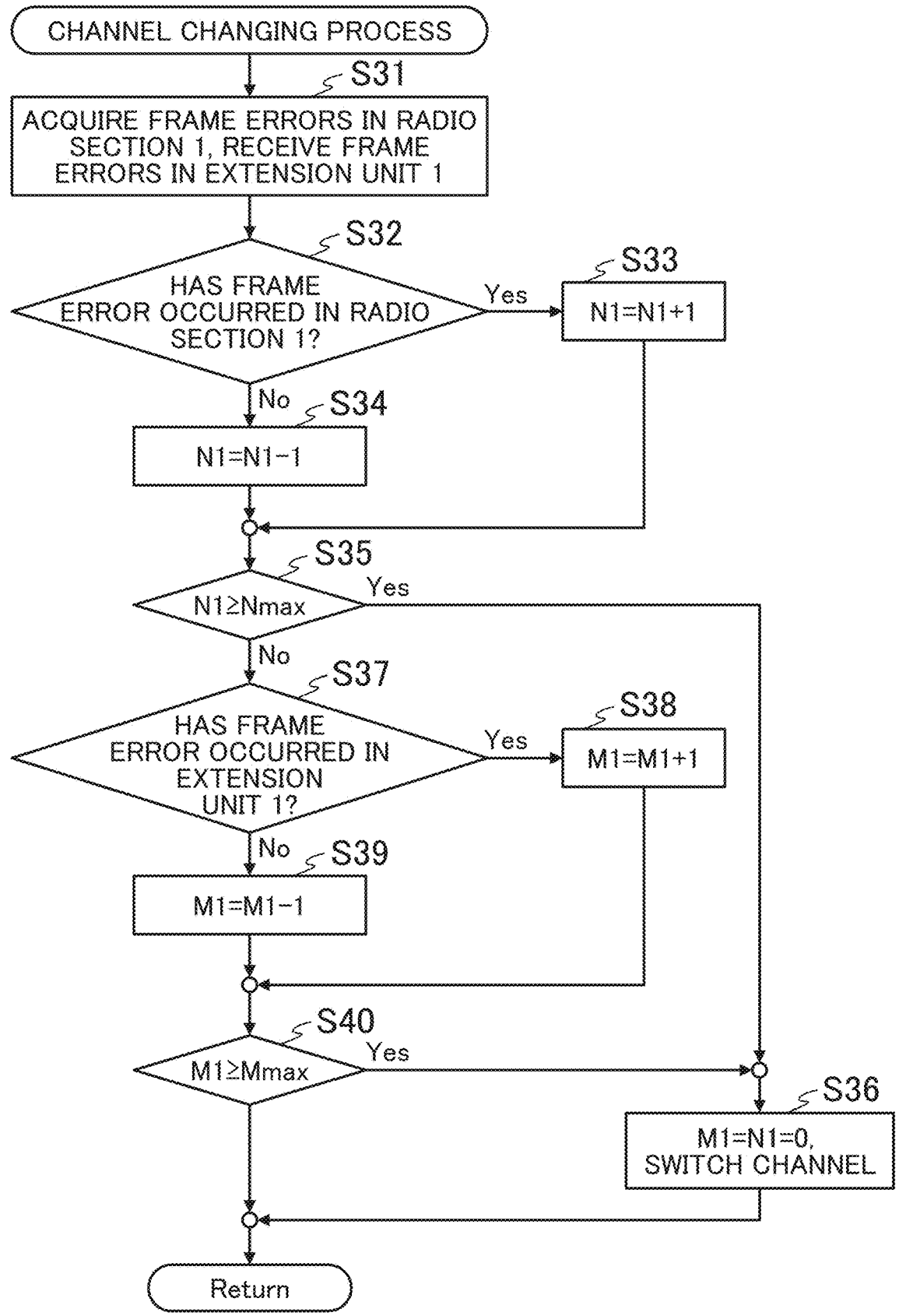
FIG. 27 is a flowchart showing an example of a channel changing process.

FIG. 27 is a flowchart showing an example of the channel changing process. In a case where the frame error count exceeds a predetermined threshold (frame error threshold) as a result of the transmission power control performed on extension unit 1, controller 71 instructs extension unit 1 to switch the channel. The initial values (values at start of call) of frame error count "N1" in radio section 1 and frame error count "M1" in extension unit 1 are, for example, each "0".

Controller 71 acquires frame errors in radio section 1 from radio section 1. Controller 71 receives frame errors in extension unit 1 from extension unit 1 (step S31).

Controller 71 evaluates whether or not a frame error has occurred in radio section 1 (step S32).

In a case where the result of the evaluation in step S32 shows that a frame error has occurred ("Yes" in S32), controller 71 adds "1" to frame error count "N1" in radio section 1 (step S33). Controller 71 then proceeds to the process in step S35.

In a case where the result of the evaluation in step S32 does not show that a frame error has occurred ("No" in S32), controller 71 subtracts "1" from frame error count "N1" in radio section 1 (step S34).

Controller 71 evaluates whether or not frame error count "N1" in radio section 1 is greater than or equal to frame error threshold "Nmax" for radio section 1 (step S35).

In a case where the result of the evaluation in step S35 shows that frame error count "N1" in radio section 1 is greater than or equal to frame error threshold "Nmax" for radio section 1 ("Yes" in S35), controller 71 sets frame error count "M1" in extension unit 1 and frame error count "N1" in radio section 1 at "0". Controller 71 instructs extension unit 1 to change the channel (step S36). Extension unit 1 issues an access request in consideration of the channel change in response to the channel change instruction from controller 71 to the base unit.

In a case where the result of the evaluation in step S35 does not show that frame error count "N1" in radio section 1 is greater than or equal to frame error threshold "Nmax" for radio section 1 ("No" in S35), controller 71 evaluates whether or not a frame error has occurred in extension unit 1 (step S37).

In a case where the result of the evaluation in step S37 shows that a frame error has occurred ("Yes" in S37), controller 71 adds "1" to frame error count "M1" in extension unit 1 (step S38). Controller 71 then proceeds to the process in step S40.

In a case where the result of the evaluation in step S37 does not show that a frame error has occurred ("Yes" in S37), controller 71 subtracts "1" from frame error count "M1" in extension unit 1 (step S39).

Controller 71 evaluates whether or not frame error count "M1" in extension unit 1 is greater than or equal to frame error threshold "Mmax" for extension unit 1 (step S40).

In a case where the result of the evaluation in step S40 shows that frame error count "M1" in extension unit 1 is greater than or equal to frame error threshold "Mmax" for extension unit 1 ("Yes" in S40), controller 71 proceeds to the process in step S36. Controller 71 then terminates the entire processes in the flowchart.

In a case where the result of the evaluation in step S40 does not show that frame error count "M1" in extension unit 1 is greater than or equal to frame error threshold "Mmax" for extension unit 1 ("No" in S40), controller 71 terminates the entire processes in the flowchart.

In FIGS. 25A and 25B shown above, transmission power of extension unit 1 that communicates with radio section 1 is controlled, and transmission power of extension unit 2 that communicates with radio section 2 may be controlled. In FIG. 27, a frame error in each of radio section 1 and extension unit 1 is monitored, and the channel of extension unit 1 is changed. Instead, the channel of extension unit 2 may be changed.

As described above, base unit 61 includes radio sections 72a and 72b, which communicate with devices under the control of base unit 61 at different frequencies, and controller 71, which generates slot information transmitted to a device under the control of base unit 61 and representing a slot that allows access to the base unit. Controller 71 generates slot information representing that access to a slot used by at least one of radio sections 72a and 72b is prohibited. Base unit 61 can thus increase the number of communication channels.

The above description has been made with reference to the downlink operation, and the same holds true for the uplink operation.

The above description has been made of the case where each frame is a full-slot frame, and the present disclosure is also applicable to the case where each frame is a long-slot or half-slot frame.

Embodiment 5

In Embodiment 5, the cordless telephone system described in Embodiment 4 will be described in a case where a repeater is disposed.

Figure 28:
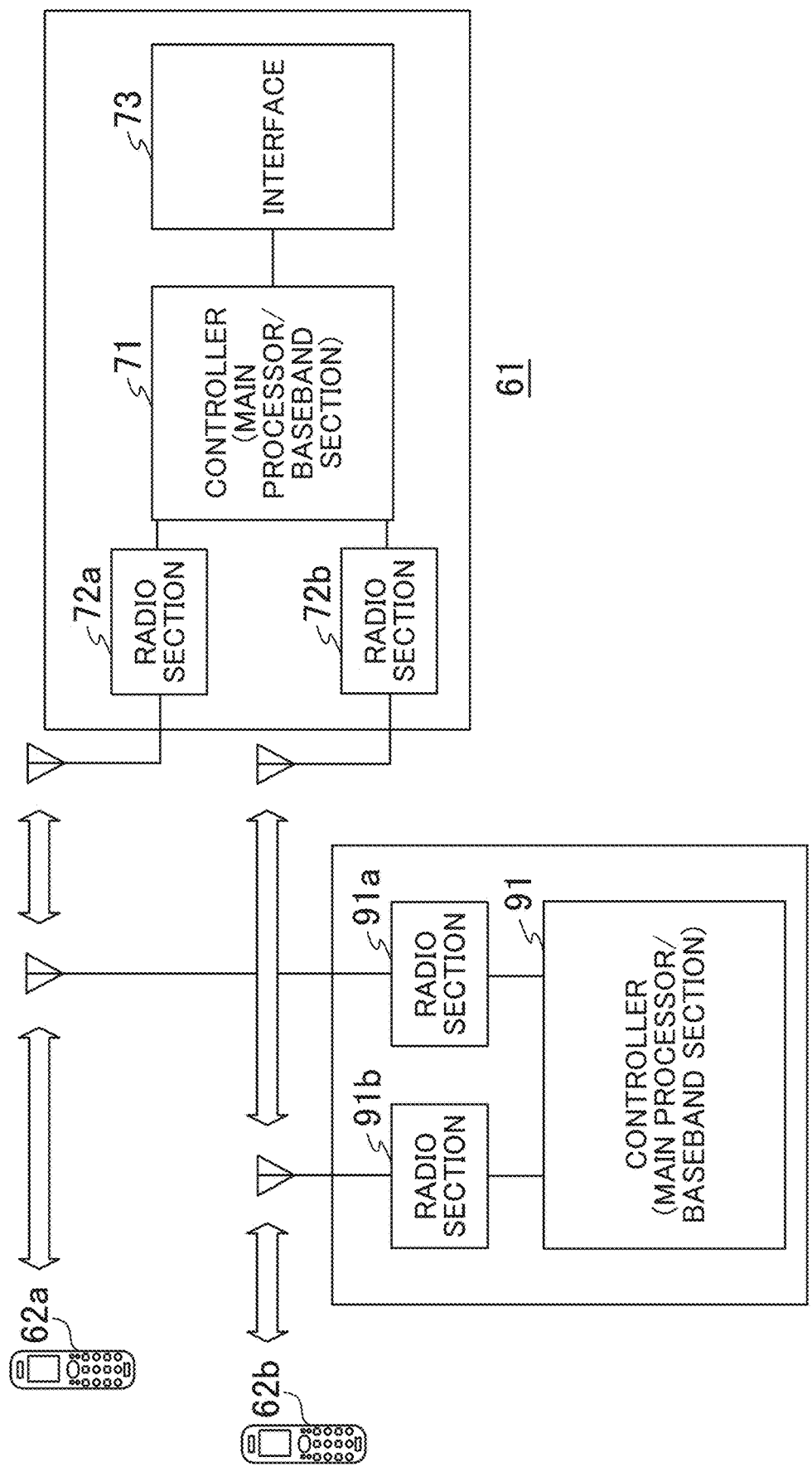
FIG. 28 shows an example of the configuration of a cordless telephone system according to Embodiment 5.

FIG. 28 shows an example of the configuration of a cordless telephone system according to Embodiment 5. In FIG. 28, the same components as those in FIGS. 17 and 18 have the same reference characters. In FIG. 28, repeater 90 is disposed under the control of base unit 61. Extension units 62a and 62b communicate with base unit 61 via repeater 90.

Repeater 90 includes controller 91 and radio sections 91a and 91b, as shown in FIG. 28. Radio sections 91a and 91b have the same functions as those of radio sections 72a and 72b described with reference to FIG. 18.

Controller 91 functions as the base unit with respect to extension units 62a and 62b. Controller 91 therefore has the same function as that of controller 71 described with reference to FIG. 18 and has the same block configuration as the block configuration shown in FIG. 19. Controller 91 functions as an extension unit with respect to base unit 61.

Base unit 61 is hereinafter called the base unit in some cases. Radio section 72a is called base unit radio section 1, and radio section 72b is called base unit radio section 2 in some cases. Repeater 90 is called a repeater in some cases. Radio section 91a is called repeater radio section 1, and radio section 91b is called repeater radio section 2 in some cases. Cordless telephone 62a is called extension unit 1, and cordless telephone 62b is called extension unit 2 in some cases.

Figure 29:
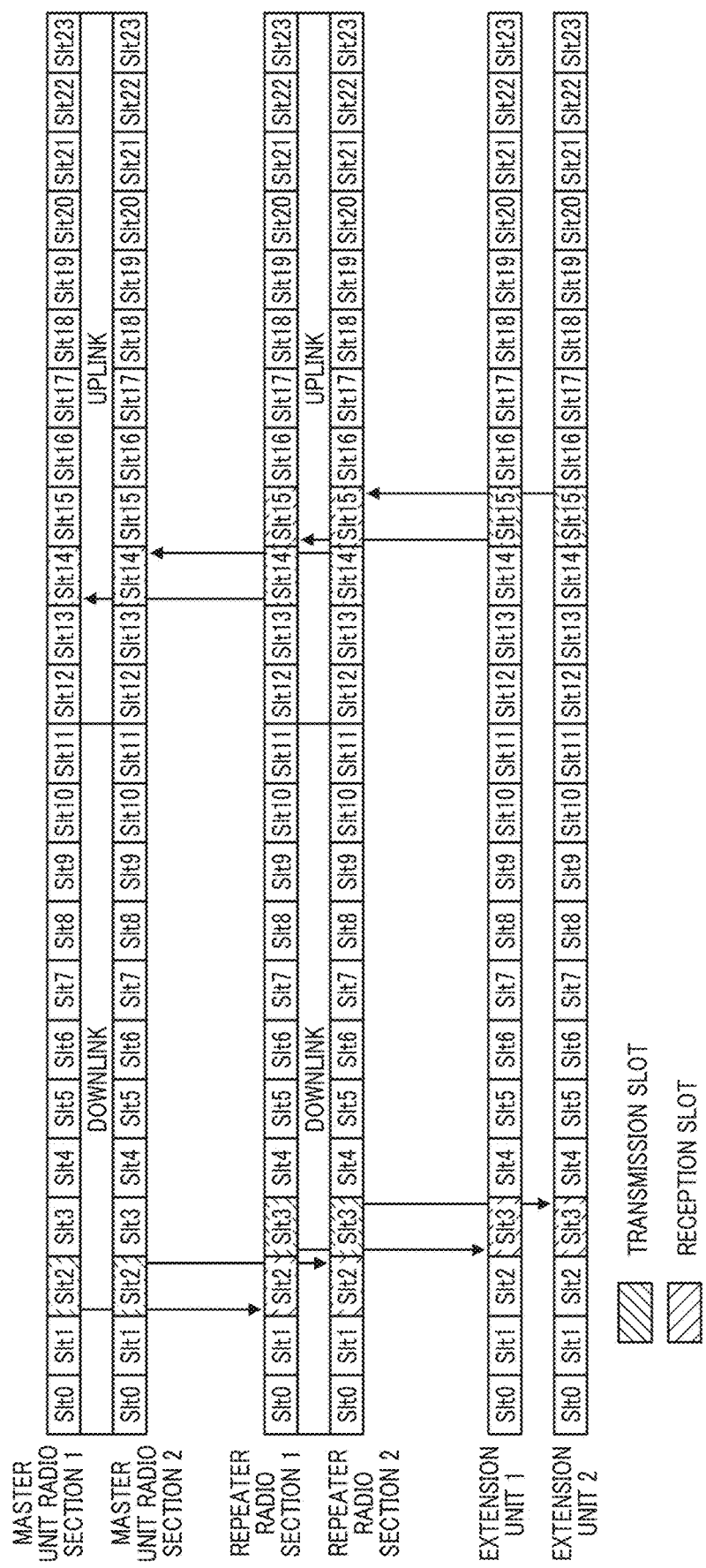
FIG. 29 shows an example of the frame configuration in the DECT method in the cordless telephone system shown in FIG. 28.

FIG. 29 shows an example of the frame configuration in the DECT method in the cordless telephone system shown in FIG. 28. The repeater functions as an extension unit or the base unit unite in some cases, as described above. For example, in slots 2 and 14 shown in FIG. 29, the repeater functions as an extension unit with respect to the base unit. In slots 3 and 15 shown in FIG. 29, the repeater functions as the base unit with respect to extension units 1 and 2.

Repeater radio sections 1 and 2 operate by using a common bit counter and frame counter. Repeater radio sections 1 and 2 thus align the timings of the slots used thereby with each other. Therefore, repeater radio sections 1 and 2 can align the downlink signal transmission timings with each other and can align the uplink signal reception timings with each other. That is, repeater radio sections 1 and 2 avoid a situation, for example, in which one of repeater radio sections 1 and 2 receives a signal and the other transmits a signal, whereby internal signal interference is suppressed.

The cordless telephone system shown in FIG. 28 may be combined with the access restriction described in Embodiments 1 and 2.

FIG. 30 describes an example of the access restriction performed by the base unit and the repeater. The base unit including two radio sections may perform slot access restriction on the extension units and the repeater under the control of the base unit, as described in Embodiments 1 and 2. The repeater including two radio sections may perform slot access restriction on the extension units and a repeater under the control of the repeater, as described in Embodiments 1 and 2. Level 1 shown in FIG. 30 is the same as level 1 described with reference to FIG. 13 and will therefore not be described.

The base unit and the repeater each notify the extension units and the repeater under the control thereof of slot information representing that access to a slot used by both the two radio sections is prohibited in the form of notifications 1 and 2, as shown in the field labeled "Level 0" in FIG. 30.

The base unit and the repeater each notify the extension units and the repeater under the control thereof of slot information representing that access to a slot used by one of the two radio sections is prohibited in the form of notifications 1 and 2, as shown in the field labeled "Level 2" in FIG. 30.

The base unit and the repeater typically operate at level 0, 1, or 2. For example, the base unit and the repeater notify the extension units and the repeater under the control thereof of notifications 1 and 2 containing information representing that access to a slot used by the two radio sections is prohibited, information on slots in which access is restricted based on even-numbered slots and odd-numbered slots, and information representing that access to a slot used by the one of the radio sections is restricted.

In a case where there is no idle slot in the level-0, level-1, and level-2 operation, the base unit and the repeater lift the level-2 restriction. That is, the base unit and the repeater notify the extension units and the repeater under the control thereof of notifications 1 and 2 containing information representing that access to a slot used by the two radio sections is prohibited and information on slots in which access is restricted based on even-numbered slots and odd-numbered slots.

In a case where there is no idle slot in the level-0 and level-1 operation, the base unit and the repeater lift the level-1 restriction. That is, the base unit and the repeater notify the extension units and the repeater under the control thereof of notifications 1 and 2 containing information representing that access to a slot used by the two radio sections is prohibited.

The cordless telephone system shown in FIG. 28 may be combined with the access restriction described in Embodiment 3.

FIG. 31 describes an example of the access restriction performed by the base unit and the repeater. The base unit including two radio sections may perform slot access restriction on the extension units and the repeater under the control of the base unit, as described in Embodiment 3. The repeater including two radio sections may perform slot access restriction on the extension units and a repeater under the control of the repeater, as described in Embodiment 3. Levels 0 and 2 shown in FIG. 31 are the same as levels 0 and 2 described with reference to FIG. 30 and will therefore not be described. Level 1 shown in FIG. 31 is the same as level 1 described with reference to FIG. 16 and will therefore not be described.

The base unit and the repeater typically operate at level 0, 1, or 2. For example, the base unit and the repeater notify the extension units and a repeater under the control thereof of notification 1 containing information representing that access to a slot used by the two radio sections is prohibited, information representing restriction of use of an idle slot in the repeater and an idle slot in an upper-level device (base unit or upstream repeater) that coincide with each other, and information representing that access to a slot used by the one of the radio sections is restricted.

In the case where there is no idle slot in the level-0, level-1, and level-2 operation, the base unit and the repeater lift the level-2 restriction. That is, the base unit and the repeater notify the extension units and the repeater under the control thereof of notification 1 containing information representing that access to a slot used by the two radio sections is prohibited and information representing restriction of use of an idle slot in the repeater and an idle slot in an upper-level device (base unit or upstream repeater) that coincide with each other.

In the case where there is no idle slot in the level-0 and level-1 operation, the base unit and the repeater lift the level-1 restriction. That is, the base unit and the repeater notify the extension units and the repeater under the control thereof of notification 1 containing information representing that access to a slot used by the two radio sections is prohibited.

As described above, the cordless telephone system including a base unit including two radio sections can include a repeater including two radio sections. The cordless telephone system can thus increase the number of communication channels.

Embodiment 6

In Embodiments 4 and 5, one controller 71 of base unit 61 manages one channel list and controls two radio sections 72a and 72b. In Embodiment 6, two radio sections are each provided with two controllers. The two controllers each manage an individual channel list.

Figure 32:
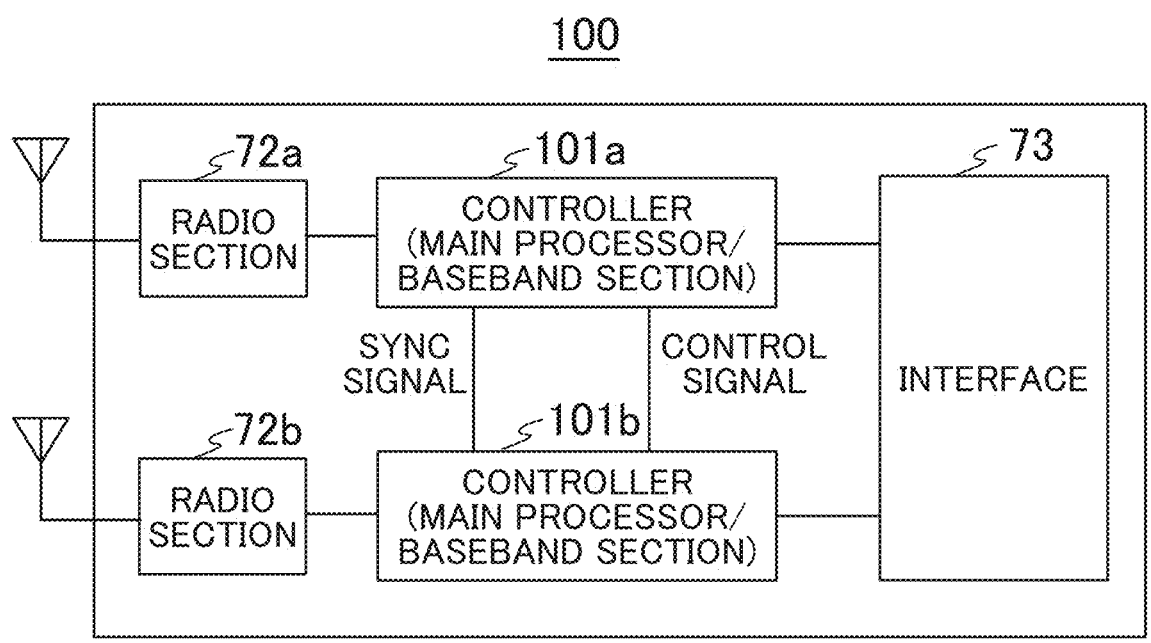
FIG. 32 shows an example of the block configuration of a base unit according to Embodiment 6.

FIG. 32 shows an example of the block configuration of base unit 100 according to Embodiment 6. In FIG. 32, the same components as those in FIG. 18 have the same reference characters.

Base unit 100 includes controllers 101a and 101b, as shown in FIG. 32. Controller 101a is provided in correspondence with radio section 72a. Controller 101b is provided in correspondence with radio section 72b. Controller 101a has the same block configuration as the block configuration shown in FIG. 19. Controller 101b has the same block configuration as the block configuration shown in FIG. 19.

Controller 101a manages a channel list for communication performed via radio section 72a. The channel list managed by controller 101a includes, for example, information on whether or not noise is present at each channel in each slot of radio section 72a, information on whether or not each frequency in each slot is used, and other pieces of information.

Controller 101b manages a channel list for communication performed via radio section 72b. The channel list managed by controller 101b includes, for example, information on whether or not noise is present at each frequency in each slot of radio section 72b, information on whether or not each frequency in each slot is used, and other pieces of information. That is, controllers 101a and 101b manage the channel lists for two radio sections 72a and 72b, respectively.

Controllers 101a and 101b synchronize the frame timing and the super-frame timing on a bit basis by using a sync signal.

Figure 33:
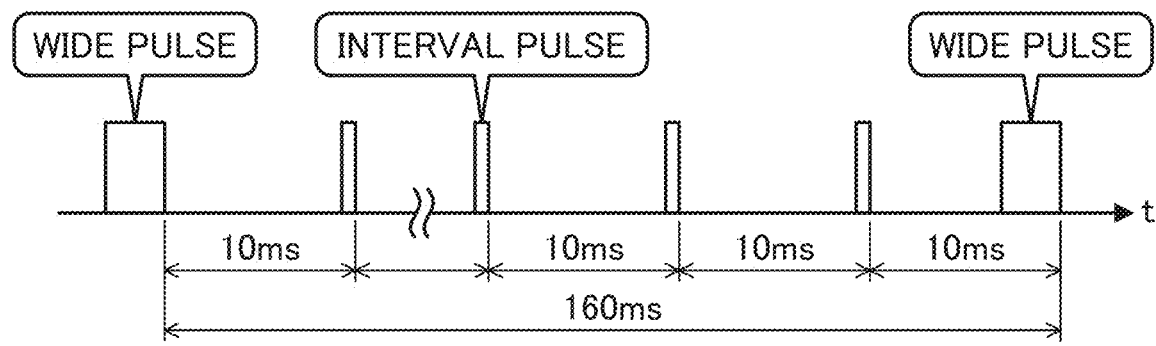
FIG. 33 describes synchronization performed by controllers.

FIG. 33 describes the synchronization performed by controllers 101a and 101b. Controller 101a outputs an interval pulse to controller 101b, for example, every 10 ms. Controller 101b aligns the start of bit counting with the interval pulse output from controller 101a. Controllers 101a and 101b can thus align the bit counters with each other to synchronize the slots with each other.

Controller 101a outputs a wide pulse to controller 101b, for example, every 160 ms. Controller 101b aligns the start of the bit counters and the frame counters with the wide pulse output from controller 101a. Controllers 101a and 101b can thus align the bit counters and the frame counters with each other to synchronize the frames and super-frames with each other.

The sync signal may instead be output from controller 101b to controller 101a.

The description with reference to FIG. 32 is resumed. A control signal allows controllers 101a and 101b to share the channel lists thereof. Therefore, controller 101a can grasp the states of the communication slot and channel in radio section 72b, and controller 101b can grasp the states of the communication slot and channel in radio section 72a.

Controller 101a generate slot information (blind slot information) that allows a cordless telephone and a repeater under the control of controller 101a to access radio section 72a. Controller 101b generate slot information that allows a cordless telephone and a repeater under the control of controller 101b to access radio section 72b. The control signal allows controllers 101a and 101b to share the slot information. Controller 101a can thus notify the cordless telephone that communicates with radio section 72a of the communication slot information in radio sections 72a and 72b. Controller 101b can notify the cordless telephone that communicates with radio section 72b of the communication slot information in radio sections 72a and 72b.

A cordless telephone switches the channel used by radio section 72a to the channel used by radio section 72b or vice versa in some cases. For example, a cordless telephone that communicates with radio section 72b issues an access request to an idle slot in radio section 72a in some cases. In such cases, controllers 101a and 101b perform a handover process.

For example, when a cordless telephone under the control of radio section 72b (handover-target cordless telephone) issues an access request to an idle slot in radio section 72a, controller 101a acquires information on the handover-target cordless telephone (extension unit registration information) from controller 101b via the control signal. The cordless telephone can thus change the communication counterpart from radio section 72a to radio section 72b or vice versa. For example, controller 101a receives call reception received by the handover-target cordless telephone via interface 73. Controller 101a can call the handover-target cordless telephone via radio section 72a based on the extension unit registration information.

Figure 34:
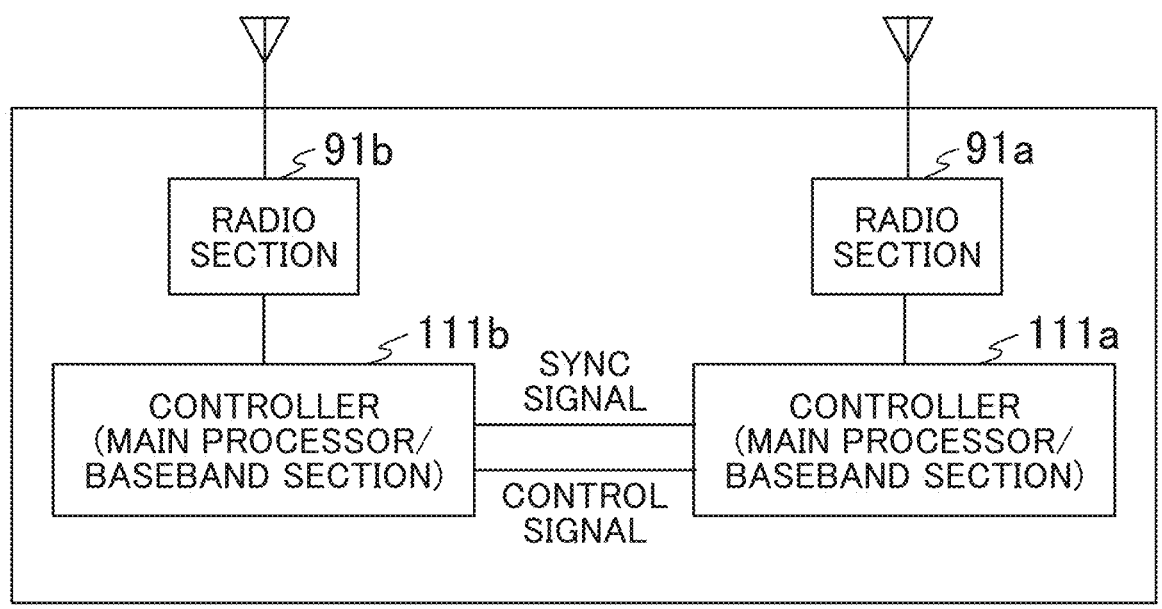
FIG. 34 shows an example of the block configuration of a repeater.

FIG. 34 shows an example of the block configuration of repeater 110. In FIG. 34, the same components as those of repeater 90 shown in FIG. 28 have the same reference characters.

Repeater 110 includes controllers 111a and 111b, as shown in FIG. 34. Controller 111a is provided in correspondence with radio section 91a. Controller 111b is provided in correspondence with radio section 91b.

Controllers 111a and 111b each function as the base unit with respect to an extension unit under the control of the controller. Controllers 111a and 111b therefore have the same functions as those of controllers 101a and 101b described with reference to FIG. 32. Controllers 111a and 111b, however, manage no extension unit registration information. The extension unit registration information is managed by base unit 100. Controllers 111a and 111b each function as an extension unit with respect to base unit 100.

As described above, controllers 101a and 101b are provided in correspondence with radio sections 72a and 72b, respectively, and manage the communication channel lists in radio sections 72a and 72b. Controllers 101a and 101b generate communication slot information in radio sections 72a and 72b, respectively. Controllers 101a and 101b share the channels lists and slot information. Wireless communication using two radio sections 72a and 72b is thus achieved. Controllers 101a and 101b may be achieved, for example, by changing the design of controllers in related art in such a way that the changed controllers can share the channels lists and slot information. The development cost of base unit 100 can thus be reduced.

Similarly, in repeater 110, controllers 111a and 111b may be achieved, for example, by changing the design of a repeater in related art in such a way that the changed controllers can share the channels lists and slot information. The development cost of repeater 110 can thus be reduced.

Embodiment 7

In Embodiment 6, a cordless telephone changes the communication counterpart from one radio section to the other or vice versa (handover). In Embodiment 7, a cordless telephone performs communication based only on one radio section and does not change the communication counterpart from one radio section to another or vice versa (no handover).

Figure 35:
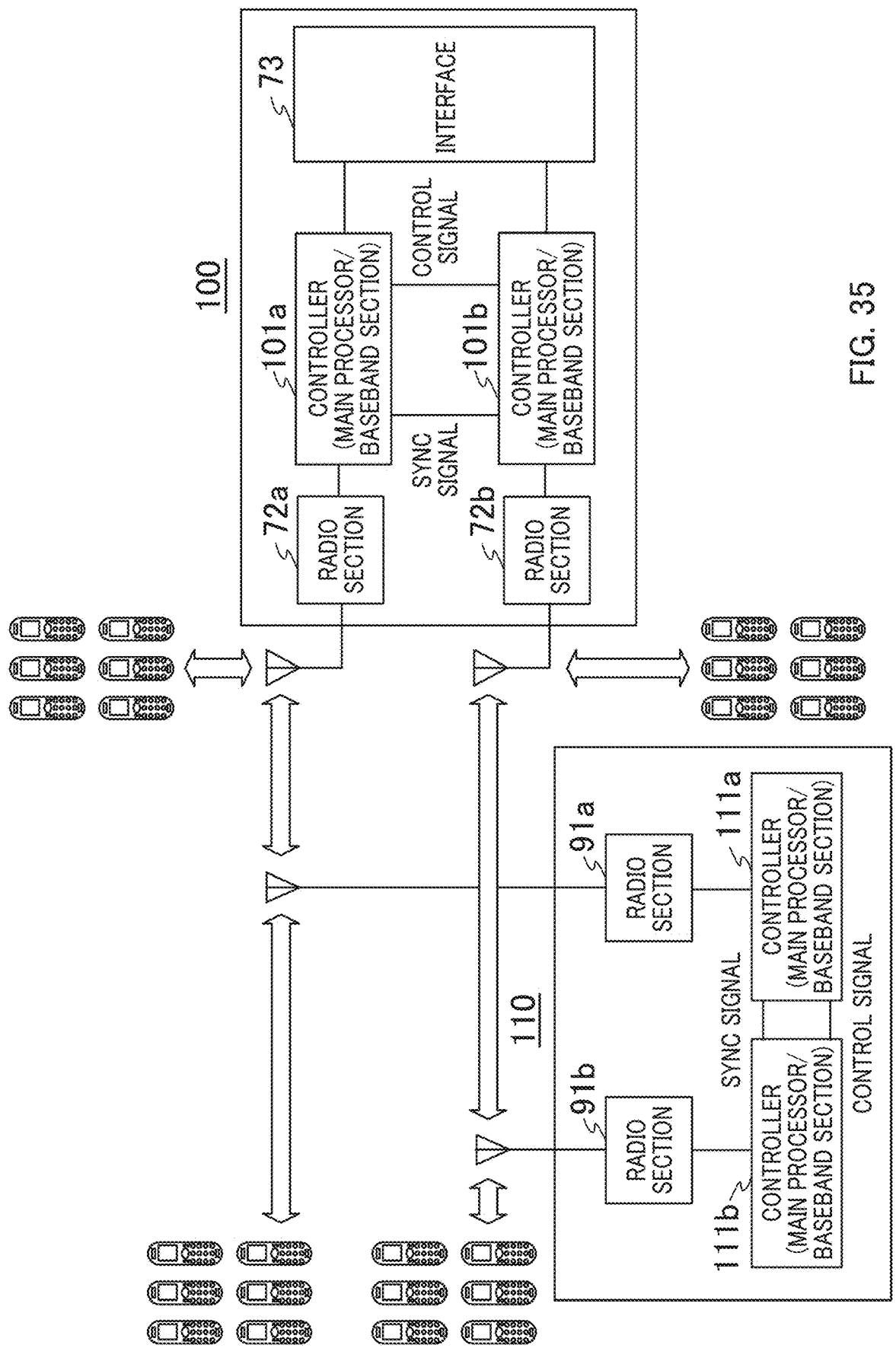
FIG. 35 shows an example of a cordless telephone system according to Embodiment 7.

FIG. 35 shows an example of a cordless telephone system according to Embodiment 7. In FIG. 35, the same components as those in FIGS. 32 and 34 have the same reference characters. The functions of controllers 101a and 101b shown in FIG. 35, however, differ from those of controllers 101a and 101b described with reference to FIG. 32. Controllers 101a and 101b shown in FIG. 35 do not exchange the extension unit registration information therebetween (no handover process is carried out).

In the case where controllers 101a and 101b do not exchange the extension unit registration information therebetween, radio sections 72a, 72b, 91a, and 91b with which cordless telephones communicate are fixed. For example, to construct a cordless telephone system (in initial setting), the extension unit registration information on a first cordless telephone is registered in controller 101a. In this case, the first cordless telephone communicates with radio section 72a or 91a but does not communicate with radio section 72b or 91b. Further, to construct the cordless telephone system, the extension unit registration information on a second cordless telephone is registered in controller 101b. In this case, the second cordless telephone communicates with radio section 72b or 91b but does not communicate with radio section 72a or 91a. That is, one of the cordless telephones performs closed communication with one of radio sections 72a and 72b. The other cordless telephone performs closed communication with one of radio sections 91a and 91b.

As described above, in the case where controllers 101a and 101b do not exchange the extension unit registration information therebetween, how to register cordless telephones is important. For example, in a case where the number of registered cordless telephones capable of communicating with radio section 72a is greater than the number of registered cordless telephones capable of communicating with radio section 72b, radio section 72a has a smaller number of idle slots for communication, and radio section 72b has a larger number of idle slots for communication in some cases. Since access is more biased to radio section 72a, any of the cordless telephones cannot be accessed in some cases although the system as a whole has idle slots.

To address the problem described above, controllers 101a and 101b, for example, alternately accept the extension unit registration information in the initial setting. For example, controller 101a stores the extension unit registration information on cordless telephones registered as odd-numbered extension units in a storage of controller 101a, and controller 101b stores the extension unit registration information on cordless telephones registered as even-numbered extension units in a storage of controller 101b.

More specifically, a user operates a first cordless telephone to register the first cordless telephone in base unit 100. In this case, controller 101a stores the extension unit registration information on the first cordless telephone in the storage of controller 101a. The user operates a second cordless telephone to register the second cordless telephone in base unit 100. In this case, controller 101b stores the extension unit registration information on the second cordless telephone in the storage of controller 101b.

Base unit 100 is hereinafter called the base unit in some cases. Radio section 72a of base unit 100 is called base unit radio section 1, and radio section 72b of base unit 100 is called base unit radio section 2 in some cases. Repeater 110 is called a repeater in some cases. Radio section 91a of repeater 110 is called repeater radio section 1, and radio section 91b of repeater 110 is called repeater radio section 2 in some cases. The cordless telephones are called extension units in some cases.

FIG. 36 describes an example of the registration of the cordless telephones. The base unit registers repeater registration information in such a way that repeater radio section 1 communicates with base unit radio section 1. The base unit further registers the repeater registration information in such a way that repeater radio section 2 communicates with base unit radio section 2.

The user operates, for example, 24 extension units to register them in the cordless telephone system. The numbers of the extension units shown in FIG. 36 represent the order in which the extension units have been registered in the cordless telephone system. Controller 101a of the base unit stores the extension unit registration information on first extension unit 1 in the storage of controller 101a. Controller 101b of the base unit store stores the extension unit registration information on second extension unit 2 in the storage of controller 101b. The same applies hereinafter, that is, controller 101a of the base unit stores the extension unit registration information on twenty-third extension unit 23 in the storage of controller 101a, and controller 101b of the base unit stores the extension unit registration information on twenty-fourth extension unit 24 in the storage of controller 101b. As a result, extension units 1, 3, . . . , 23 registered as odd-numbered extension units communicate with base unit radio section 1, as indicated by the circles in the fields labeled with "Base unit radio section 1" in FIG. 36. Extension units 2, 4, . . . , 24 registered as even-numbered extension units communicate with base unit radio section 2, as indicated by the circles in the fields labeled with "Base unit radio section 2" in FIG. 36.

The user may set 12 of the 24 extension units as extension units that support wide area communication (communication via repeater). The extension units set by the user for the wide area communication can communicate with the base unit via the repeater. For example, the user operates extension units 1 to 12 to set extension units 1 to 12 as extension units that support the wide area communication (communication via repeater). As a result, extension units 1, 3, 5, 7, 9, and 11 that communicate with base unite radio section 1 communicate with the base unit via repeater radio section 1, as indicated by the circles in the fields labeled with "Repeater radio section 1" in FIG. 36. Extension units 2, 4, 6, 8, 10, and 12 that communicate with base unite radio section 2 communicate with the base unit via repeater radio section 2, as indicated by the circles in the fields labeled with "Repeater radio section 2" in FIG. 36.

The number of maximum incorporated extension units in the repeater is 12 (6 in repeater radio section 1 and 6 in repeater radio section 2). In the example shown in FIG. 36, 12 extension units are set as the extension units that support the wide area communication. As described above, limiting the number of extension units that support the wide area communication to 12 allows the 12 extension units that support the wide area communication to perform reliable communication via the repeater.

FIG. 37 describes another example of the registration of the cordless telephones. In the example shown in FIG. 37, all the 24 extension units are so set as to support the wide area communication, unlike in the example shown in FIG. 36. That is, extension units 1, 3, . . . , 23 registered as odd-numbered extension units can not only directly communicate with base unit radio section 1 but communicate with base unit radio section 1 via repeater radio section 1. Extension units 2, 4, . . . , 24 registered as even-numbered extension units can not only directly communicate with base unit radio section 2 but communicate with base unit radio section 2 via repeater radio section 2.

The number of maximum incorporated extension units in the repeater is 12, as described above. In the example shown in FIG. 37, 24 extension units are set as the extension units that support the wide area communication. Therefore, 12 of the 24 extension units that support the wide area communication cannot perform simultaneous calls with the base unit via the repeater in some cases.

As described above, controllers 101a and 101b alternately accept the extension unit registration information. The handover process carried out by controllers 101a and 101b can thus be unnecessary.

Embodiment 8

In Embodiments 4 to 7, the base unit and the repeater each include two radio sections. In this case, a spurious signal called tertiary intermodulation (IM3) occurs in the two radio sections in some cases. In Embodiment 8, occurrence of IM3 a spurious signal is suppressed.

Figure 38:
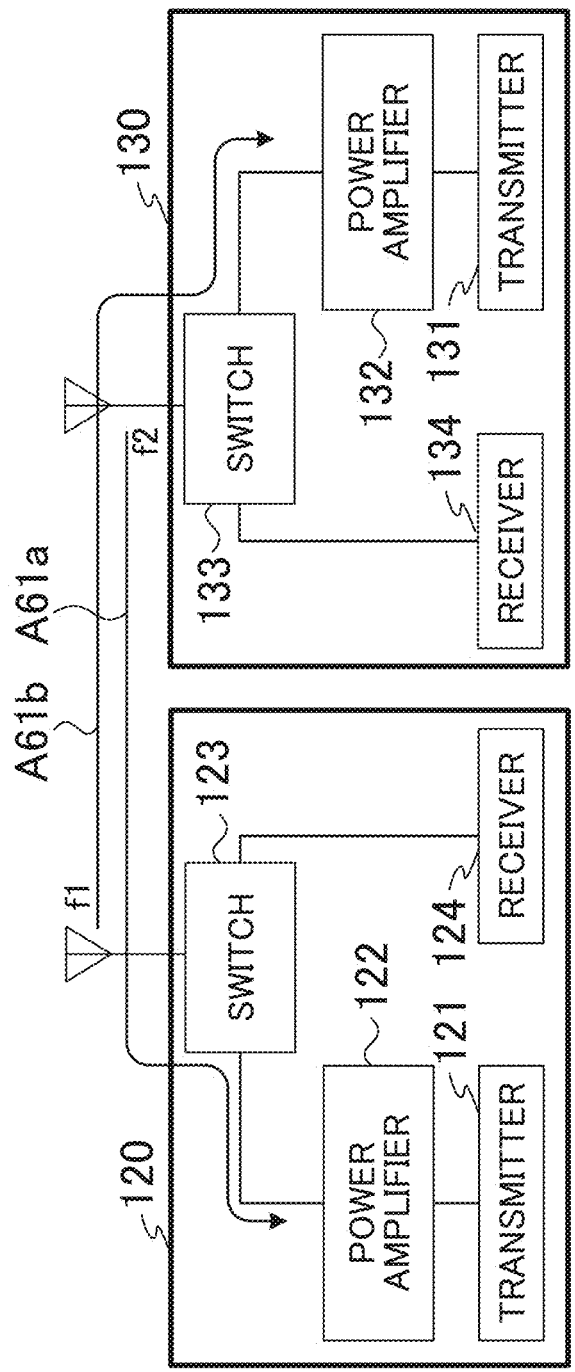
FIG. 38 shows an example of the block configurations of radio sections.

FIG. 38 shows an example of the block configurations of radio sections 120 and 130. Radio section 120 includes transmitter 121, power amplifier 122, switch 123, and receiver 124, as shown in FIG. 38. Radio section 130 includes transmitter 131, power amplifier 132, switch 133, and receiver 134. Radio section 120 uses frequency f1 to communicate with an extension unit and a repeater, and radio section 130 uses frequency f2 to communicate with an extension unit and a repeater.

Transmitter 121 up-converts a signal output from a controller (not shown) and outputs the up-converted signal to power amplifier 122. Power amplifier 122 amplifies the signal output from transmitter 121 and outputs the amplified signal to switch 123.

Switch 123 switches the connection between power amplifier 122 and an antenna and between receiver 124 and the antenna. For example, switch 123 connects power amplifier 122 to the antenna and disconnects the connection between receiver 124 and the antenna when the signal amplified by power amplifier 122 is transmitted to a cordless telephone and a repeater. Switch 123 connects the antenna to receiver 124 and disconnects the connection between power amplifier 122 and the antenna when a signal transmitted from a cordless telephone or a repeater is received.

Receiver 124 down-converts the signal output from switch 123 and outputs the down-converted signal to the controller.

Transmitter 131, power amplifier 132, switch 133, and receiver 134 of radio section 130 are the same as transmitter 121, power amplifier 122, switch 123, and receiver 124 of radio section 120 and will not be described.

Figure 39:
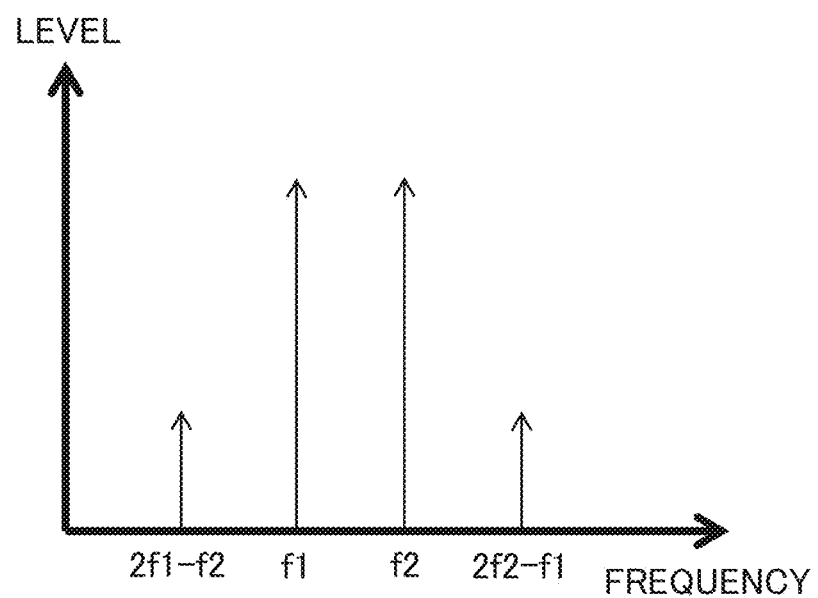
FIG. 39 describes a spurious signal.

FIG. 39 describes the spurious signal. When radio section 120 wirelessly transmits a signal having frequency f1, and radio section 130 wirelessly transmits a signal having frequency f2, spurious signals "2f1-f2" and "2f2-f2" occur in radio sections 120 and 130, as shown in FIG. 39.

For example, the signal having frequency f2 and transmitted via the antenna of radio section 130 flows into the antenna, switch 123, and power amplifier 122 of radio section 120, as indicated by arrow A61a in FIG. 38. The signal having frequency f2 and flowing into radio section 120 and the signal having frequency f1 and output from radio section 120 cause a spurious signal to occur in power amplifier 122 and switch 123 of radio section 120.

Similarly, the signal having frequency f1 and transmitted via the antenna of radio section 120 flows into the antenna, switch 133, and power amplifier 132 of radio section 130, as indicated by arrow A61b in FIG. 38. The signal having frequency f1 and flowing into radio section 130 and the signal having frequency f2 and output from radio section 130 cause a spurious signal to occur in power amplifier 132 and switch 133 of radio section 130.

The signal transmitted from radio section 120 interferes with the spurious signal when the spurious signal has a large magnitude. The signal transmitted from radio section 130 interferes with the spurious signal when the spurious signal has a large magnitude. Further, a spurious signal having a large magnitude could interfere with another DECT device, and a maximum spurious level is typically regulated by a radio law in each country. To this end, radio section 120 includes an isolator between power amplifier 122 and switch 123. Radio section 130 includes an isolator between power amplifier 132 and switch 133.

Figure 40:
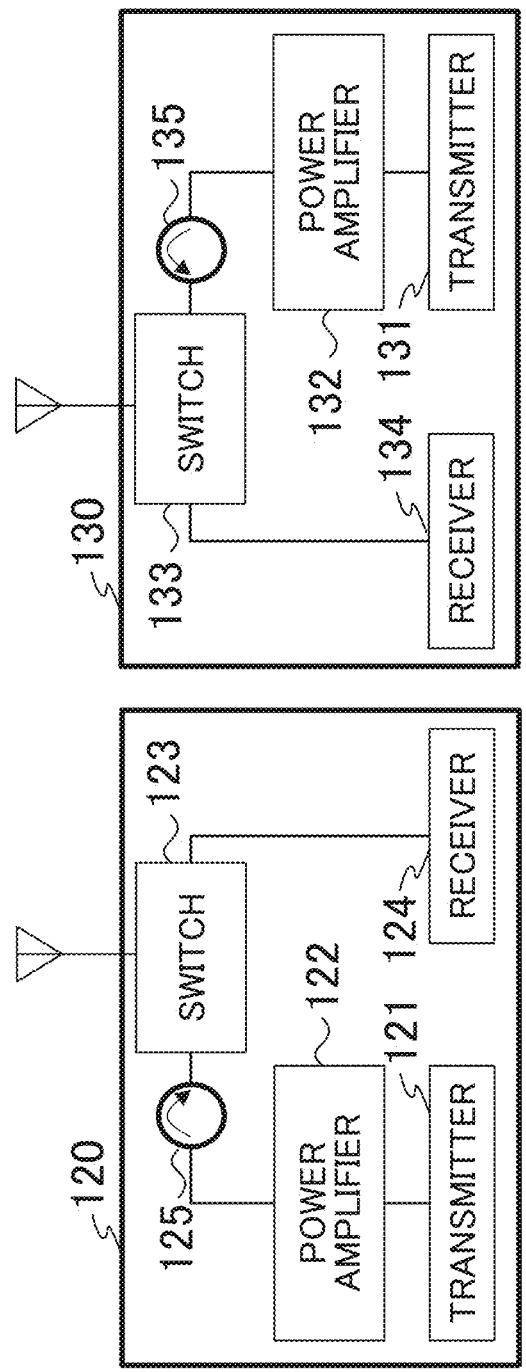
FIG. 40 shows an example of the block configurations of radio sections.

FIG. 40 shows an example of the block configurations of radio sections 120 and 130. In FIG. 40, the same components as those in FIG. 38 have the same reference characters.

Isolator 125 is provided between power amplifier 122 and switch 123 of radio section 120, as shown in FIG. 40. Isolator 135 is provided between power amplifier 132 and switch 133 of radio section 130.

Isolator 125 suppresses a reverse-direction signal that flows from switch 123 into power amplifier 122. Isolator 135 suppresses a reverse-direction signal that flows from switch 133 into power amplifier 132. Radio sections 120 and 130 thus suppress spurious signals.

In a case where the distance between the antennas of the two radio sections of the base unit is small, however, the amount of attenuation of the signal between the antennas decreases, so that the isolators cannot suppress the spurious signal to a sufficiently low level in some cases. A spurious signal also occurs in each of switches 123 and 133. The spurious signal that occurs in switch 123 or 133 cannot be suppressed by isolator 125 or 135.

To address the problem described above, radio sections 120 and 130 reduce the signal interference due to the spurious signals by increasing loss between the antennas in addition to the effect produced by isolators 125 and 135 shown in FIG. 40. Radio sections 120 and 130 further reduce the signal interference due to the spurious signals by using the directivity of the antennas.

Figure 41:
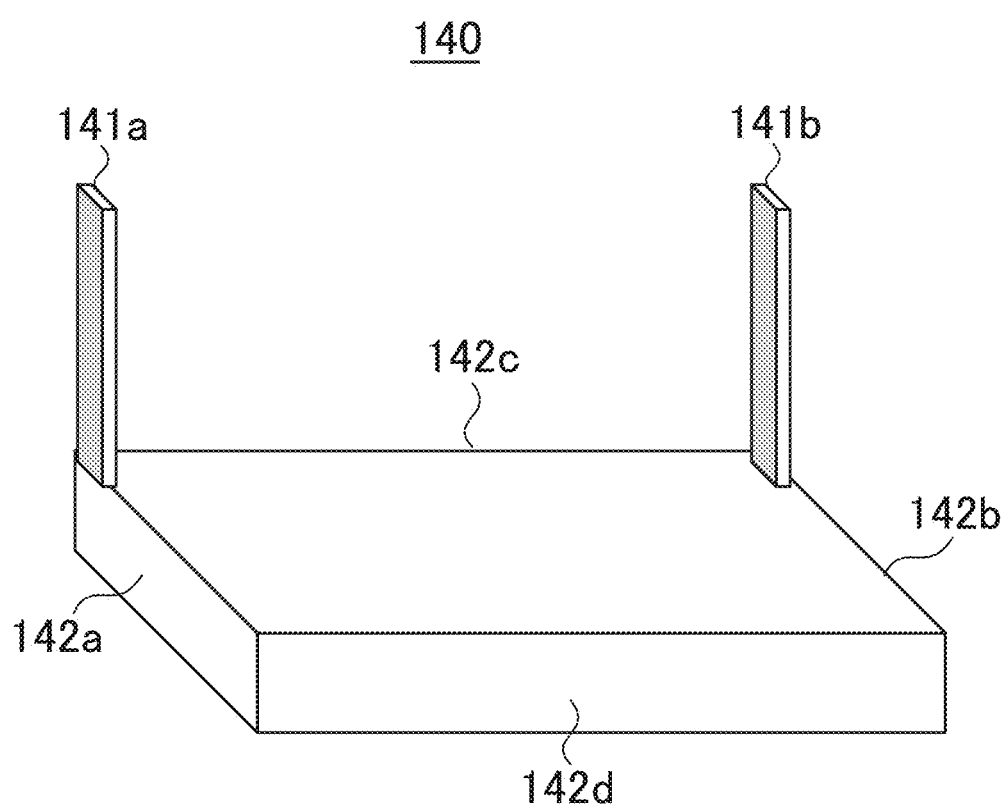
FIG. 41 shows an example of the exterior appearance of a base unit according to Embodiment 8.

FIG. 41 shows an example of the exterior appearance of base unit 140 according to Embodiment 8. Base unit 140 includes a box-shaped enclosure, as shown in FIG. 41. Base unit 140 further includes antennas 141a and 141b.

Antenna 141a is connected to switch 123 of radio section 120. Antenna 141b is connected to switch 133 of radio section 130.

Antennas 141a and 141b are so provided on the enclosure of base unit 140 that the distance between antennas 141a and 141b is maximized. For example, in a case where antenna 141a is provided on first side surface 142a of base unit 140, antenna 141b is provided on second side surface 142b, which faces first side surface 142a. The distance between first side surface 142a and second side surface 142b is greater than the distance between third side surface 142c and fourth side surface 142d.

Antennas 141a and 141b may be so designed in terms of antenna directivity that null points are so formed as to face each other.

Figure 42:
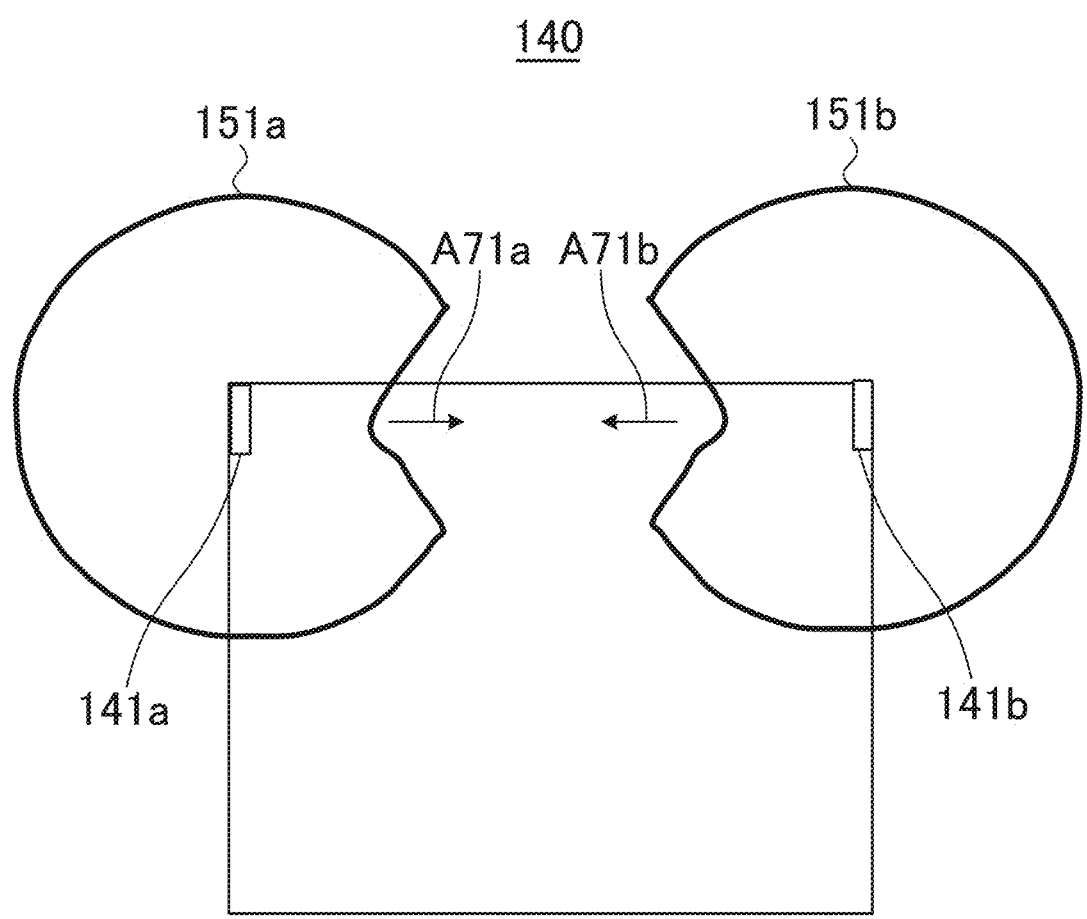
FIG. 42 shows the base unit in FIG. 41 viewed from above.

FIG. 42 shows base unit 140 in FIG. 41 viewed from above. In FIG. 42, the same portions as those in FIG. 41 have the same reference characters.

FIG. 42 shows antenna directivity 151a of antenna 141a and antenna directivity 151b of antenna 141b. Antenna 141a is so designed that the null point thereof is located on the line that coincides with direction A71a from antenna 141a toward antenna 141b. Antenna 141b is so designed that the null point thereof is located on the line that coincides with direction A71b from antenna 141b toward antenna 141a.

As described above, antennas 141a and 141b are so provided on the enclosure of base unit 140 that the antennas are separate from each other by a large distance. Further, antennas 141a and 141b are so designed that the null points face each other. Base unit 140 can thus suppress occurrence of spurious signals.

The above description has been made with reference to the base unit, and the same holds true for the repeater.

In each of the embodiments described above, the description "xxx section" used to express each component may be replaced with any other descriptions, such as "xxx circuitry," "xxx device," "xxx unit," or "xxx module."

The embodiments have been described above with reference to the accompanying drawings, but the present disclosure is not limited to the examples described in the present disclosure. A person skilled in the art can apparently conceive of a variety of changes and modifications within the category set forth in the appended claims. It is understood that the changes and modifications fall within the technical scope of the present disclosure. Components in the embodiments may be arbitrarily combined with each other to the extent that the combination does not depart from the substance of the present disclosure.

The present disclosure can be achieved by software, hardware, or software in cooperation with hardware. Each functional block used in the description of the embodiments described above may be partially or entirely achieved in the form of an LSI, which is an integrated circuit, and each process described in the embodiments described above may be partially or entirely controlled by one LSI or the combination of LSIs. The LSI may be formed of discrete chips or may be so formed of one chip as to include part or entirety of a functional block. The LSI may include a data input and a data output. The LSI is referred to as an IC, a system LSI, a super LSI, or an ultra LSI in accordance with the difference in the degree of integration.

How to achieve an integrated circuit is not limited to LSI and may be achieved by a dedicated circuit, general-purpose processor, or a dedicated processor. After an LSI is manufactured, a field programmable gate array (FPGA), which is a programmable LSI, and a reconfigurable processor capable of reconfiguration of the connection and setting of circuit cells in the LSI. The present disclosure may be achieved in the form of digital processing or analog processing.

Further, when a technology for integrated circuitry that replaces an LSI emerges based on the progress of the semiconductor technology or another technology derived therefrom, the technology may, of course, be used to integrate the functional blocks. For example, application of a bio-technology is conceivable.

INDUSTRIAL APPLICABILITY

The present disclosure is useful in a cordless telephone system installed in an office and a residence.

REFERENCE SIGNS LIST 1, 61, 100, 140 Base unit
2, 51, 52, 90, 110 Repeater
3, 4, 62a, 62b Cordless telephone
11, 31, 71, 91, 101a, 101b, 111a, 111b Controller
12, 32, 72a, 72b, 91a, 91b, 120, 130 Radio section
13, 73 Interface
21, 81 Codec
22, 82 Modulator
23, 41, 84 Generator
24, 85 Demodulator
25, 86 Error detector
26, 42, 87 Storage
83 Manager
121, 131 Transmitter
122, 132 Power amplifier
123, 133 Switch
124, 134 Receiver 125, 135 Isolator
141a, 141b Antenna

The invention claimed is:

1. A base unit that performs digital enhanced cordless telecommunications (DECT) communication, the base unit comprising:
   a first radio section which, in operation, communicates with a first device under control of the base unit;
   a second radio section which, in operation, communicates with a second device under control of the base unit, wherein the first radio section and the second radio section use different channels; and
   a controller which, in operation, generates first slot information which is transmitted to the first device under control of the base unit and to which the first device under control of the base unit refers when the first device accesses the base unit, and generates second slot information which is transmitted to the second device under control of the base unit and to which the second device under control of the base unit refers when the second device accesses the base unit,
   wherein the first slot information indicates that access to odd-numbered slots is restricted, and
   wherein the second slot information indicates that access to even-numbered slots is restricted.

2. The base unit according to claim 1, wherein the controller, in operation, lifts the access restriction imposed on the odd-numbered slots, when there is no slot to which the first device under control of the base unit is accessible, or lifts the access restriction imposed on the even-numbered slots when there is no slot to which the second device under control of the base unit is accessible.

3. The base unit according to claim 2, wherein, in a case where the first device under control of the base unit issues a first access request for a first frequency which is present in a slot where a first channel used by the first radio section is present and which is adjacent to the first channel, the controller rejects the first access request, or in a case where the second device under control of the base unit issues a second access request for a frequency which is present in a slot where a second channel used by the second radio section is present and which is adjacent to the second channel, the controller rejects the second access request.

4. The base unit according to claim 1, wherein:
   the first radio section, in operation, communicates with a plurality of first devices,
   each of the plurality of first devices communicates with the first radio section using one of the even-numbered slots to which access is not restricted by the first slot information,
   the second radio section, in operation, communicates with a plurality of second devices,
   each of the plurality of second devices communicates with the second radio section using one of the odd-numbered slots to which access is not restricted by the second slot information.

5. A repeater that performs digital enhanced cordless telecommunications (DECT) communication, the repeater comprising:
   a first radio section which, in operation, communicates with a first device under control of the repeater;
   a second radio section which, in operation, communicates with a second device under control of the repeater, wherein the first radio section and the second radio section use different channels; and
   a controller which, in operation, generates first slot information which is transmitted to the first device under control of the repeater and to which the first device under control of the repeater refers when the first device accesses the repeater, and generates second slot information which is transmitted to the second device under control of the repeater and to which the second device under control of repeater refers when the second device accesses the repeater,
   wherein the first slot information indicates that access to odd-numbered slots is prohibited,
   wherein the second slot information indicates that access to even-numbered slots is prohibited.

6. The repeater according to claim 5, wherein the controller, in operation, lifts the access prohibition imposed on the odd-numbered slots when there is no slot to which the first device under control of the repeater is accessible, or lifts the access prohibition imposed on the even-numbered slots when there is no slot to which the second device under control of the repeater is accessible.

7. The repeater according to claim 5, wherein, in a case where the first device under control of the repeater issues a first access request for a first frequency which is present in a slot where a first channel used by the first radio section is present and which is adjacent to the first channel, the controller rejects the first access request, or in a case where the second device under control of the repeater issues a second access request for a frequency which is present in a slot where a second channel used by the second radio section is present and which is adjacent to the second channel, the controller rejects the second access request.

8. The repeater according to claim 5, wherein:
   the first radio section, in operation, communicates with a plurality of first devices,
   each of the plurality of first devices communicates with the first radio section using one of the even-numbered slots to which access is not prohibited by the first slot information,
   the second radio section, in operation, communicates with a plurality of second devices,
   each of the plurality of second devices communicates with the second radio section using one of the odd-numbered slots to which access is not prohibited by the second slot information.

9. A method by a base unit that performs digital enhanced cordless telecommunications (DECT) communication, the method comprising:
   communicating, by a first radio section of the base unit, with a first device under control of the base unit using a first channel;
   communicating, by a second radio section of the base unit, with a second device under control of the base unit using a second channel, wherein the second channel is different from the first channel;
   generating, by a controller of the base unit, first slot information which is transmitted to the first device under control of the base unit and to which the first device under control of the base unit refers when the first device accesses the base unit, wherein the first slot information indicates that access to odd-numbered slots is restricted; and
   generating, by the controller of the base unit, second slot information which is transmitted to the second device under control of the base unit and to which the second device under control of the base unit refers when the second device accesses the base unit, wherein the second slot information indicates that access to even-numbered slots is restricted.

10. The method according to claim 9, further comprising:
lifting, by the controller of the base unit, the access restriction imposed on the odd-numbered slots when there is no slot to which the first device under control of the base unit is accessible, and
lifting, by the controller of the base unit, the access restriction imposed on the even-numbered slots when there is no slot to which the second device under control of the base unit is accessible.

11. The method according to claim 9, further comprising:
rejecting, by the controller of the base unit, a first access request issued by the first device under control of the base unit, in a case where the first access request is for a first frequency which is present in a slot where a first channel used by the first radio section is present and which is adjacent to the first channel; or
rejecting, by the controller of the base unit, a second access request issued by the second device under control of the base unit, in a case where the second access request is for a frequency which is present in a slot where a second channel used by the second radio section is present and which is adjacent to the second channel.

12. The method according to claim 9, further comprising:
communicating, by the first radio section of the base unit, with a plurality of first devices, wherein each of the plurality of first devices communicates with the first radio section using one of the even-numbered slots to which access is not restricted by the first slot information; and
communicating, by the second radio section of the base unit, with a plurality of second devices, wherein each of the plurality of second devices communicates with the second radio section using one of the odd-numbered slots to which access is not restricted by the second slot information.

13. A method by a repeater that performs digital enhanced cordless telecommunications (DECT) communication, the method comprising:
communicating, by a first radio section of the repeater, with a first device under control of the repeater;
communicating, by a second radio section of the repeater, with a second device under control of the repeater, wherein the first radio section and the second radio section use different channels;
generating, by a controller of the repeater, first slot information which is transmitted to the first device under control of the repeater and to which the first device under control of the repeater refers when the first device accesses the repeater, wherein the first slot information indicates that access to odd-numbered slots is prohibited, and
generating, by the controller of the repeater, second slot information which is transmitted to the second device under control of the repeater and to which the second device under control of repeater refers when the second device accesses the repeater, wherein the second slot information indicates that access to even-numbered slots is prohibited.

14. The method according to claim 13, further comprising:
lifting, by the controller of the repeater, the access prohibition imposed on the odd-numbered slots when there is no slot to which the first device under control of the repeater is accessible, and
lifting, by the controller of the repeater, the access prohibition imposed on the even-numbered slots when there is no slot to which the second device under control of the repeater is accessible.

15. The method according to claim 13, further comprising:
rejecting, by the controller of the repeater, a first access request issued by the first device under control of the repeater, in a case where the first access request is for a first frequency which is present in a slot where a first channel used by the first radio section is present and which is adjacent to the first channel, or
rejecting, by the controller of the repeater, a second access request issued by the second device under control of the repeater, in a case where the second access request is for a frequency which is present in a slot where a second channel used by the second radio section is present and which is adjacent to the second channel.

16. The method according to claim 13, further comprising:
communicating, by the first radio section of the repeater, with a plurality of first devices, wherein each of the plurality of first devices communicates with the first radio section using one of the even-numbered slots to which access is not prohibited by the first slot information, and
communicating, by the second radio section of the repeater, with a plurality of second devices, wherein each of the plurality of second devices communicates with the second radio section using one of the odd-numbered slots to which access is not prohibited by the second slot information.

* * * * *